(12) United States Patent
Chen et al.

(10) Patent No.: US 12,353,896 B2
(45) Date of Patent: Jul. 8, 2025

(54) CARD INFORMATION DISPLAY METHOD AND ELECTRONIC DEVICE

(71) Applicant: Honor Device Co., Ltd., Guangdong (CN)

(72) Inventors: Jiazi Chen, Shenzhen (CN); Taolin Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/264,804

(22) PCT Filed: May 25, 2022

(86) PCT No.: PCT/CN2022/095069
§ 371 (c)(1),
(2) Date: Aug. 9, 2023

(87) PCT Pub. No.: WO2023/016050
PCT Pub. Date: Feb. 16, 2023

(65) Prior Publication Data
US 2024/0126572 A1    Apr. 18, 2024

(30) Foreign Application Priority Data
Aug. 12, 2021  (CN) .......................... 202110925118.5

(51) Int. Cl.
*G06F 9/451* (2018.01)
*G06F 9/54* (2006.01)
*H04L 67/55* (2022.01)

(52) U.S. Cl.
CPC .............. *G06F 9/451* (2018.02); *G06F 9/542* (2013.01); *H04L 67/55* (2022.05)

(58) Field of Classification Search
CPC ........... G06F 9/451; G06F 9/542; H04L 67/55
See application file for complete search history.

(56) References Cited

U.S. PATENT DOCUMENTS

| | | | |
|---|---|---|---|
| 9,654,598 B1 * | 5/2017 | Crawford | .............. H04W 4/023 |
| 10,073,589 B1 * | 9/2018 | Jesensky | .............. G06F 1/1694 |
| 10,505,875 B1 * | 12/2019 | Jenks | ....................... H04L 51/10 |

(Continued)

FOREIGN PATENT DOCUMENTS

| | | |
|---|---|---|
| CN | 105959819 A | 9/2016 |
| CN | 107918850 A | 4/2018 |

(Continued)

*Primary Examiner* — Daniel Samwel

(57) ABSTRACT

A card information display method and an electronic device, which a specific solution is as follows: An electronic device displays a minus one screen, where the minus one screen includes a first region and a second region. The first region includes at least one first card, the first card is configured to display first information, and the first information is from one or more applications. When the first information meets a preset condition, the first card is pushed by the electronic device to the first region. The second region includes at least one second card, the second card is associated with an application, and the second card is configured to display second information of the associated application. The second card is a card created by the electronic device based on a subscription operation performed by the user.

20 Claims, 38 Drawing Sheets

(56) References Cited

U.S. PATENT DOCUMENTS

| | | | | |
|---|---|---|---|---|
| 2013/0344899 A1* | 12/2013 | Stamm | .................. | H04W 4/023 |
| | | | | 455/456.3 |
| 2017/0315681 A1* | 11/2017 | Kang | ...................... | G06F 9/451 |
| 2018/0181295 A1 | 6/2018 | Yu et al. | | |
| 2020/0192683 A1* | 6/2020 | Lin | .......................... | G06F 9/445 |
| 2020/0311713 A1* | 10/2020 | Yu | .......................... | G06Q 10/08 |
| 2021/0209876 A1 | 7/2021 | Jiang et al. | | |
| 2021/0286510 A1* | 9/2021 | Tyler | .................. | G06F 3/04883 |

FOREIGN PATENT DOCUMENTS

| | | |
|---|---|---|
| CN | 108604159 A | 9/2018 |
| CN | 110941775 A | 3/2020 |
| CN | 111225108 A | 6/2020 |
| CN | 111738679 A | 10/2020 |
| CN | 112153218 A | 12/2020 |
| CN | 114531511 A | 5/2022 |
| EP | 3817408 A1 | 5/2021 |

* cited by examiner

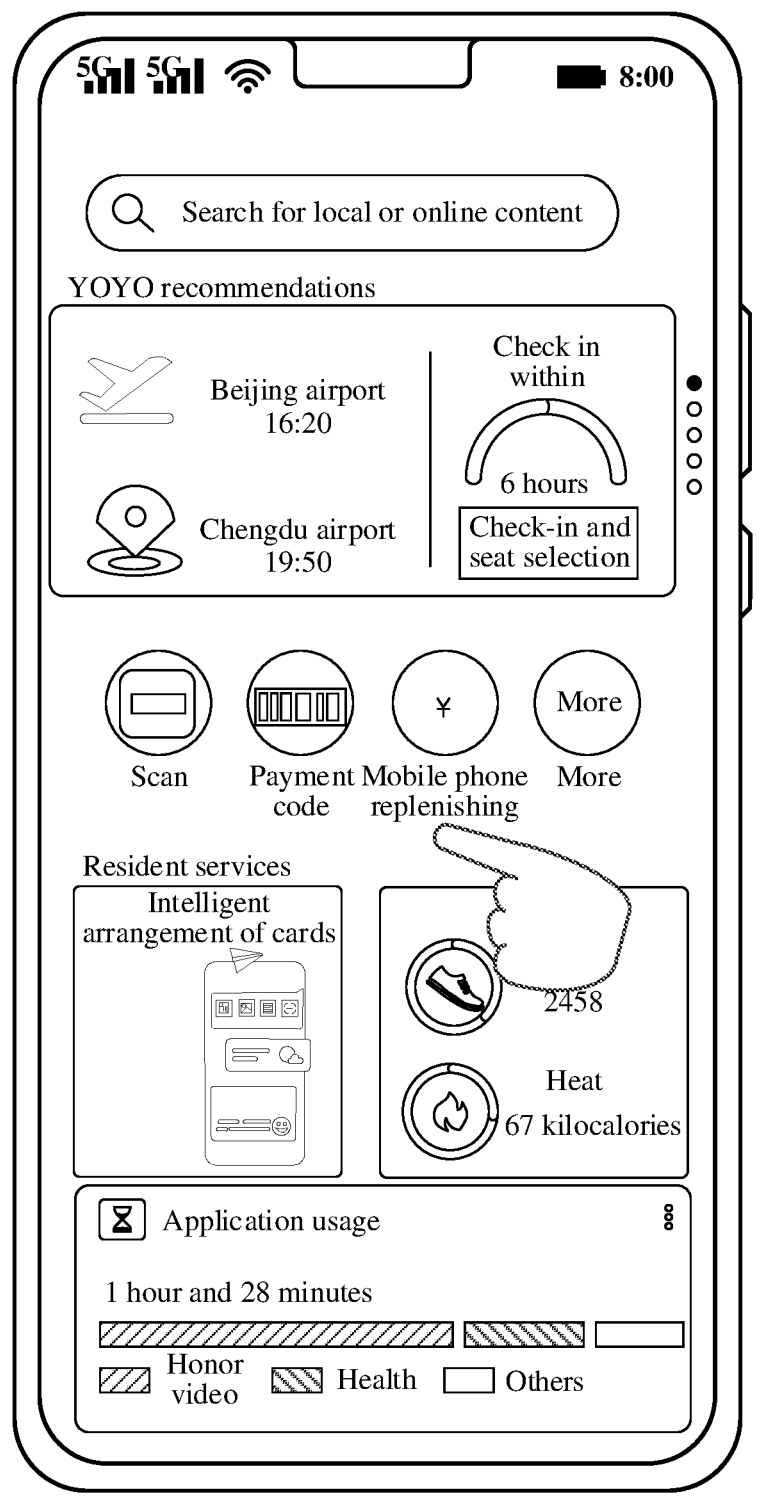
FIG. 12A(1)

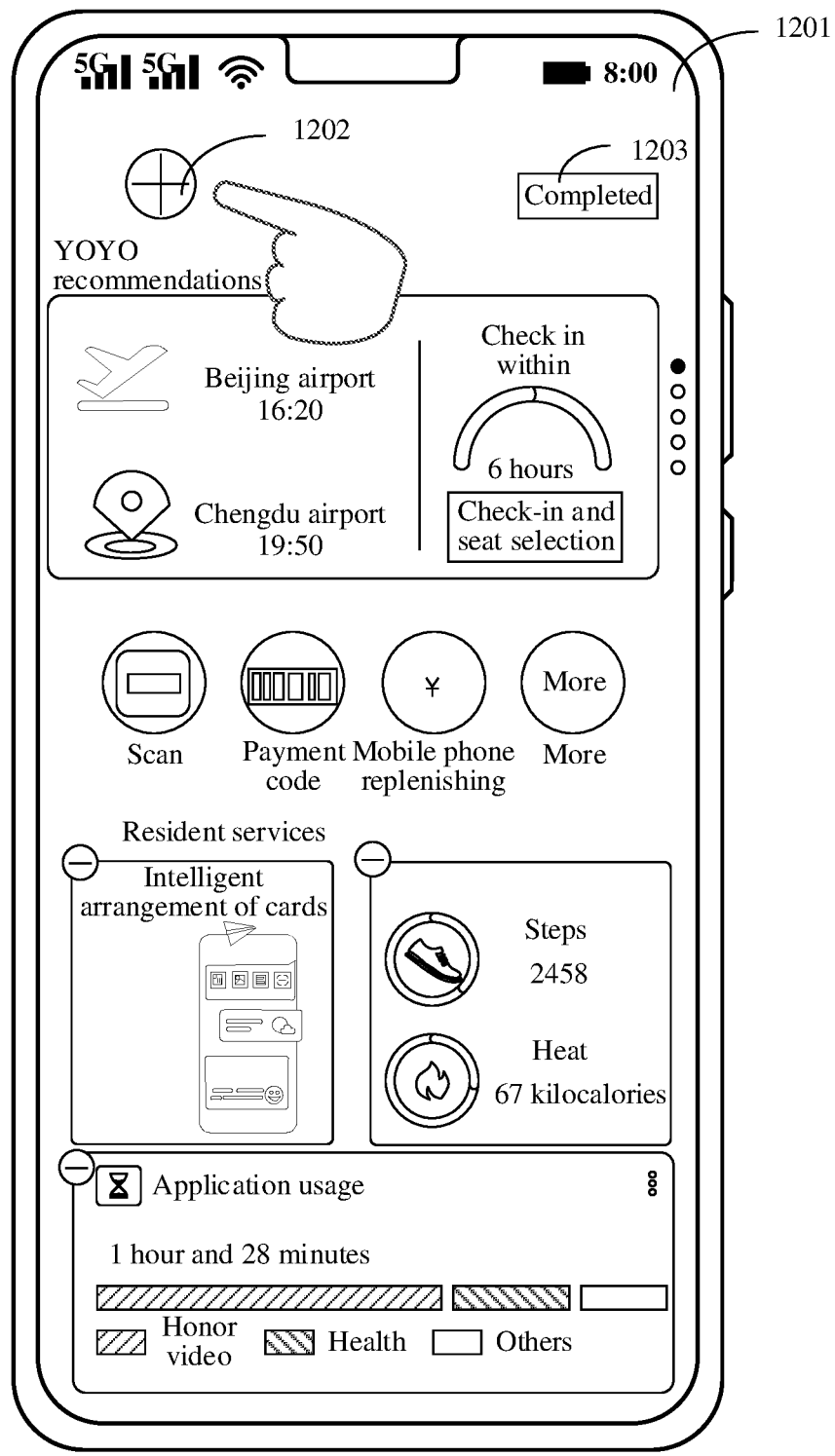
FIG. 12A(2)

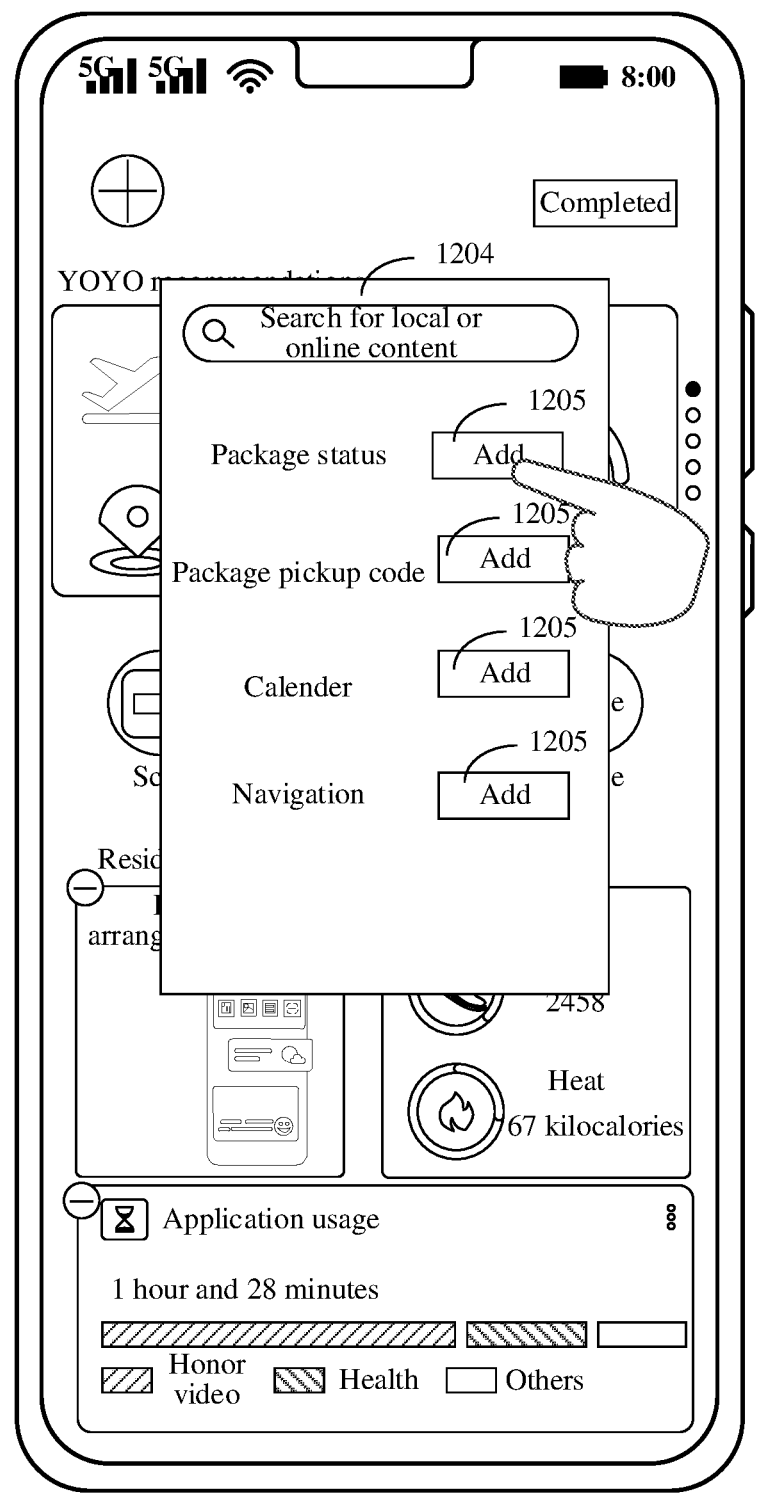
FIG. 12A(3)

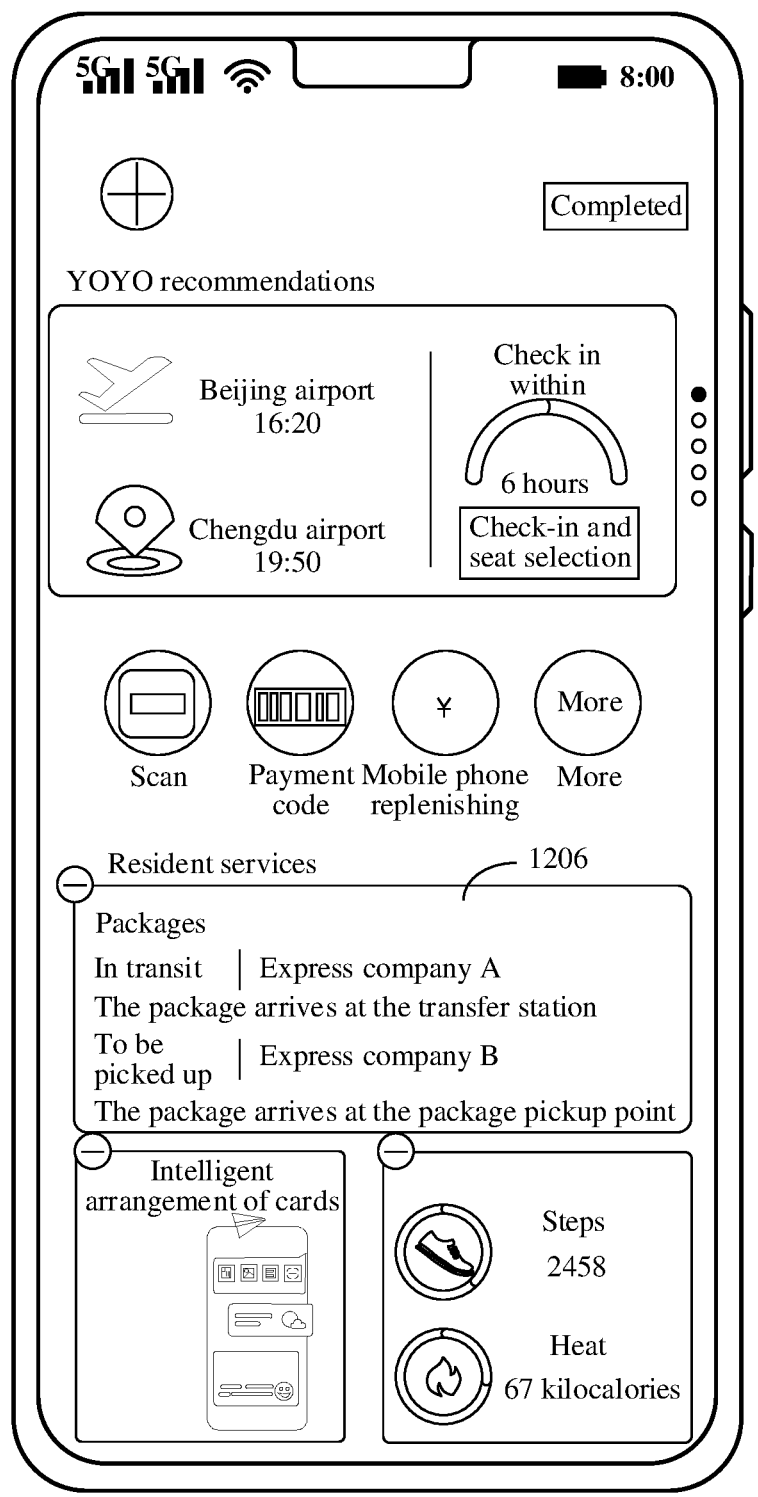
FIG. 12A(4)

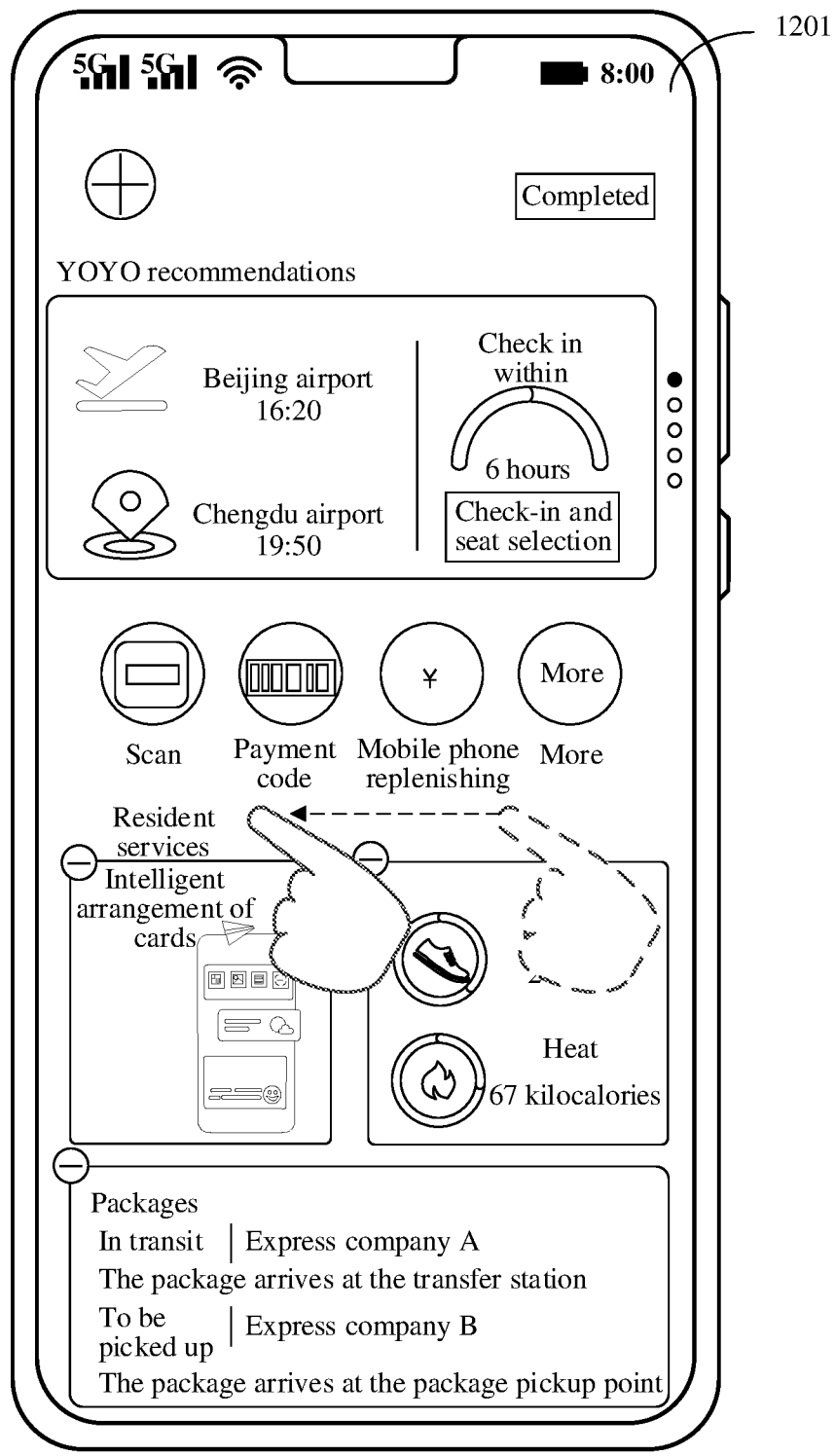
FIG. 12B(1)

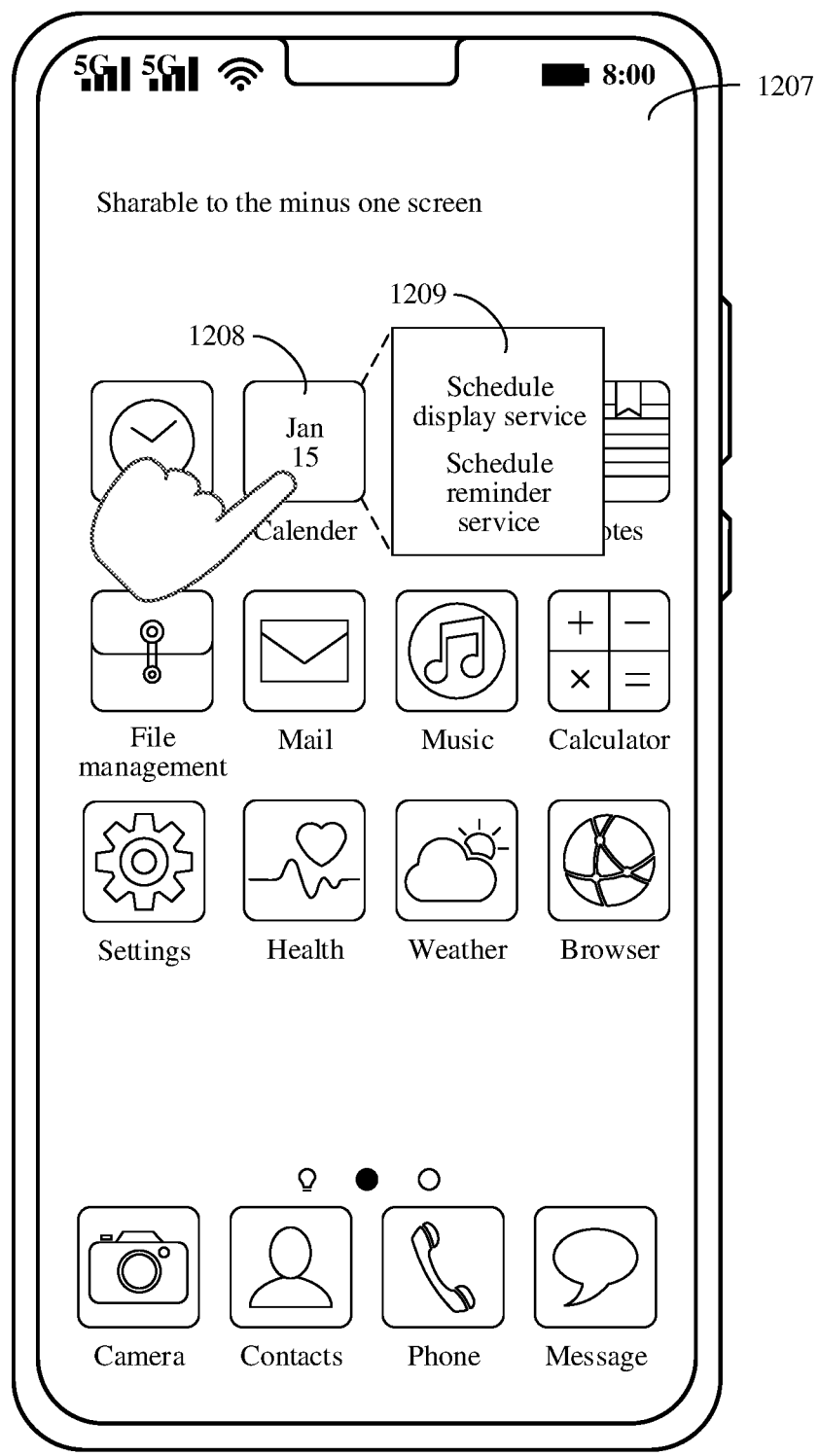
FIG. 12B(2)

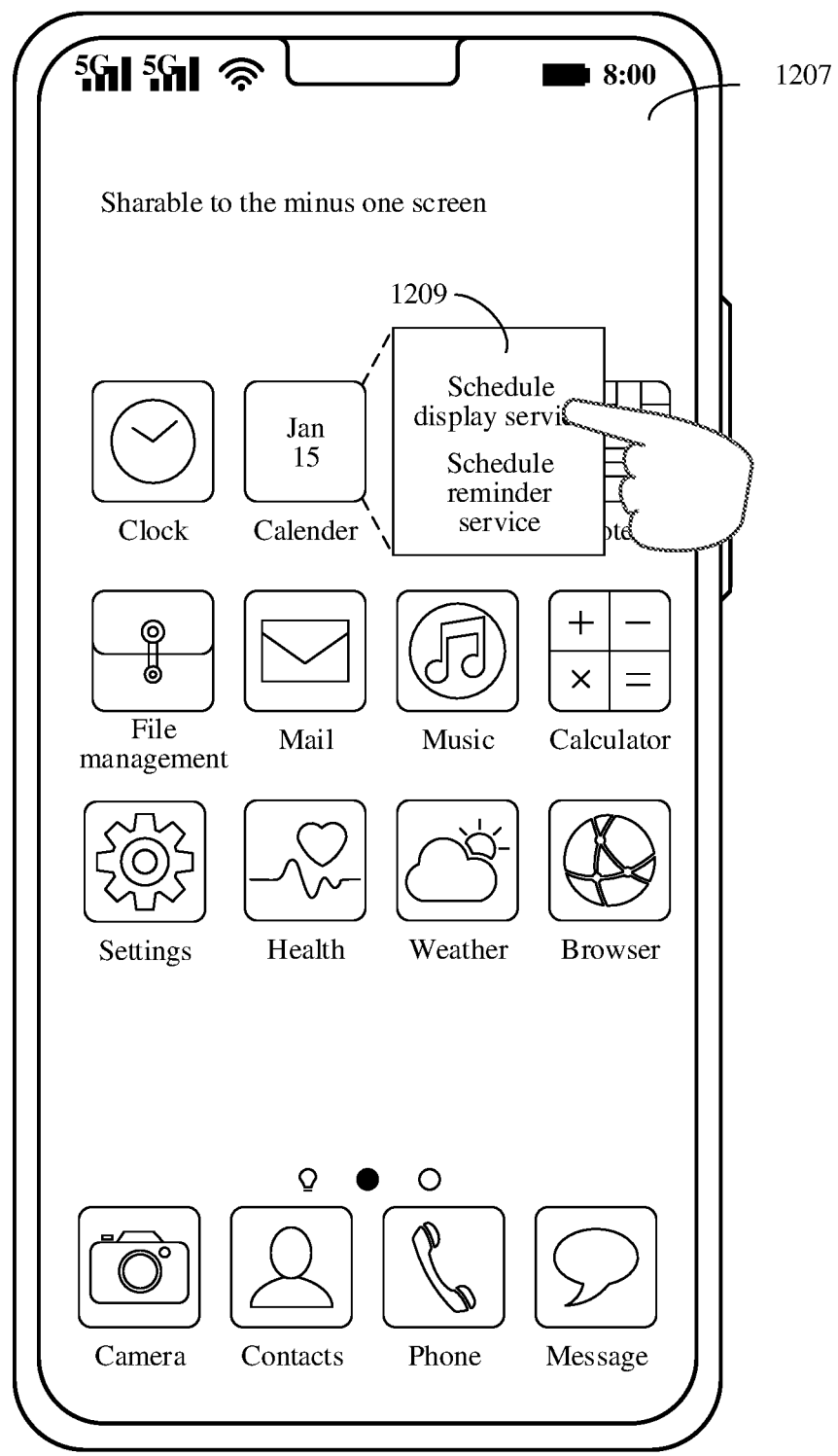
FIG. 12B(3)

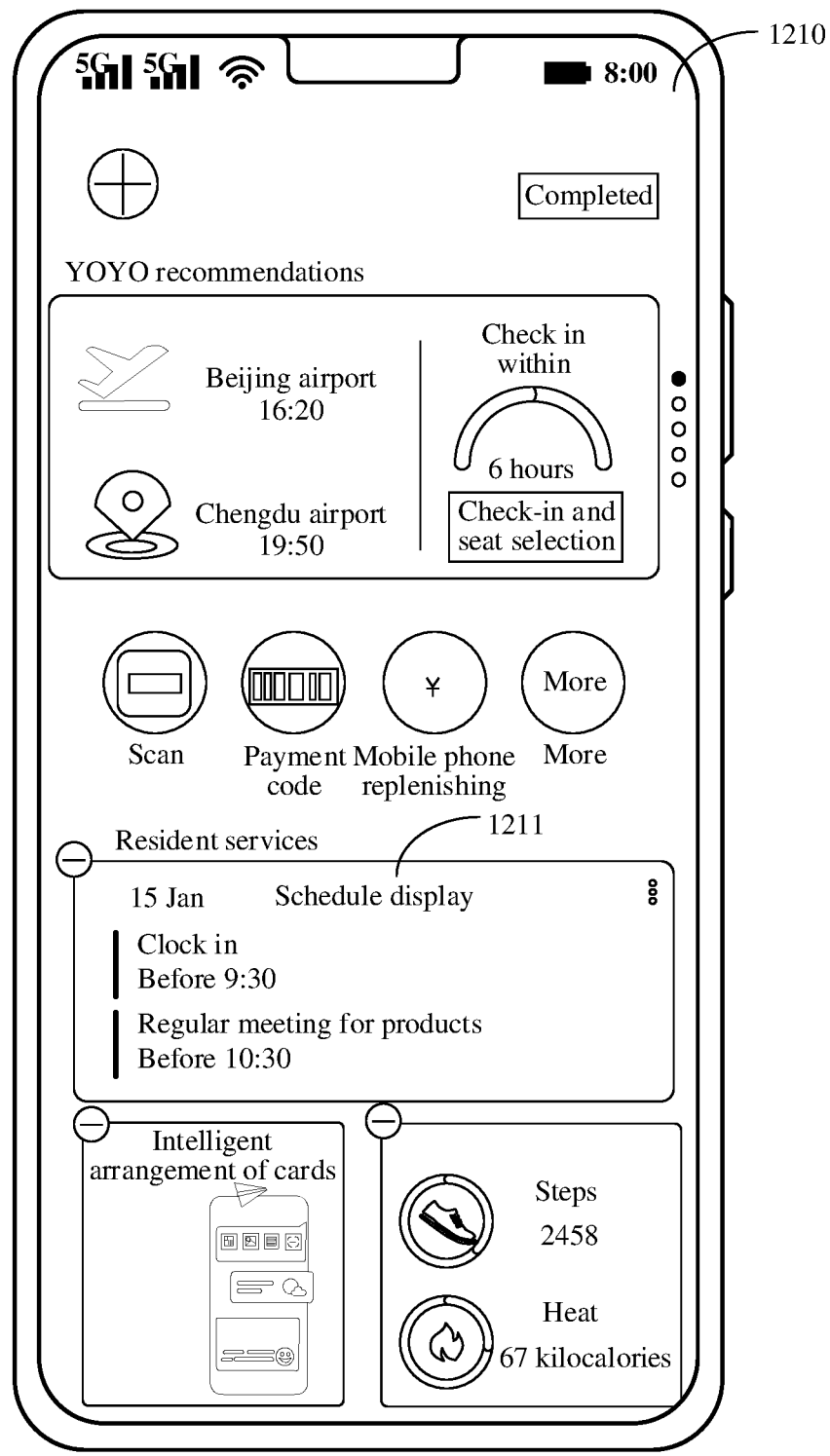
FIG. 12B(4)

CARD INFORMATION DISPLAY METHOD AND ELECTRONIC DEVICE

CROSS-REFERENCE TO RELATED APPLICATIONS

This application is a national stage of International Application No. PCT/CN2022/095069, filed on May 25, 2022, which claims priority to Chinese Patent Application No. 202110925118.5, filed on Aug. 12, 2021. The disclosures of both of the aforementioned applications are hereby incorporated by reference in their entireties.

TECHNICAL FIELD

This application relates to the technical field of terminals, and in particular, to a card information display method and an electronic device.

BACKGROUND

In the era with information explosion, information changes increasingly fast, and numerous information access channels are available for a user. Quickly obtaining desired effective information without disturbance from irrelevant information is urgently required by users. Currently, electronic devices push subscribed push information to a user through cards, which can achieve filtering of massive information.

However, as the amount of subscribed push information increases, the number of cards also increases. In this case, the user needs to flip through all cards to avoid missing important push information. Obviously, the human-computer interaction efficiency when a user views push information is still quite low.

SUMMARY

Embodiments of this application provide a card information display method and an electronic device. In the same interface, a system level recommendation card is used to prompt a user to view current push information that need to be viewed, and an application level service card is used to prompt a user to view subscribed push information. The combination of the two types of cards improves the human-computer interaction efficiency when a user views push information.

To achieve the foregoing objective, the following technical solutions are used in this application.

In a first aspect, an embodiment of this application provides a card information display method applicable to an electronic device. The method includes: receiving, by the electronic device, a first operation performed by a user; displaying, by the electronic device, a minus one screen in response to the first operation, where the minus one screen includes a first region and a second region.

The first region includes at least one first card, the first card is configured to display first information, the first information is from one or more applications, and the first information includes at least one of timing information, fence information, and status information.

For example, when the first information is from a meeting schedule of a calendar application, the first information may correspond to the timing information, that is, a meeting start time. For another example, when the first information is flight information from a flight booking application, the first information may correspond to the timing information, that is, a flight departure time. For another example, when the first information is a package pickup code from a logistics application, the first information may correspond to the fence information, that is, a geographical fence in a package pickup point. For example, when the first information is real-time exercise amount information from a health application, the first information may correspondingly include the status information, that is, a running state.

Certainly, timing information, fence information, and status information corresponding to different first information are determined based on contents carried in the first information and message types of the first information. For example, the electronic device includes a correspondence between different geographical names and fence information. In this way, the electronic device may extract geographical names from the first information to determine the fence information of the first information. For another example, the electronic device includes a correspondence between different message types and fence information. In this way, the electronic device may determine corresponding fence information based on the message type of the first information.

When at least one of the timing information, the fence information, and the status information of the first information meets a preset condition, the first card is pushed by the electronic device to the first region.

The second region includes at least one second card, the second card is associated with an application, and the second card is configured to display second information of the associated application. The second card is a card configured by the user, that is, a card created by the electronic device in response to a subscription operation performed by the user. When the first information is the same as the second information displayed in the second region, display of the corresponding first card is removed from the first region.

In the above embodiment, the electronic device prompts, at a proper time, in a proper space, or in a proper state, the user to view the first information from at least one application through the first card in the first region, thereby achieving intelligent pushing of push information for different applications. Moreover, the electronic device further displays the second information of associated applications to the user in real time through the second card, to help the user view subscribed information. In addition, when the first information of the first card is the same as the actual second information displayed in the second region, the display of the first card may be removed. It may be learned that, in the same interface, the user may view push information that currently needs to be viewed evaluated by the electronic device without a need to flip through all second cards. The contents of the first card and the second card displayed in the same interface are also different, which alleviates a problem that the user needs to repeatedly view the same push information. In this way, the human-computer interaction efficiency when the user views push information is effectively improved.

In some possible embodiments, the minus one screen includes a third region, and the third region includes function entry icons from one or more applications.

In the foregoing embodiment, the function entry icons provided in the minus one screen can further facilitate start of particular functions in the applications, which improves the human-computer interaction efficiency of the electronic device.

In some possible embodiments, a manner in which the timing information of the first information meets the preset condition includes: a time period indicated by the timing information of the first information includes a current system time of the electronic device.

The timing information may correspond to a time point. For example, a start time of the meeting schedule is 9 am, and the departure time of the flight information is 8 am. The time period indicated by the timing information may be a time interval including the time point. For example, the time period indicated by the timing information of the meeting schedule may be between 8 am and 9 am. For another example, the time period indicated by the timing information of the flight information may be between 4 am and 8 am. The time periods indicated by the timing information of different first information may be different, and the time periods indicated by different timing information may be pre-configured by the user.

When a system time of the electronic device belongs to the time period indicated by the timing information, the first information corresponding to the timing information is information that meets the preset condition. In this way, information may be pushed through the first card at a proper time.

In some possible embodiments, a manner in which the fence information of the first information meets the preset condition includes: a geographical region indicated by the fence information of the first information covers a current position of the electronic device.

The fence information may be one or a combination of a geographical fence, a Wi-Fi fence, a Bluetooth fence, or the like.

After the electronic device is located in the geographical region indicated by the fence information of the first information, the first information is also information that meets the preset condition. In this way, information may be pushed through the first card at a proper position.

In some possible embodiments, a manner in which the status information of the first information meets the preset condition includes: the status information of the first information is the same as a current state of the user holding the electronic device.

Motion information detected by an acceleration sensor, a gyroscope, or the like of the electronic device may be used to determine the current state of the user holding the electronic device.

After the current state of the user holding the electronic device is the same as the status information of the first information, the first information is also information that meets the preset condition. In this way, information may be pushed through the first card in a proper user state.

In some possible embodiments, before the displaying, by the electronic device, a minus one screen, the method further includes: obtaining, by the electronic device, a plurality of pieces of first information from different applications; and creating, by the electronic device, the first card based on the first information.

In some possible embodiments, the electronic device is pre-configured with demanded message lists corresponding to different user operations, and the obtaining, by the electronic device, a plurality of pieces of first information from different application includes: determining, by the electronic device, a corresponding demanded message list based on the received user operation, where the demanded message list includes at least one message type and a corresponding application; and obtaining, by the electronic device from the corresponding application based on the demanded message list, first information that matches the message type.

In the foregoing embodiment, when the electronic device recalls the first information, intelligent information filtering is realized for the user, which improves the accuracy of pushing information to the user, and alleviates impact of irrelevant information on the user.

In some possible embodiments, the method further includes: receiving, by the electronic device, a second operation when the minus one screen is displayed; displaying, by the electronic device, the editable minus one screen in response to the second operation; receiving, by the electronic device, a third operation performed by the user; displaying, by the electronic device, a desktop in an editable state in response to the third operation, where the desktop includes icons of a plurality of application; displaying, by the electronic device, a first application service corresponding to a first application when receiving an operation performed by the user on an icon of the first application; and creating, by the electronic device, a second card associated with the first application when receiving an operation performed by the user on the first application service, to display second information corresponding to the first application service.

In the foregoing embodiment, the second card may be created based on an application subscription behavior of the user, which ensures that the information displayed on the second card is information required by the user. In addition, the application subscription step for the user is simple, which improves the human-computer interaction efficiency of the electronic device.

In some possible embodiments, the method further includes: displaying, by the electronic device, a desktop of the electronic device when receiving a fourth operation performed by the user, where the desktop includes a third card, and the third card is configured to display the first information; determining, by the electronic device, that the third card has been processed; receiving, by the electronic device, the first operation; and displaying, by the electronic device, the minus one screen, where the minus one screen includes the folded first card.

In the foregoing embodiment, a problem of repeated information pushing to the user is alleviated, user experience of using the electronic device is improved, and the human-computer interaction efficiency of processing the push information is also improved.

In some possible embodiments, before the displaying a desktop of the electronic device, the method further includes: determining, by the electronic device, that the desktop includes the third card; and after the displaying a desktop of the electronic device, the method further includes: removing, by the electronic device, display of an intelligent access window corresponding to the third card.

In some possible embodiments, when the first region includes a plurality of first cards, the plurality of first cards are displayed in a stacked manner in the first region, and the first region includes a stack identifier displayed corresponding to the first card; after the displaying, by the electronic device, a minus one screen, the method further includes: receiving, by the electronic device, a first sliding operation performed by the user on the stack identifier; and switching, by the electronic device, to display of the masked first card in the first region in response to the first sliding operation; or receiving, by the electronic device, a second sliding operation performed by the user in the minus one screen; and unfolding, by the electronic device, all of the first cards for display in response to the second sliding operation.

In some possible embodiments, after the displaying, by the electronic device, a minus one screen, the method further includes: receiving, by the electronic device, a third sliding operation performed by the user in the minus one screen;

displaying, by electronic device, the hidden second card in the second region in response to the third sliding operation, where the first card displayed in the first region is maintained unchanged; receiving, by the electronic device, an operation performed by the user on a first control in the minus one screen; and displaying, by the electronic device, a second interface, where the second interface is configured to display all created second cards.

In a second aspect, an embodiment of this application further provides an electronic device. The electronic device includes one or more processors and a memory. The memory is coupled to the processor, the memory is configured to store computer program code, the computer program code includes computer instructions, and when the one or more processors execute the computer instructions, the one or more processors are configured to: receive a first operation inputted by a user; and display a minus one screen in response to the first operation. The minus one screen includes a first region and a second region. The first region includes at least one first card, the first card is configured to display first information, the first information is from one or more applications, and the first information includes at least one of timing information, fence information, and status information. When at least one of the timing information, the fence information, and the status information of the first information meets a preset condition, the first card is pushed to the first region. The second region includes at least one second card, the second card is associated with an application, and the second card is configured to display second information of the associated application. The second card is a card configured by the user. when the first information is the same as the second information displayed in the second region, display of the corresponding first card is removed from the first region.

In some possible embodiments, the minus one screen includes a third region, and the third region includes function entry icons from one or more applications.

In some possible embodiments, a manner in which the timing information of the first information meets the preset condition includes: a time period indicated by the timing information of the first information includes a current system time of the electronic device; a manner in which the fence information of the first information meets the preset condition includes: a geographical region indicated by the fence information of the first information covers a current position of the electronic device; and a manner in which the status information of the first information meets the preset condition includes: the status information of the first information is the same as a current state of the user holding the electronic device.

In some possible embodiments, before the electronic device displays the minus one screen, the one or more processors are further configured to obtain a plurality of pieces of first information from different application; and create the first card based on the first information.

In some possible embodiments, the electronic device is pre-configured with demanded message lists corresponding to different user operations, and the one or more processors are further configured to
  determine a corresponding demanded message list based on the received user operation, where the demanded message list includes at least one message type and a corresponding application; and obtain, from the corresponding application based on the demanded message list, first information that matches the message type.

In some possible embodiments, the one or more processors are further configured to: receive a second operation when the minus one screen is displayed; display the editable minus one screen in response to the second operation; receive a third operation performed by the user; display a desktop in an editable state in response to the third operation, where the desktop includes icons of a plurality of applications; display a first application service corresponding to a first application when receiving an operation performed by the user on an icon of the first application; and create a second card associated with the first application when receiving an operation performed by the user on the first application service, to display second information corresponding to the first application service.

In some possible embodiments, the one or more processors are further configured to: display a desktop of the electronic device when receiving a fourth operation performed by the user, where the desktop includes a third card, and the third card is configured to display the first information; determine that the third card has been processed; receive the first operation; and display the minus one screen, where the minus one screen includes the folded first card.

In some possible embodiments, before displaying the desktop of the electronic device, the one or more processors are further configured to determine that the desktop includes the third card; and after displaying the desktop of the electronic device, the one or more processors are further configured to remove display of an intelligent access window corresponding to the third card.

In some possible embodiments, when the first region includes a plurality of first cards, the plurality of first cards are displayed in a stacked manner in the first region, and the first region includes a stack identifier displayed corresponding to the first card;
  after displaying the minus one screen, the one or more processors are further configured to: receive a first sliding operation performed by the user on the stack identifier; and switch to display of the masked first card in the first region in response to the first sliding operation; or
  receive a second sliding operation performed by the user in the minus one screen; and
  unfold all of the first cards for display in response to the second sliding operation.

In some possible embodiments, after displaying the minus one screen, the one or more processors are further configured to: receive a third sliding operation performed by the user in the minus one screen; display the hidden second card in the second region in response to the third sliding operation, where the first card displayed in the first region is maintained unchanged; receive an operation performed by the user on a first control in the minus one screen; and display a second interface, where the second interface is configured to display all created second cards.

In a third aspect, an embodiment of this application provides a computer storage medium, including computer instructions. When the computer instructions are run on an electronic device, the electronic device is caused to perform the method in the foregoing first aspect and the possible embodiments.

In a fourth aspect, this application provides a computer program product. When the computer program product is run on the foregoing electronic device, the electronic device is caused to perform the method in the foregoing first aspect and the possible embodiments.

It may be understood that the electronic device, the computer-readable storage medium, and the computer program product provided in the foregoing aspects are all applicable to the foregoing corresponding method. Therefore, for beneficial effects that can be achieved by the electronic device, the computer-readable storage medium, and the computer program product, refer to beneficial effects in the foregoing corresponding method. Details are not described herein.

BRIEF DESCRIPTION OF DRAWINGS

FIG. 12A(1), FIG. 12A(2), FIG. 12A(3), and FIG. 12A(4) are seventh example display diagrams of a mobile phone according to an embodiment of this application;

FIG. 12B(1), FIG. 12B(2), FIG. 12B(3), and FIG. 12B(4) are fourteenth example display diagrams of a mobile phone according to an embodiment of this application;

DESCRIPTION OF EMBODIMENTS

Figure 1A:
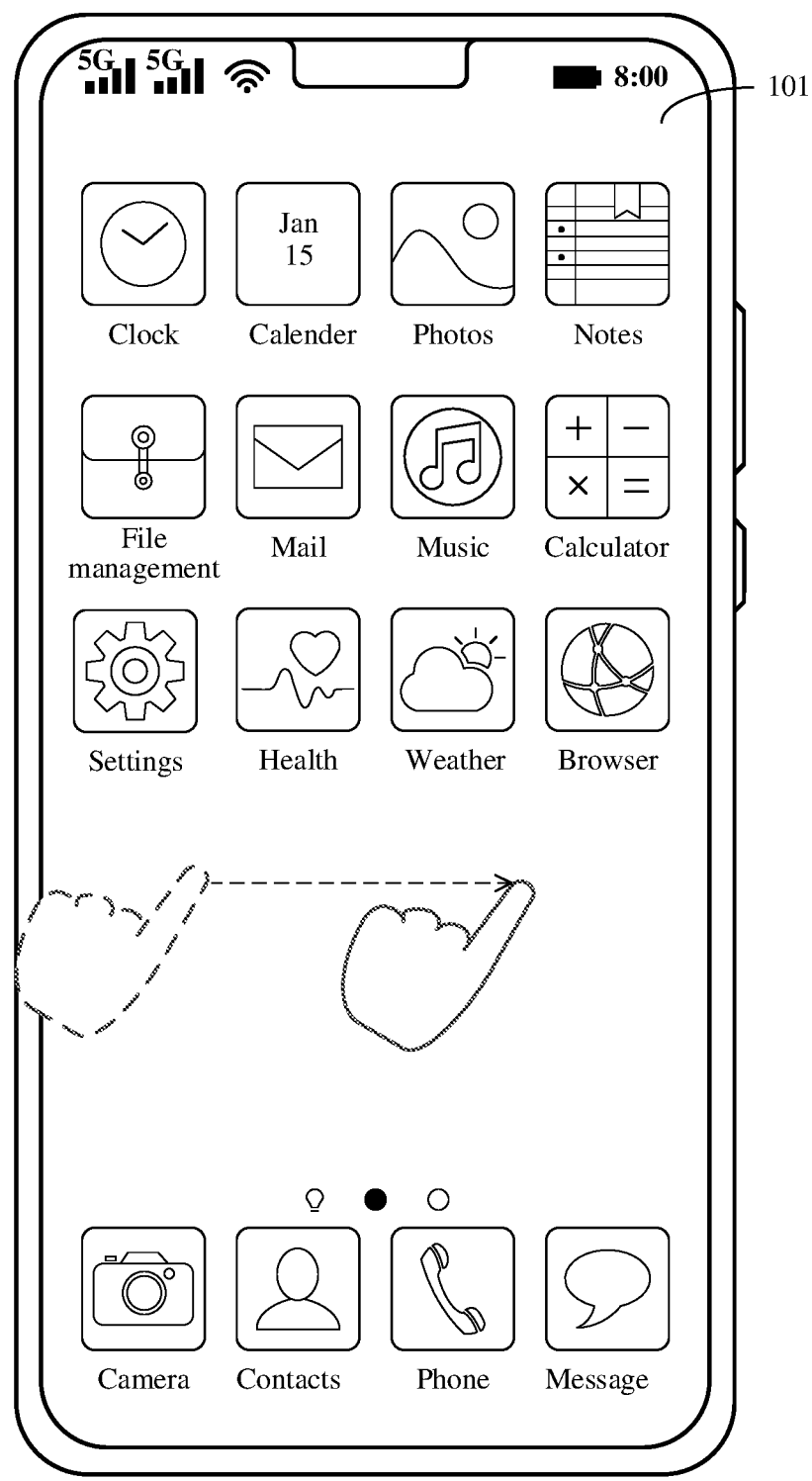
FIG. 1A and FIG. 1B are example diagrams of a minus one screen in the related art.

In the following, terms "first" and "second" are merely used for description, and should not be construed as indicating or implying relative importance or implicitly indicating a number of technical features that are indicated. Therefore, features defined by "first" and "second" may explicitly or implicitly include one or more such features. In the description of the embodiments, unless otherwise specified, "a plurality of" means two or more.

Implementations of the embodiments are described in detail below with reference to the drawings.

An embodiment of this application provides a card information display method applicable to a message pushing process of an electronic device.

In the era with information explosion, information changes increasingly fast, and numerous information access channels are available for a user. Quickly obtaining desired effective information without disturbance from irrelevant information is urgently required by users. How to provide effective information to a user and improve human-computer interaction efficiency when the user obtains the effective information become a direction of improvement for electronic devices.

In some embodiments, the effective information to be pushed to the user is also referred to as push information. The push information may be pushed in the electronic device in a form of notifications, cards, and floating windows.

In some embodiments, the push information in the form of cards may be collectively displayed on a minus one screen of the electronic device for viewing by the user. In other words, the minus one screen includes a plurality of cards. The cards are configured to display services and contents that the user has subscribed to. The contents displayed on the cards may be push information delivered from an information source that the user has subscribed to.

For example, the information source may be a device for delivering an application (application, APP)-related message, such as a message server corresponding to an application. The APP related message may be information related to an APP service, for example, a taxi-hailing APP-related message may be a taxi-hailing recommendation message.

For another example, the information source may be a device for delivering a system message, such as the electronic device or a system server. The system message may be relevant information corresponding to a system level application. For example, calendar APP-related information may be schedule information, and a health APP-related message may be a message for indicating a current exercise amount of a user. The system message may alternatively be a device status information recognized by the electronic device, such as an application usage duration.

For another example, the information source may alternatively be a device that can collect the same type of information from the internet.

In addition, each card may fixedly correspond to one information source. As the push information provided by the information source changes, the content displayed on the card is also updated. In this way, the user may grasp the subscribed push information by viewing the card in the minus one screen.

However, as the subscribed information sources increase, the cards in the minus one screen also increase. Moreover, the cards similarly display all push information provided by the information sources. In this way, each time the electronic device displays the minus one screen, the user needs to check all cards one by one to avoid missing push information that has a short time limit, a high degree of importance, a high degree of urgency, or a high degree of matching with a real-time scene. It may be learned that in the scene with many cards, the human-computer interaction efficiency when the user views the push information is relatively low.

For example, the minus one screen may be a user interface on a leftmost split screen of the electronic device, and is configured to provide the user with functions such as search, application recommendations, fast services, and intelligent scenes. When the electronic device receives an operation performed by the user to indicate that the minus one screen should be displayed, for example, receives a rightward sliding operation in a desktop 101 shown in FIG. 1A, which is referred to as, for example, a first operation, a minus one screen 103 shown in FIG. 1B may be displayed.

Figure 1B:
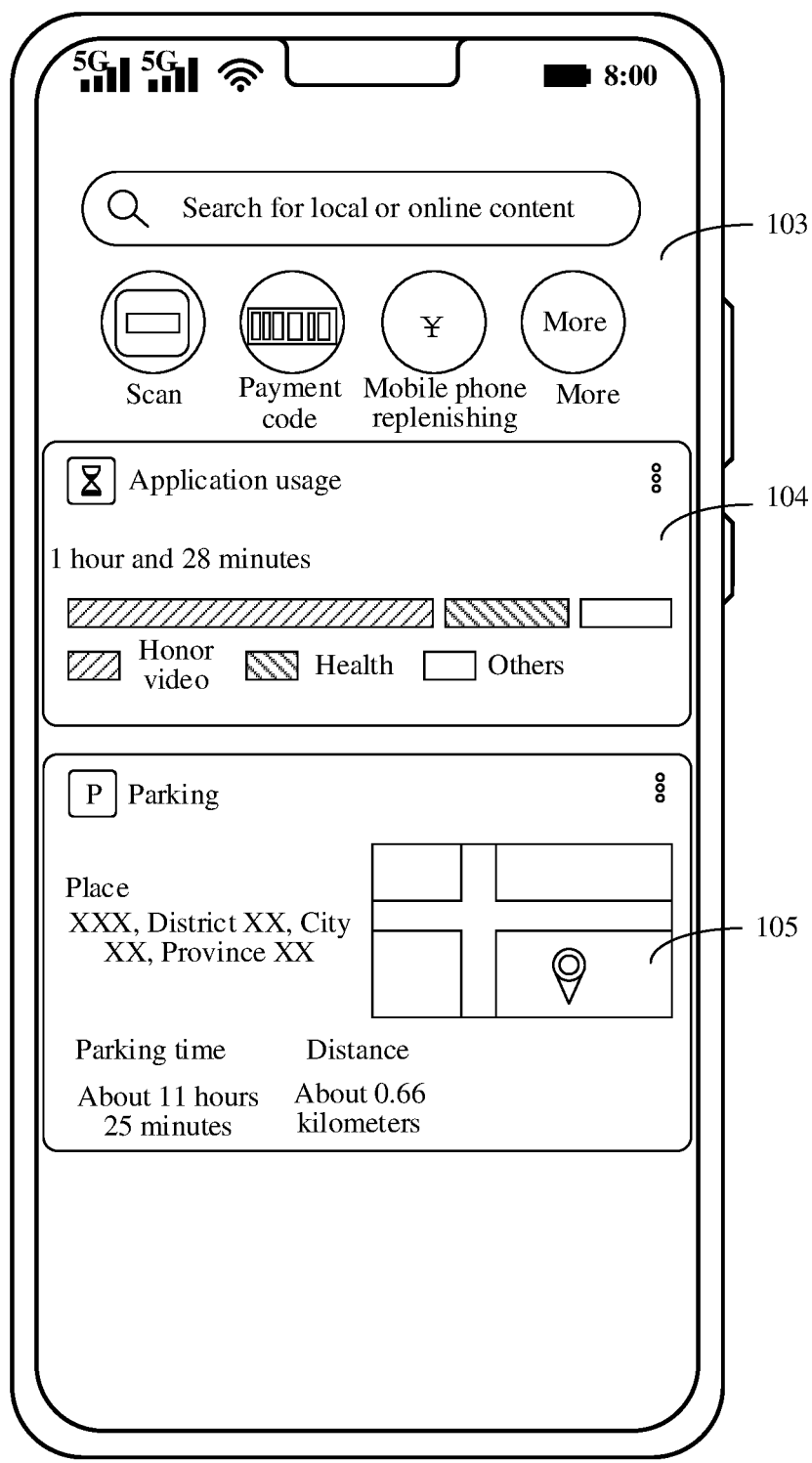

The minus one screen 103 shown in FIG. 1B includes some quick service functions, such as a quick entry (a payment code, a scan QR code, or the like) to a page of an application.

In addition, the minus one screen 103 further includes a plurality of cards for displaying push information delivered by subscribed information sources. For example, the minus one screen 103 includes a card 104 and a card 105. The information sources corresponding to the card 104 and the card 105 may be different, and the contents displayed in the card 104 and in the card 105 may also be different.

As shown in FIG. 1B, the card 104 is configured to display an application use message. The application use message is a system message that the user subscribes. In addition, the card 104 corresponds to a system interface including the application use information. When the user taps the card 104, the electronic device may display the system interface.

As shown in FIG. 1B, the card 105 is configured to display a parking message, the parking message is from a message server of a parking APP. In addition, the card 104 further corresponds to an application interface in the parking APP. When the user taps the card 105, the electronic device may display the application interface.

The above card 104 and card 105 are both configured to represent the push information that the user subscribes to. When the user configures few cards, the user can quickly view all subscription information on the minus one screen 103. When there are many cards, since the user does not know which card displays push information that needs to be urgently viewed, the user needs to flip through all of the cards, which reduces the human-computer interaction efficiency of the mobile phone.

In order to alleviate the problem, this application embodiment provides a card information display method, in which the minus one screen of the electronic device is divided into a recommendation region (for example, referred to as a first region) and a resident service region (for example, referred to as a second region).

The recommendation region includes a system level card, which is, for example, referred to as a recommendation card, and in other words, the first card. The recommendation card is created when push information that meets a preset conditions exists in the electronic device. In addition, the push information that meets the preset condition may be information that needs to be viewed by the user in a current scene and that is filtered out by the electronic device from all push information provided by the information sources.

For example, the filtered push information may be highly urgent push information in the current scene. For example, a meeting schedule reaches a meeting time. For another example, the filtered push information may be push information associated with the current scene. For example, if the current scene is a package pickup point, the associated push information is a package pickup code. For another example, the filtered push information may be highly important push information, such as a schedule with high importance in a current time period marked by the user.

In some examples, the recommendation card may be an interactive card. When the recommendation card displays push information of an application 1, the recommendation card may provide a start interface for starting the application 1. In this way, when the electronic device receives an operation performed by the user on the recommendation card, the electronic device may display an application interface in the application 1.

In addition, when the electronic device evaluates that the content displayed on the recommendation card no longer needs to be viewed by the user, the electronic device may remove or hide the display of the recommendation card. For example, when an operation performed by the user on the recommendation card is received or when the real-time scene no longer matches the push information of the recommendation card, the display of the recommendation card may be removed or hidden. Certainly, when a new recommendation card appears, the new recommendation card may replace the original recommendation card to be displayed at a top of the recommendation region.

The foregoing resident service region includes a plurality of application level cards, which are referred to as service cards, and in other words, a second card. The service card is a card created by the electronic device in response to an application subscription operation performed by the user. An association exists between the service card and the subscribed application. The application associated with the service card may also be referred to as an associated application.

In some examples, the service card may be configured to display push information provided by an information source of the associated application. When new push information is delivered from the information source of the associated application, the displayed content in the corresponding service card is also updated. In some other examples, the service card may further provide a start interface for the associated application. In other words, the user may trigger the electronic device to display an application interface provided by the associated application by clicking/tapping the service card. In addition, different from the recommendation card, the service card is displayed for a long term in the resident service region.

It may be learned that in this embodiment of this application, the information that the user subscribes to and the information required by the electronic device evaluated by the electronic device may be displayed in the same interface by using different levels of cards. In this way, not only the information that the user subscribed to can be displayed, but also the need for the user to flip through all of the cards to determine whether there is push information urgently needs to be processed can be reduced, thereby improving the human-computer interaction efficiency when the user views push the information.

Figure 2:
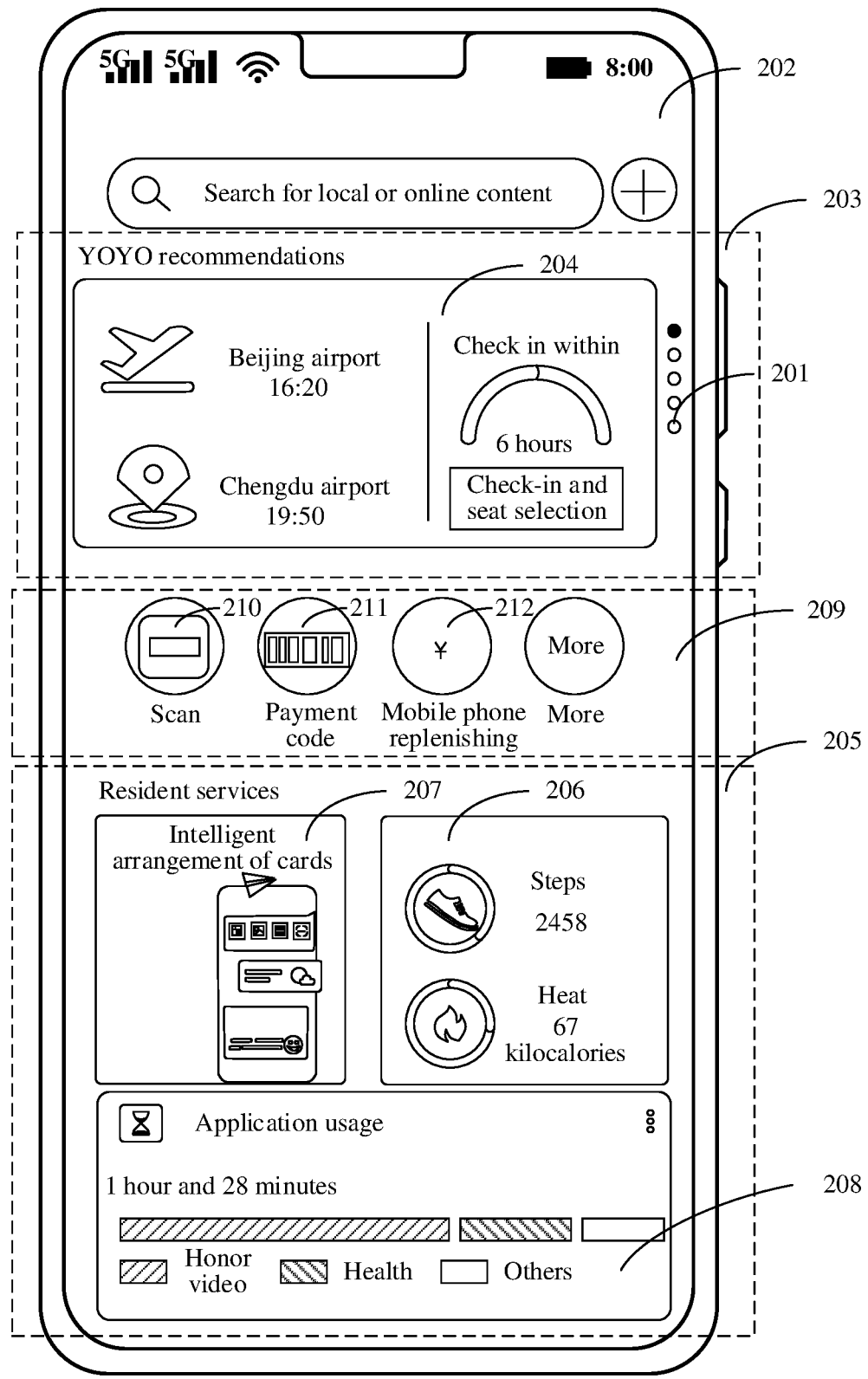
FIG. 2 is first example display diagram of an electronic device according to an embodiment of this application.

A mobile phone shown in FIG. 2 is used as an example. As shown in FIG. 2, a minus one screen 202 of the mobile phone includes a recommendation region 203, a resident service region 205, and a quick entry region 209.

In some embodiments, the recommendation region 203 displays the recommendation card 204. The recommendation card 204 includes flight information provided by a flight booking APP. The flight information is push information that currently needs to be viewed by a user evaluated by the mobile phone from a plurality of pieces of push information. When the mobile phone an operation performed by the user on the recommendation card 203, the flight booking APP may be started.

A specific method for the mobile phone to evaluate the push information that needs to be viewed by the user is illustrated in subsequent embodiments in combination with specific examples. Details are not described herein.

In some embodiments, if a plurality of recommendation cards exist, a card stack composed of the plurality of recommendation cards may be displayed in the recommendation region 203. A recommendation card located at a top of the card stack may be directly displayed in the recommendation region 203. In addition, the recommendation region 203 further includes a stack identifier 201. The stack identifier 201 is displayed corresponding to the recommendation cards 204. The stack identifier 201 may be configured to prompt the user to view another recommendation card through flipping or the like. When the mobile phone receives a first sliding operation performed on the stack identifier 201, the mobile phone may switch to display of the recommendation cards in the card stack.

In some examples, the recommendation cards in the card stack may be arranged in the order in which the recommendation cards are created, with the recommendation card created latest arranged at the top of the card stack. In this way, when the user flips through the recommendation cards, the user may preferentially view the card with the latest create time. In some other examples, the mobile phone may evaluate priorities of the recommendation card based on a preset rule, rank the recommendation cards based on the priorities of the pushed information, and arrange the recommendation card with the highest priority at the top of the card stack. In this way, when the user flips through the recommendation cards, the user may preferentially view the card with the high priority.

In some embodiments, the resident service region 205 displays a service card 206, a service card 207, and a service card 208. The service card 206, the service card 207, and the service card 208 are in a one-to-one correspondence with a health APP, an intelligent card APP, and an application management APP that the user subscribes to. The service card 206 is configured to display push information corresponding to the health APP, the service card 207 is configured to display push information corresponding to the intelligent card APP, and the service card 208 is configured to display push information corresponding to the application management APP. When the push information corresponding to the application is updated, the content displayed in the service card is also updated. Although the content of the service card may change, the service card may residue in the resident service region 205 for a long term. Certainly, when the user unsubscribes from the information of the application corresponding to the service card, the display of the service card may be removed from the resident service region 205.

When receiving an operation performed by the user on the service card 206, such as a clicking/tapping operation, the mobile phone may display an application interface of the health APP. When receiving an operation performed by the user on the service card 207, such as a clicking/tapping operation, the mobile phone may display an application interface of the intelligent card APP. When receiving an operation performed by the user on the service card 208, such as a clicking/tapping operation, the mobile phone may display an application interface of the application management APP.

In other words, in a minus one screen of the mobile phone, the resident service region 205 is used to display the push information of the application that the user subscribes to in a long-term and stable manner. In addition, the push information required by the user evaluated by the mobile phone is preferentially displayed in combination with recommendation region 203. In this way, the display advantages of the two types of push information manners are fully combined, which ensures that users can receive comprehensive subscription information and quickly obtain the push information currently required by the user, thereby improving the human-computer interaction efficiency when the user views the push information.

In some embodiments, the foregoing quick function entry region 209, also referred to as a third region, includes at least one function entry icon, such as an icon 210, an icon 211, and an icon 212. The function entry icon corresponds to a specified function of an application. When receiving an operation performed on the function entry icon, the mobile phone may enable a corresponding function. For example, when receiving an operation performed on the icon 210, a scanning function may be enabled.

In addition to the mobile phone, the foregoing electronic device may also be another electronic device having a display, such as a television, a tablet computer, a desktop computer, a laptop computer, a handheld computer, a notebook computer, a personal computer (personal computer, PC), a netbook, or a personal digital assistant (personal digital assistant, PDA). No special limitation is imposed on a specific form of the electronic device in this embodiment of this application.

Figure 3:
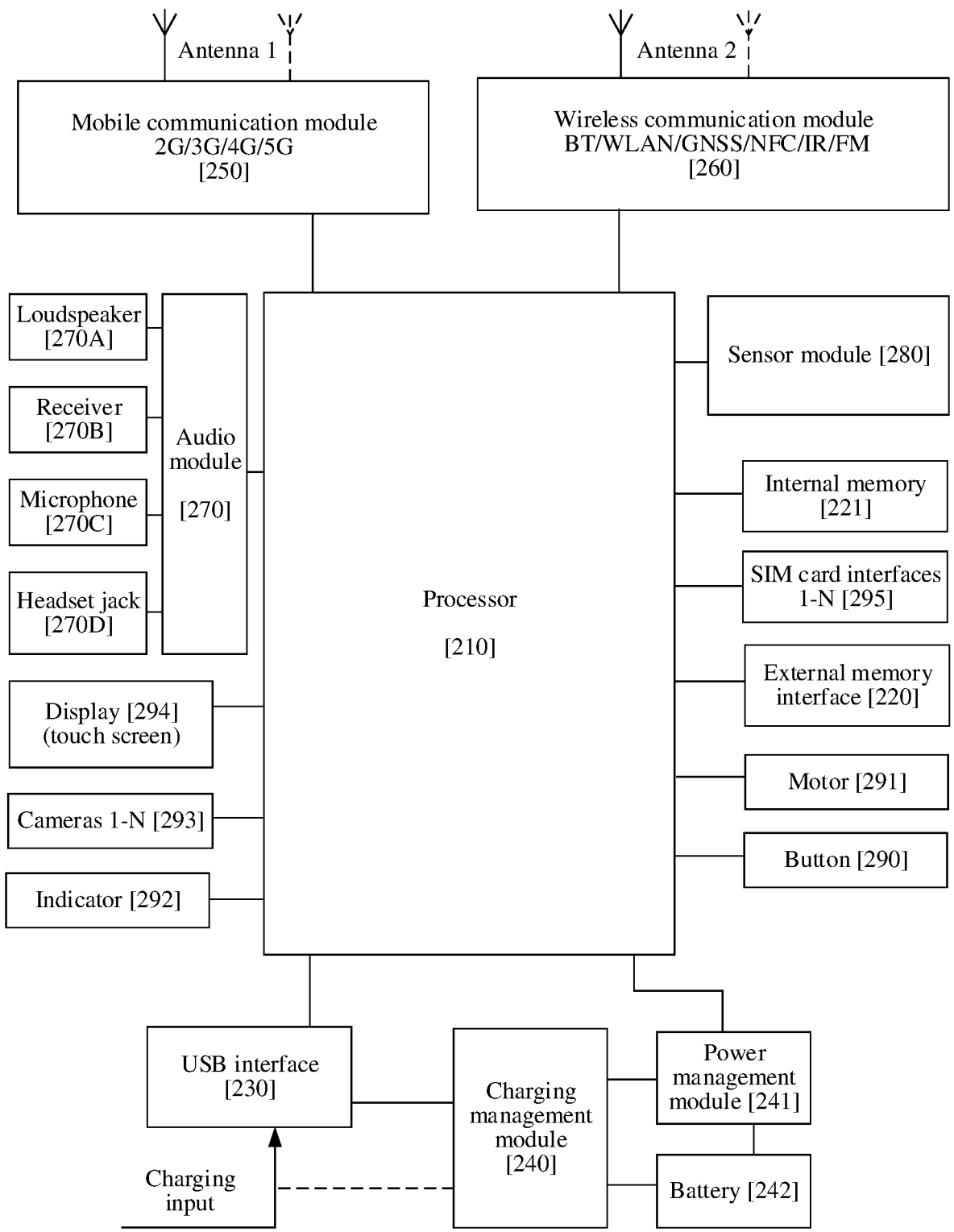
FIG. 3 is a schematic diagram of a hardware structure of the electronic device according to an embodiment of this application.

As shown in FIG. 3, in this embodiment of this application, an electronic device (such as a mobile phone) is used as an example to illustrate a structure of the electronic device provided in this embodiment of this application. The electronic device (such as a mobile phone) may include a processor 210, an external memory interface 220, an internal memory 221, a universal serial bus (universal serial bus, USB) interface 230, a charging management module 240, a power management unit 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identity module (subscriber identification module, SIM) card interface 295, and the like.

The sensor module 280 may include a sensor such as a pressure sensor, a gyroscope sensor, a barometric pressure sensor, a magnetic sensor, an acceleration sensor, a distance sensor, an optical proximity sensor, a fingerprint sensor, a temperature sensor, and a touch sensor, an ambient light sensor, and a bone conduction sensor.

It may be understood that the schematic structure in this embodiment constitutes no specific limitation on the electronic device. In some other embodiments, the electronic device may include more or fewer components than those shown in the figure, or some components may be combined, or some components may be split, or a different component arrangement may be used. The illustrated components may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be separate devices, or may be integrated into one or more processors.

The controller may be a core component and a command center of the electronic device. The controller may generate an operation control signal according to an instruction operation code and a timing signal, to control instruction fetch and instruction execution.

A memory may be further disposed in the processor 210 to store instructions and data. In some embodiments, the memory of the processor 210 is a cache. The memory may store instructions or data that the processor 210 has just used or used cyclically. If the processor 210 needs to use the instructions or the data again, the processor may directly invoke the instructions or the data from the memory. This avoids repeated access, and reduces a waiting time of the processor 210, and therefore improves system efficiency.

In some embodiments, the processor 210 may include one or more interfaces. The interfaces may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that the interface connection relationship between the modules shown in this embodiment is merely an example, and does not constitute a limitation on the structure of the electronic device. In some other embodiments, the electronic device may alternatively use an interface connection manner different from that in the foregoing embodiment, or use a combination of a plurality of interface connection manners.

The charging management module 240 is configured to receive a charging input from a charger. The charger may be a wireless charger or a wired charger. The charging management module 240 may further supply power to the electronic device through a power management module 241 while charging the battery 242.

The power management module 241 is configured to be connected to the battery 242, the charging management module 240, and the processor 210. The power management module 241 receives an input from the battery 242 and/or the charging management module 240, to supply power to the processor 210, the internal memory 221, the external memory, the display 294, the camera 293, the wireless communication module 260, and the like. In some other embodiments, the power management module 241 and the charging management module 240 may alternatively be disposed in a same device.

A wireless communication function of the electronic device may be implemented through the antenna 1, the antenna 2, the mobile communication module 250, the wireless communication module 260, the modem processor, and the baseband processor. In some embodiments, the antenna 1 and the mobile communication module 250 of the electronic device are coupled, and the antenna 2 and the wireless communication module 260 of the electronic device are coupled, so that the electronic device may communicate with a network and another device by using a wireless communication technology, for example, may communicate with a wearable device.

The antenna 1 and the antenna 2 are configured to transmit or receive an electromagnetic wave signal. Each antenna in the electronic device may be configured to cover one or more communication frequency bands. Different antennas may be multiplexed to increase an antenna utilization. For example, the antenna 1 may be multiplexed into a diversity antenna of a wireless local area network. In some other embodiments, the antenna may be used together with a tuning switch.

The mobile communication module 250 may provide a wireless communication solution including 2G/3G/4G/5G and the like applicable to the electronic device. The mobile communication module 250 may include at least one filter, a switch, a power amplifier, a low noise amplifier (low noise amplifier, LNA), and the like. The mobile communication module 250 may receive an electromagnetic wave by using the antenna 1, perform processing such as filtering and amplification on the received electromagnetic wave, and transmit the electromagnetic wave to the modem processor for demodulation.

The mobile communication module 250 may further amplify a signal modulated by the modem processor, and convert the signal into an electromagnetic wave by using the antenna 1 for radiation. In some embodiments, at least some functional modules of the mobile communication module 250 may be disposed in the processor 210. In some embodiments, at least some functional modules of the mobile communication module 250 may be disposed in a same device as at least some modules of the processor 210.

The wireless communication module 260 may provide wireless communication solutions applicable to the electronic device, including WLAN (for example, a (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC), an infrared (infrared, IR) technology, and the like.

The GNSS may include a Beidou navigation satellite system (beidou navigation satellite system, BDS), a global positioning system (global positioning system, GPS), a global navigation satellite system (global navigation satellite system, GLONASS), a quasi-zenith satellite system (quasi-zenith satellite system, QZSS), and/or a satellite based augmentation systems (satellite based augmentation systems, SBAS).

The wireless communication module 260 may be one or more devices into which at least one communication processing module is integrated. The wireless communication module 260 receives an electromagnetic wave by using the antenna 2, performs frequency modulation and filtering on the electromagnetic wave signal, and transmits a processed signal to the processor 210. The wireless communication module 260 may further receive a to-be-transmitted signal from the processor 210, perform frequency modulation and amplification on the to-be-transmitted signal, and convert the to-be-transmitted signal into an electromagnetic wave by using the antenna 2 for radiation.

The electronic device implements a display function by using the GPU, the display 294, the application processor, and the like. The GPU is a microprocessor for image processing and connects the display 294 and the application processor. The GPU is configured to perform mathematical and geometric calculations and graphics rendering. The processor 210 may include one or more GPUs configured to execute program instructions to generate or change display information.

The display 294 is configured to display an image, a video, and the like. The display 294 includes a display panel.

The electronic device may implement a photographing function by using the ISP, the camera 293, the video codec, the GPU, the display 294, the application processor, and the like. The ISP is configured to process data fed back by the camera 293. The camera lens 293 is configured to capture a static image or a video. In some embodiments, the electronic device may include 1 or N cameras 293, where N is a positive integer greater than 1.

The external memory interface 220 may be configured to connect an external storage card such as a Micro SD card, to improve a storage capacity of the electronic device. The external storage card communicates with the processor 210 by using the external memory interface 220 to implement a data storage function. For example, files such as music and videos are stored in the external storage card.

The internal memory 221 may be configured to store computer-executable program code. The executable program code includes instructions. The processor 210 executes various function applications and data processing of the electronic device by running the instructions stored in the internal memory 221. For example, in this embodiment of this application, the processor 210 may execute the instructions stored in the internal memory 221, and the internal memory 221 may include a program storage area and a data storage area.

The program storage area may store an operating system, an application required for at least one function (for example, a sound playing function or an image playing function), and the like. The data storage area may store data (for example, audio data, a phone book, or the like) created during use of the electronic device. In addition, the internal memory 221 may include a high-speed random access memory, or may include a non-volatile memory such as at least one magnetic disk storage device, a flash memory device, and a universal flash storage (universal flash storage, UFS).

It may be understood that the schematic structure in the embodiments of this application constitutes no specific limitation on the electronic device. In some other embodiments of this application, the electronic device may include more or fewer components than those shown in the figure, or some components may be combined, or some components may be split, or a different component arrangement may be used. The illustrated components may be implemented by hardware, software, or a combination of software and hardware.

Methods in the following embodiments all may be implemented in a device having the foregoing hardware structure. The methods provided in the embodiments of this application are described below by using a mobile phone as the electronic device.

In the embodiments of this application, the foregoing recommendation card is a system level card, which may be automatically created by the mobile phone in a set condition.

In an implementation, the set condition may be a pre-configured specific condition. For example, the set condition may be that a time reaches a specific time point. For example, if the specific time point is 9 a.m., meeting the set condition may be that a system time reaches 9 a.m. For another example, the set condition may be being located in a specific spatial area. For example, if the specific spatial area is a residential area, meeting the set condition may be that the mobile phone is located in the residential area. For another example, the set condition may be that a user holding the mobile phone is in a specific movement state is detected. For example, if the specific movement state is a moving state, meeting the set condition may be that collected movement data indicates that the user is in a running state.

In another implementation, the set condition may be that push information that meets a preset condition is determined. The push information that meets the preset condition, also referred to as push information 1, is information that currently needs to be viewed by the user determined by the mobile phone from push information from a plurality of applications.

The applications may be applications installed in the mobile phone or applications not installed in the mobile phone. In addition to third-party applications, the applications may alternatively be system applications. In other words, in the embodiments of this application, there is no specific restriction on the source of the push information of the recommendation card.

Figure 4:
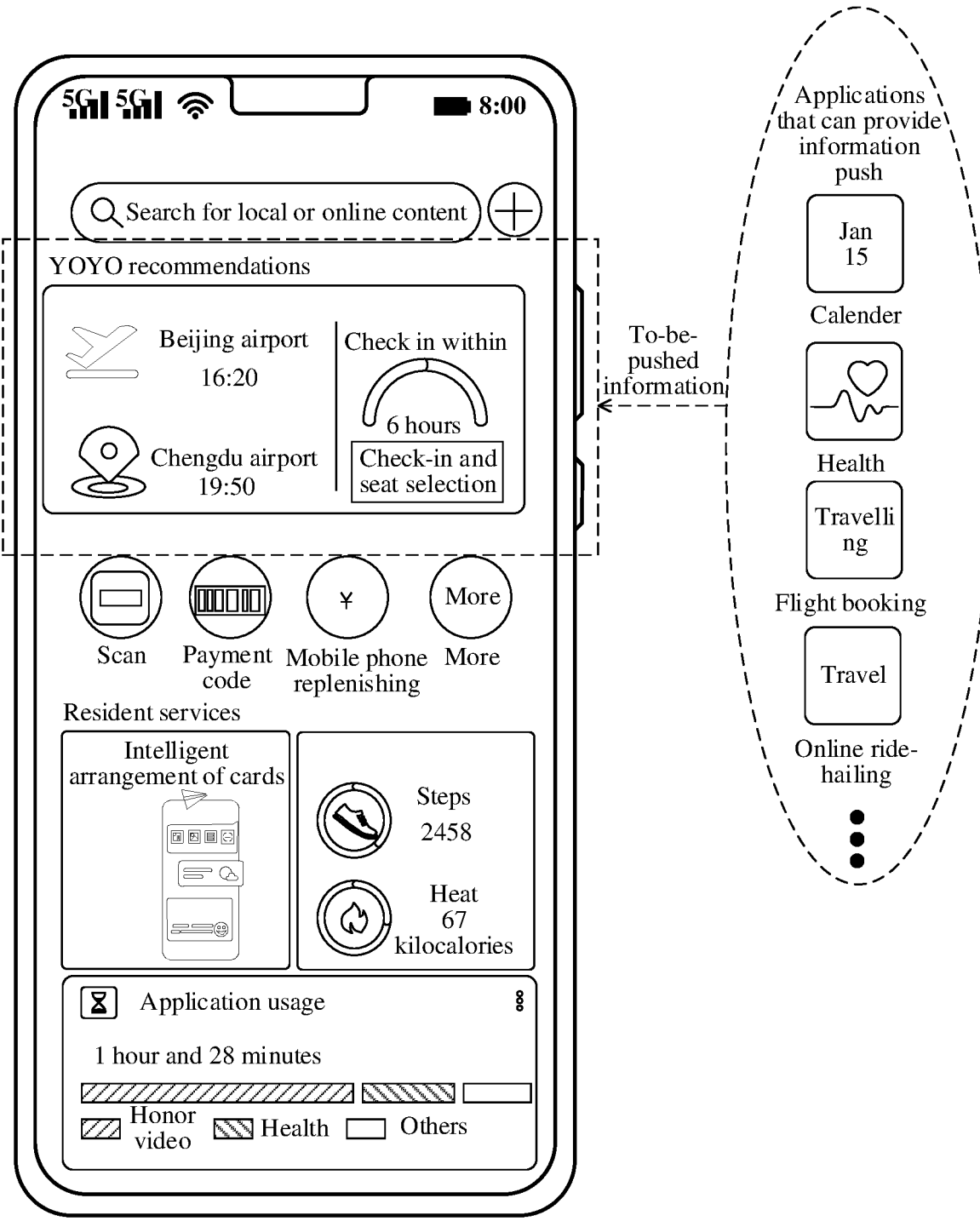
FIG. 4 is a first example display diagram of a mobile phone according to an embodiment of this application.

For example, in FIG. 4, the mobile phone may receive push information from applications such as a calendar APP, a health APP, a flight booking APP, and an online ride-hailing APP. When there is a large amount of push information, the mobile phone may evaluate, from the large amount of push information, push information that needs to be viewed by the user in a current scene. If no push information needs to be viewed by the user in the current scene, no recommendation card is created. If the push information needs to be viewed by the user in the current scene exists, such as flight information in the flight booking APP, a corresponding recommendation card is created based on the flight information.

In an implementation, the mobile phone may actively recall push information from a plurality of message servers, and then determine the push information 1 from the recalled push information.

Figure 5:
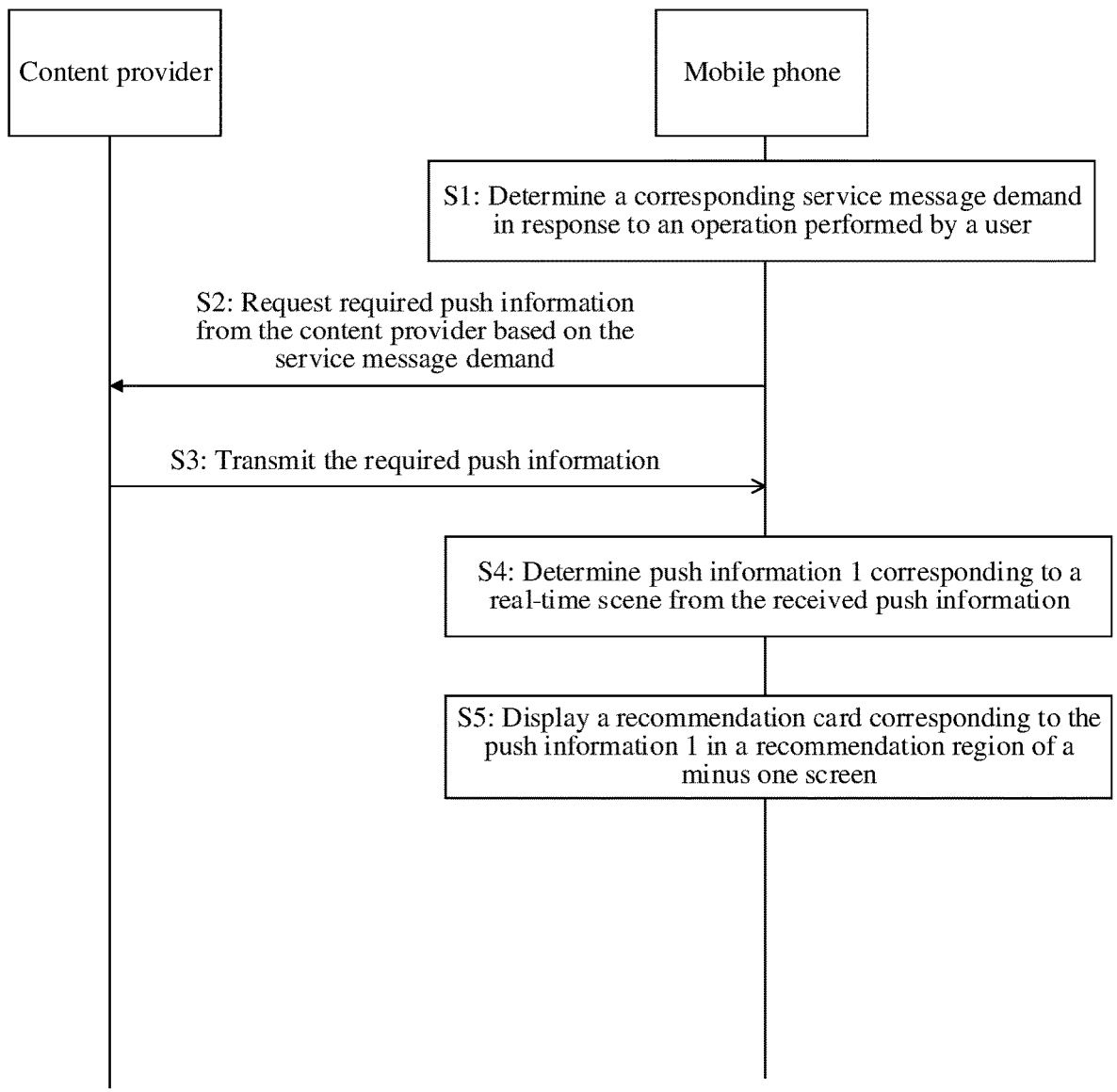
FIG. 5 is an interaction diagram of a card information display method according to an electronic device of this application.

As shown in FIG. 5, a method provided in this embodiment of this application may include the following steps.

S1: A mobile phone determines a corresponding service message demand in response to an operation performed by a user.

In some embodiments, a correspondence between different user operations and service message demands may be pre-configured in the mobile phone. In this way, after receiving the operation performed by the user on the mobile phone, the mobile phone may determine the corresponding service message demand by querying the pre-configured correspondence.

In the correspondence configured in the mobile phone, a user operation may be used to indicate a service. For example, a flight booking operation may be used to indicate a travel service. In addition, the service message demand may be a demanded message list. The demanded message list may be used to indicate type of messages that need to be pushed by the mobile phone in a service cycle (such as a travel cycle). In addition, one service message demand may include push information corresponding to one or more applications.

For example, a corresponding service message demand indicating the flight booking operation may be shown in Table 1.

TABLE 1

| Application | Message type |
|---|---|
| Flight booking APP | Flight booking success information (including basic flight ticket information) |
| Flight booking APP | Check-in and seat selection notification |
| Flight booking APP | Departure reminder (checked in) |
| Online ride-hailing APP | Reminder for riding to the airport |
| Weather APP | Sudden abnormal weather |

For example, a corresponding service message demand indicating a goods ordering operation may be shown in Table 2.

TABLE 2

| Application | Message type |
|---|---|
| Shopping APP | Basic order information |
| Package APP | Logistics information |
| Shopping APP | Receipt reminder information |

For another example, a corresponding service message demand indicating an exercise amount configuring operation or an operation of logging into a personal account in a health APP may be shown in Table 3.

TABLE 3

| Application | Message type |
|---|---|
| Health APP | Real-time exercise amount information |

For example, a corresponding service message demand indicating an operation of installing a specific application (such as an application used to provide identification code) may include real-time identification code information. For example, a corresponding service message demand indicating an operation of installing a bus APP may include a real-time riding QR code. For example, a corresponding service message demand indicating an operation of installing an information push application (such as a news APP) may include real-time information.

In some other embodiments, an artificial intelligence (artificial intelligence, AI) model pre-configured in the mobile phone may be configured to determine a matched message type, that is, a message type that matches a service indicated by the user operation. In this way, after receiving the user operation, the mobile phone may use the AI model to analyze a type of to-be-pushed information, thereby determining a corresponding service message demand.

S2: The mobile phone requests required push information from a content provider based on the service message demand.

In some embodiments, the content provider may be a message server corresponding to a plurality of applications.

Figure 6:
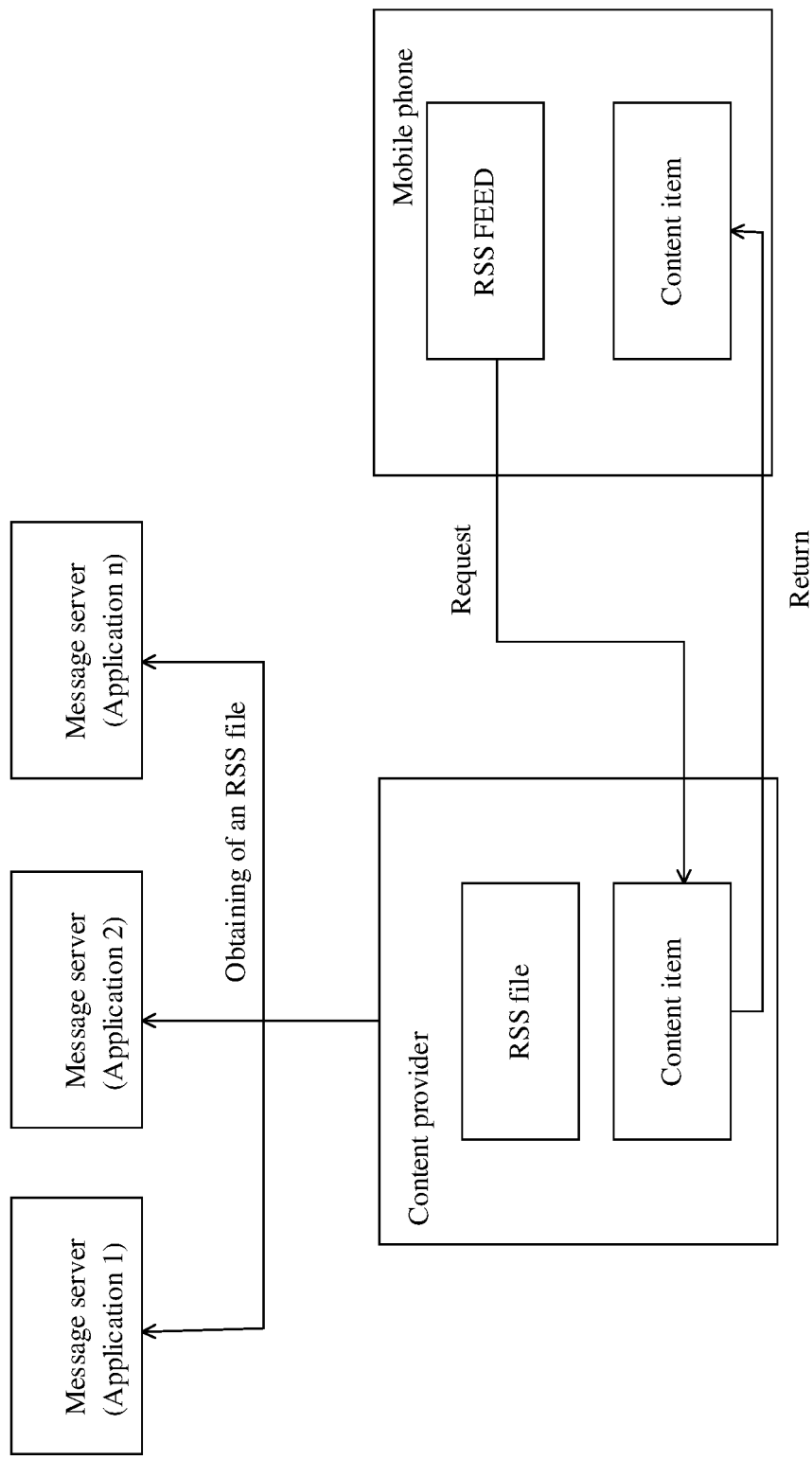
FIG. 6 is a conceptual schematic diagram in which the mobile phone recalls required push information for mobile phone recall according to an electronic device of this application.

In some other embodiments, the content provider may also be a proxy device between the message server corresponding to a plurality of applications and the mobile phone. As shown in FIG. 6, the content provider is communicatively connected to a plurality of message servers, and may be communicatively connected to the mobile phone. A really simple syndication (really simple syndication, RSS) feed module in the mobile phone may transmit an information syndication request to the content provider, to request the push information indicated by the service message demand. It may be learned that the RSS feed module is configured to syndicate the push information indicated by the service message demand.

In some embodiments, after receiving the information syndication request, the content provider obtains an RSS file of a corresponding message server based on the corresponding service message demand. Then the content provider may recall the required push information from the message server based on the obtained RSS file.

S3: A content provider transmits the push information to the mobile phone.

In some embodiments, the content provider obtains the push information that matches the service message demands and transmits the push information to the mobile phone. For example, the service message demand is shown in Table 1. The content provider suddenly obtains abnormal weather reminder information of a destination from a message server of the weather APP. The abnormal weather reminder information matches the service information requirement and is pushed to the mobile phone. For another example, the service message demand is shown in Table 1. After an RSS file of the flight booking APP is obtained, flight booking success information may be immediately obtained and is pushed to the mobile phone.

S4: The mobile phone determines push information 1 from the received push information.

In some embodiments, the mobile phone may syndicate push information transmitted by the plurality of message servers. In this embodiment, the push information recalled by the mobile phone is also referred to as first information. When the first information meets the preset condition, the first information may be displayed in a recommendation card and pushed to a recommendation region.

In an implementation, the first information may correspond to at least one of timing information, fence information, and status information. The timing information, the fence information, and the status information may be determined based on an actual content of the first information and a message type of the first information. For example, when the actual content of the first information includes a specific time point, the first information may correspond to the timing information. When the actual content of the first information includes a geographical name, the first information may correspond to the fence information. For example, when the message type of the first information is associated with fence information, the first information may correspond to the fence information. When the message type of the first information is associated with the status information, the first information may correspond to the status information.

When at least one of the timing information, the fence information, and the status information of the first information meets the preset condition, it may be determined that the first information is information that currently needs to be viewed in a current scene, that is, the push information 1.

In some possible embodiments, a manner in which the timing information of the first information meets the preset condition includes: a time period indicated by the timing information of the first information includes a current system time of the mobile phone. The timing information may correspond to a time point. The time period indicated by the timing information may be a time interval including the time point. The time periods indicated by the timing information of different first information may be different, and may be pre-configured by the user. When a current system time of the mobile phone belongs to the time period indicated by the timing information, the first information corresponding to the timing information is information that meets the preset condition.

In some possible embodiments, a manner in which the fence information of the first information meets the preset condition includes: a geographical region indicated by the fence information of the first information covers a current position of the mobile phone. After the mobile phone is located in the geographical region indicated by the fence information of the first information, the first information is also information that meets the preset condition.

In some possible embodiments, a manner in which the status information of the first information meets the preset condition includes: the status information of the first information is the same as a current state of the user holding the mobile phone. The status information may include a running state, a walking state, and a stationary state. Motion information detected by an acceleration sensor, a gyroscope, or the like of the mobile phone may be used to determine the current state corresponding to the user holding the mobile phone. After the current state of the user is the same as the status information of the first information, the first information is also information that meets the preset condition.

In addition, the mobile phone may intelligently recognize the real-time scene in which the user is located. Then the mobile phone may determine the push information 1 from the syndicated push information based on the recognized real-time scene.

In some embodiments, the real-time scene may be indicated by a feature of at least one of a space, a time, a user status, and the like.

For example, the mobile phone may recognize a spatial scene in which the mobile phone is located, determine push information that needs to be viewed by the user in the spatial scene by using a pre-configured correspondence between the spatial scene and the push information required by the user, and then determine the push information 1 from the push information syndicated by the mobile phone.

Figure 7A:
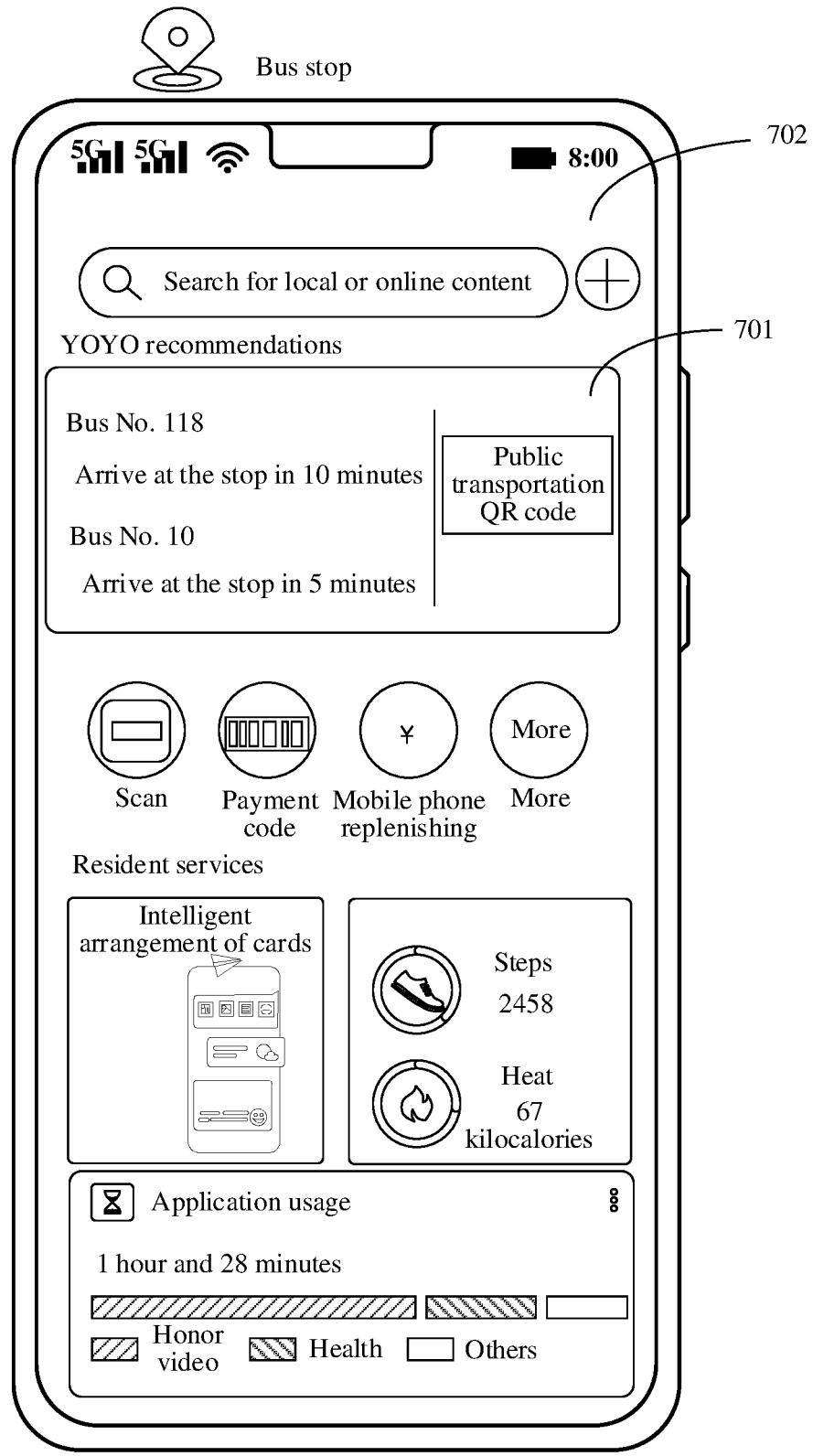
FIG. 7A and FIG. 7B are second example display diagrams of a mobile phone according to an embodiment of this application.

For example, as shown in FIG. 7A, the mobile phone enters a bus stop with the user. It is pre-assumed that the user will use a riding code and query bus schedule information at the bus stop. In this case, when the mobile phone recognizes that the mobile phone is located at the bus stop, the mobile phone determines that the schedule information and the riding code are the push information that needs to be viewed by the user. Then, if the mobile phone finds that the syndicated push information includes the schedule information and the riding code, the schedule information and the riding code that are found are determined as the push information 1.

Figure 7B:
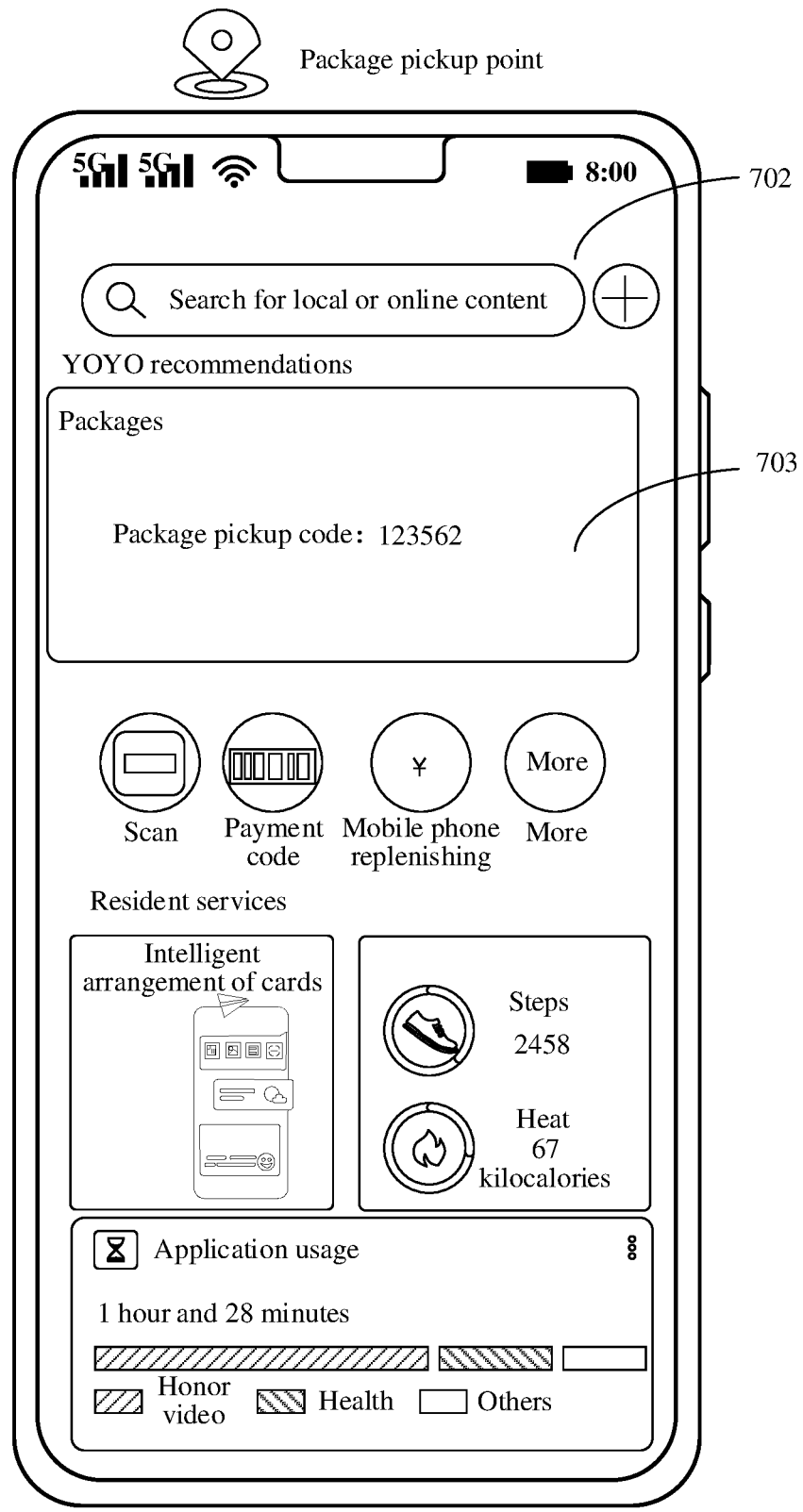

For example, as shown in FIG. 7B, the mobile phone enters a package pickup point with the user. It is pre-assumed that the user will use a package pickup code at the package pickup point. In this case, when the mobile phone recognizes that the mobile phone is located at the package pickup point, the mobile phone determines that the package pickup code is the push information that needs to be viewed by the user. Then, if the mobile phone finds that the syndicated push information includes the package pickup code, the package pickup code is determined as the push information 1.

For example, the mobile phone can recognize a fence and determine the spatial scene in which the mobile phone is located. The fence may be one or a combination of a geographical fence, a Wi-Fi fence, a base station fence, and a Bluetooth fence.

In an implementation, a correspondence between different geographical fences and the push information that needs to be viewed is pre-configured in the mobile phone. The mobile phone may recognize a geographical fence in which the mobile phone is located through a global positioning system (global positioning system, GPS). In this way, after the geographical fence is recognized, it is determined whether push information that matches the geographical fence, that is, the push information 1, exists in the syndicated push information.

For example, the mobile phone may locate a geographical fence at the bus stop by using the GPS, and pre-determine that the geographical fence in the bus stop corresponds to the riding code and the schedule information. When the push information syndicated by the mobile phone includes the riding code and the schedule information, the riding code and the schedule information are determined as the push information 1.

For another example, the mobile phone may locate a geographical fence at the package pickup point, and pre-determine that the geographical fence at the package pickup point corresponds to the package pickup code. When the push information syndicated by the mobile phone includes the package pickup code, the package pickup code is determined as the push information 1.

In an implementation, a correspondence between different Wi-Fi fences and the required push information that may be pre-configured in the mobile phone. In this way, the mobile phone may detect Wi-Fi features such as a MAC field, a received signal strength indication (received signal strength indication, RSSI), a boot time (Boottime), and a center frequency (Frequency) of Wi-Fi information in the environment in which the mobile phone is located. A Wi-Fi fence to which the mobile phone currently belongs is determined based on the detected Wi-Fi features. After the Wi-Fi fence is recognized, it is determined whether push information that matches the Wi-Fi fence, that is, the push information 1, exists in the syndicated push information.

For example, the mobile phone detects the Wi-Fi information of the environment in which the mobile phone is detected, and determines the corresponding Wi Fi feature. The Wi-Fi feature indicates that the mobile phone is located within the Wi-Fi fence at the package pickup point.

In addition, the mobile phone may further recognize a base station fence, a Bluetooth fence, or the like to determine whether matched push information, that is, the push information 1, exists in the syndicated push information.

It may be understood that, like the Wi-Fi fence and the geographical fence, another type of fence such as the base station fence or the Bluetooth fence may indicate a geographical region in a real space. In other words, the principles based on which the mobile phone determines the push information 1 based on various fences is similar and are not described in detail herein. Certainly, the feature data required for indicating different types of fences varies, and the way in which the mobile phone recognize various types of fences also varies. For example, the feature of the base station fence may be an identifier of a cell in which the device resides. The mobile phone may determine the base station fence to which the mobile phone belongs through a base station signal. The feature of the Bluetooth fence includes a Bluetooth name, a Bluetooth address, and the like. The mobile phone may determine the Bluetooth fence to which the mobile phone belongs by detecting the Bluetooth information.

In some possible embodiments, the mobile phone may indicate a spatial scene by using a plurality of types of fences, thereby improving accuracy of recognizing the spatial scene by the mobile phone.

For example, the package pickup point is indicated by the geographical fence and the Wi-Fi fence. When detecting both the geographical fence and the Wi-Fi fence at the package pickup point, the mobile phone determines that the spatial scene where the mobile phone is located is the package pickup point. Then the push information corresponding to the package pickup point is determined as the push information that needs to be viewed by the user.

In addition to pre-configuring the correspondence between different spatial scenes and the required push information, the mobile phone may further learn actions of the user when viewing the push information in different spatial scenes by using a deep learning model to obtain a push recommendation model. In this way, the mobile phone may determine the spatial scene in which the mobile phone is located based on the recognized fence. Then the mobile phone inputs the determined spatial scene into the push recommendation model to determine the push information that needs to be viewed by the user.

For another example, the mobile phone may determine a time scene in which the user is located based on a time node, and then determine the push information that needs to be viewed by the user based on the correspondence between the time scene and the push information, and then determine the push information 1 from the push information syndicated by the mobile phone. For example, the correspondence between the time scene and the push information may be determined based on a time limit of the push information. For example, if a time difference between the time limit of the push information and the time node corresponding to the time scene does not exceed a preset threshold, it is determined that the push information corresponds to the time scene, that is, the push information that needs to be viewed by the user.

Figure 8A:
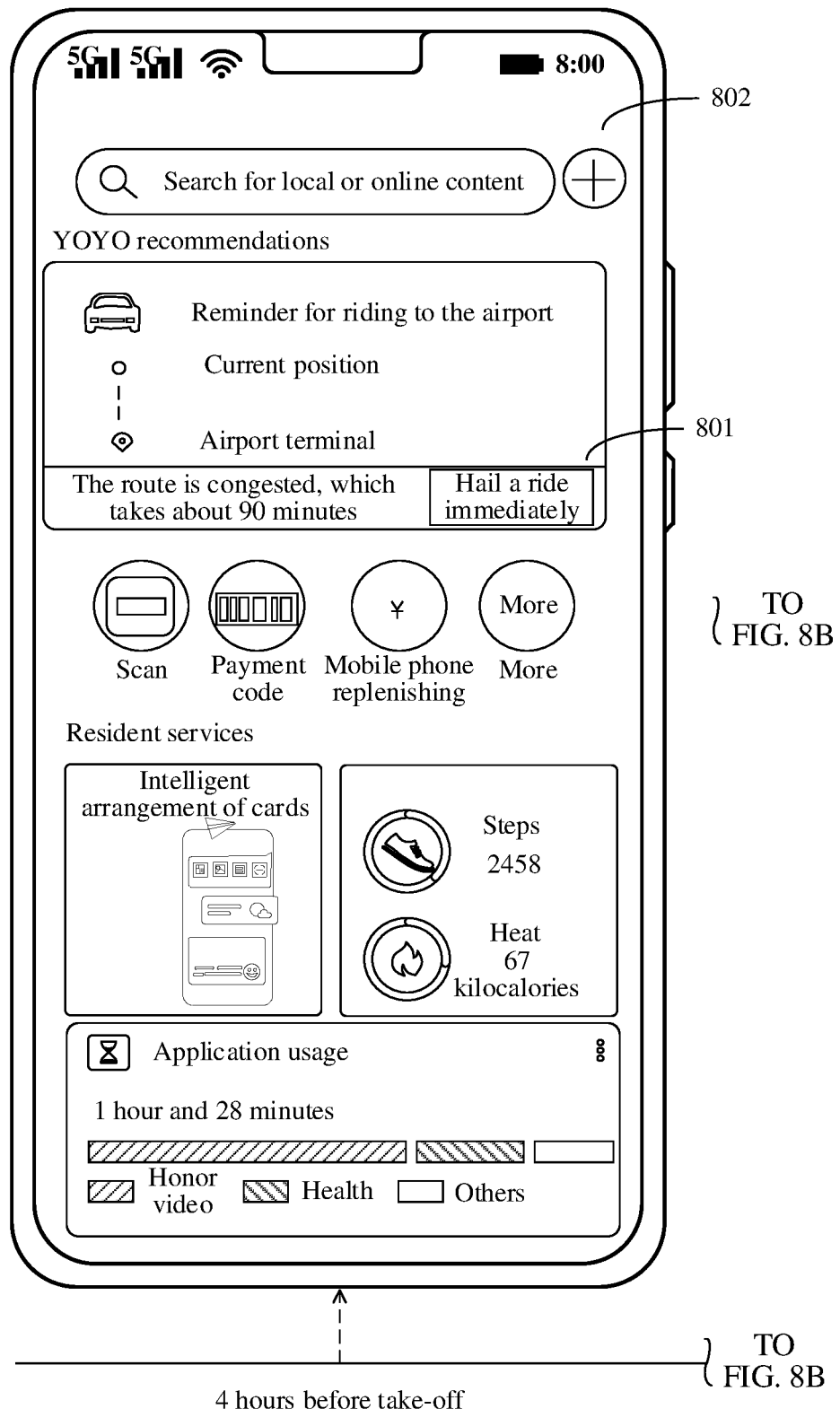
FIG. 8A and FIG. 8B are third example display diagrams of a mobile phone according to an embodiment of this application.
Figure 8B:
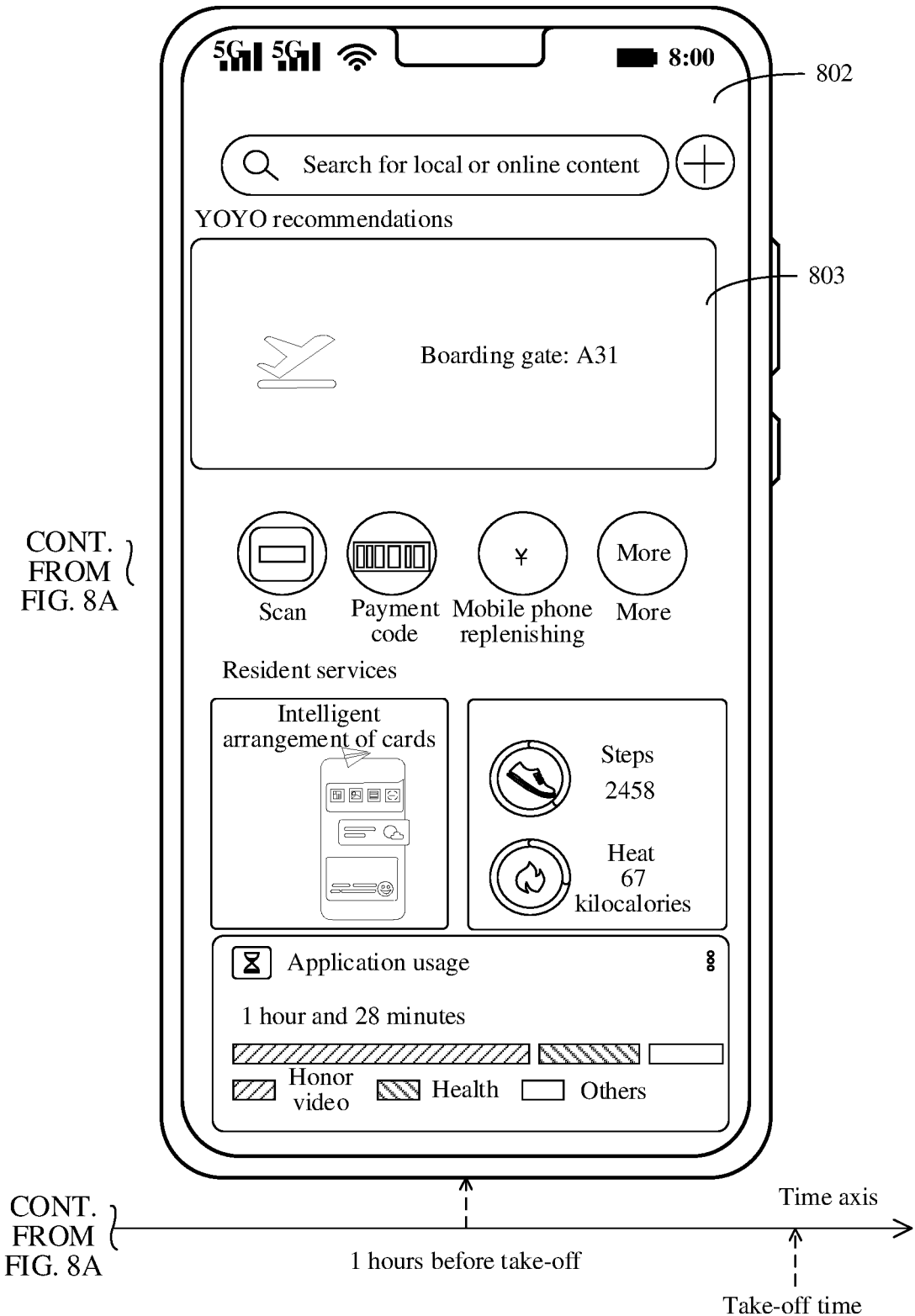

For example, as shown in FIG. 8A and FIG. 8B, a time limit of push information "Reminder for riding to the airport" is 4 hours before a plane takes off, and a time limit of push information "Reminder for boarding gate" is 1 hour before the plane takes off. In this case, when a difference between a current time node and the time limit of "Reminder for riding to the airport" does not exceed 10 minutes, the "Reminder for riding to the airport" is determined as the push information required for the user. When the difference between the current time node and the time limit of the "Reminder for boarding gate" does not exceed 10 minutes, the "Reminder for boarding gate" is determined as the push information required by the user. Then it is determined whether the push information syndicated by the mobile phone includes the "Reminder for riding to the airport" or the "Reminder for boarding gate". If the push information includes the "Reminder for riding to the airport" or the "Reminder for boarding gate", it is determined that the "Reminder for riding to the airport" or the "Reminder for boarding gate" that is found is the push information 1.

For another example, the correspondence between time scene and the push information may be determined based on habits of viewing push information in different time scenes by the user. In other words, the mobile phone may further learn actions of the user when viewing the push information in different time scenes by using a deep learning model to obtain a push recommendation model. In this way, a real-time time node may be inputted into the push recommendation model to obtain the push information required by the user.

For example, the user often checks news headline information at 9 a.m. After learning by the deep learning model, a push recommendation model 1 is obtained. In this way, at 9 a.m. every day, the time point of 9 a.m. is inputted into the push recommendation model 1, and it is determined that the news headline information is the push information that needs to be viewed by the user.

Figure 9:
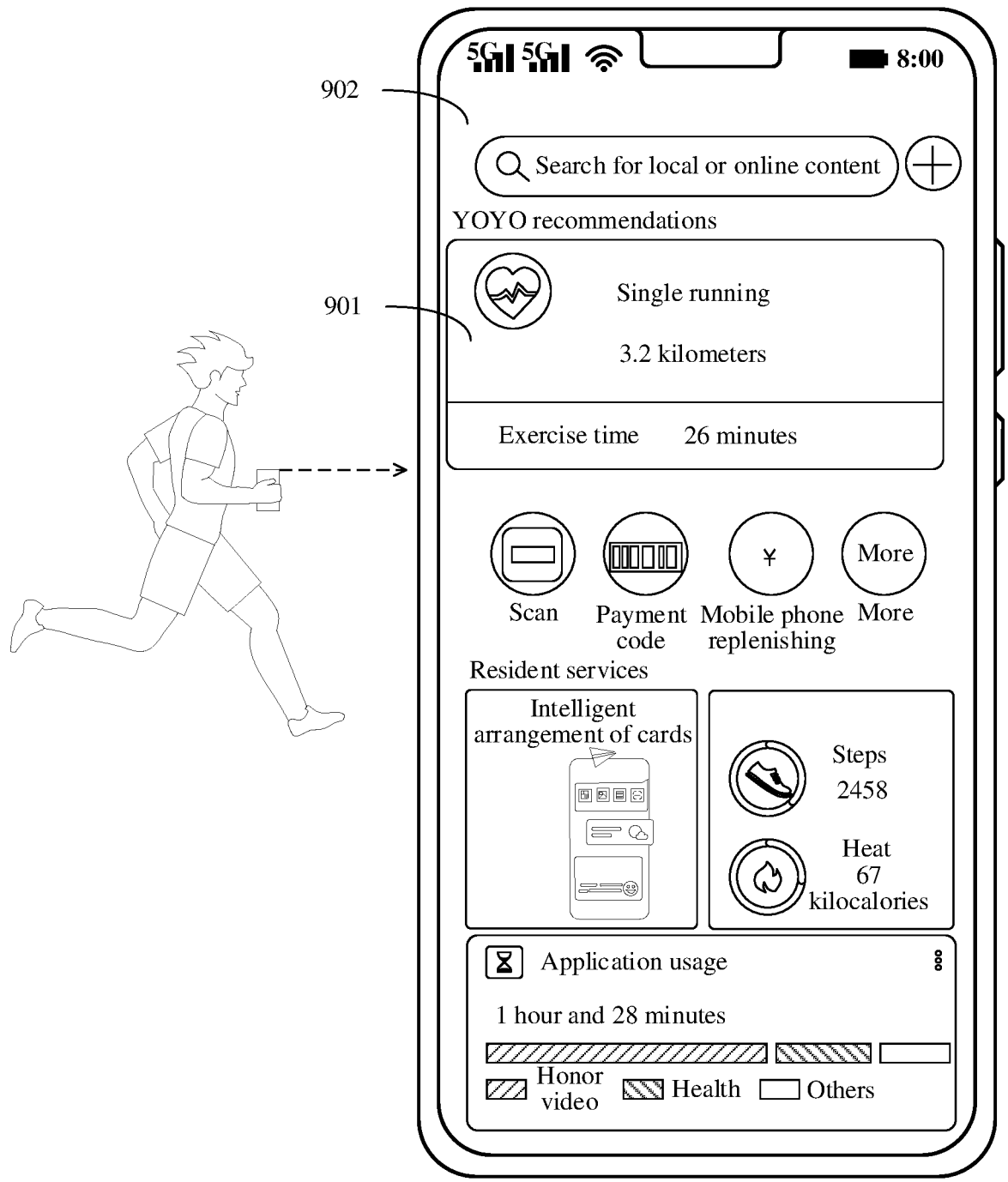
FIG. 9 is a fourth example display diagram of a mobile phone according to an embodiment of this application.

For another example, the mobile phone may determine a status scene based on detected movement status information, and then determine the push information that needs to be viewed by the user based on a correspondence between the status scene and the push information. The correspondence between the status scene and the push information may be pre-configured. For example, the status scene includes a walking state, a stationary state, and a running state. It is pre-configured that the running state corresponds to the push information "real-time exercise amount information". As shown in FIG. 9, acceleration information detected by the mobile phone indicates that the user is in the running state. In this case, it is determined that the real-time exercise amount information is the push information that needs to be viewed by the user. Then it is determined whether the real-time exercise amount information exists in the push information syndicated by the mobile phone. When the real-time exercise amount information exists, the real-time exercise amount information is used as the push information 1.

S5: Display a recommendation card corresponding to the push information 1 in a recommendation region of a minus one screen.

In some embodiments, after determining the push information 1, the mobile phone may generate the recommendation card based on the push information 1. For example, the recommendation card may be displayed on the minus one screen.

For example, as shown in FIG. 7A, the mobile phone recognizes that the mobile phone as located at a bus stop, and generates a recommendation card 701 based on schedule information and a riding code that are obtained. The mobile phone may display a minus one screen 702 including the recommendation card 701 in response to an operation indicating that the minus one screen should be displayed.

For another example, as shown in FIG. 7B, the mobile phone recognizes that the mobile phone as located at a package pickup point, and generates a recommendation card 703 based on an obtained package pickup code. The mobile phone may display a minus one screen 702 including the recommendation card 703 in response to an operation indicating that the minus one screen should be displayed.

For another example, as shown in FIG. 8A and FIG. 8B, the mobile phone recognizes that a current time scene is 4 hours before a plane takes off, and generates a recommendation card 801 based on an obtained "Reminder for riding to the airport". In this case, the mobile phone may display a minus one screen 802 including the recommendation card 801 in response to an operation indicating that the minus one screen should be displayed.

For another example, as shown in FIG. 8A and FIG. 8B, the mobile phone recognizes that a current time scene is 1 hours before a plane takes off, and generates a recommendation card 803 based on an obtained "Reminder for boarding gate". In this case, the mobile phone may display a minus one screen 802 including the recommendation card 803 in response to an operation indicating that the minus one screen should be displayed.

For another example, as shown in FIG. 9, the mobile phone recognizes that a current status scene is that the user is in a running state, and generates a recommendation card 901 based on an obtained real-time exercise amount information. In this case, the mobile phone may display a minus one screen 902 including the recommendation card 901 in response to an operation indicating that the minus one screen should be displayed.

Figure 10A:
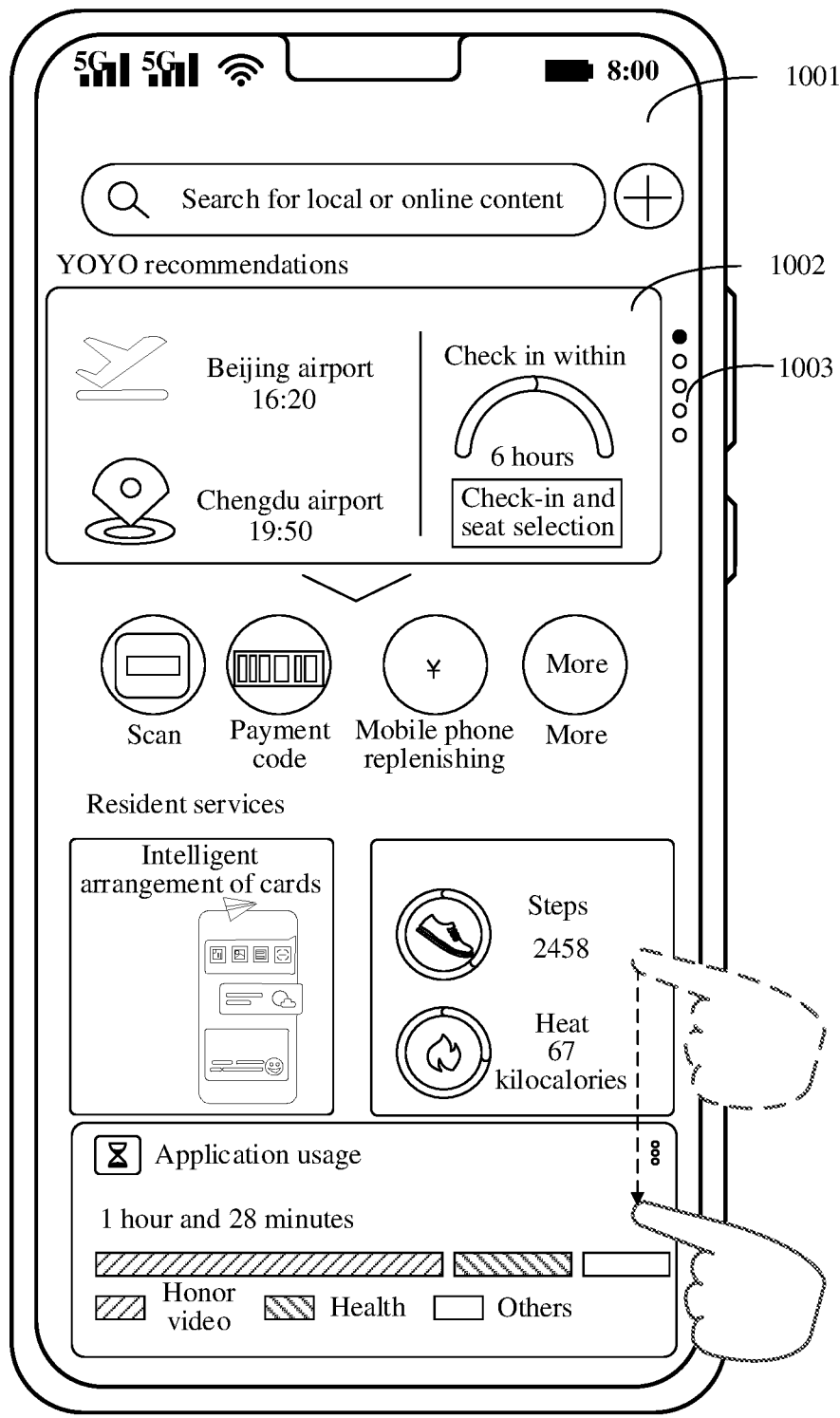
FIG. 10A and FIG. 10B are fifth example display diagrams of a mobile phone according to an embodiment of this application.

In addition, in some scenes, a plurality of recommendation cards may exist simultaneously. When the plurality of recommendation cards exist, the plurality of recommendation cards form a card stack. A recommendation card located at a top of the card stack may be displayed on the minus one screen. In some embodiments, the recommendation card displayed on the minus one screen may be switched. For example, as shown in in FIG. 10A, a recommendation card 1002 is displayed on a minus one screen 1001. A stack identifier, for example, a navigation bar 1003, is displayed on a side of the recommendation card 1002. The navigation bar 1003 includes a plurality of navigation points, and each of the navigation points corresponds to one recommendation card in the card stack. The user slides the recommendation card to indicate that the mobile phone should switch to a selected navigation point, so as to switch the recommendation card displayed on the minus one screen 1001.

Figure 10B:
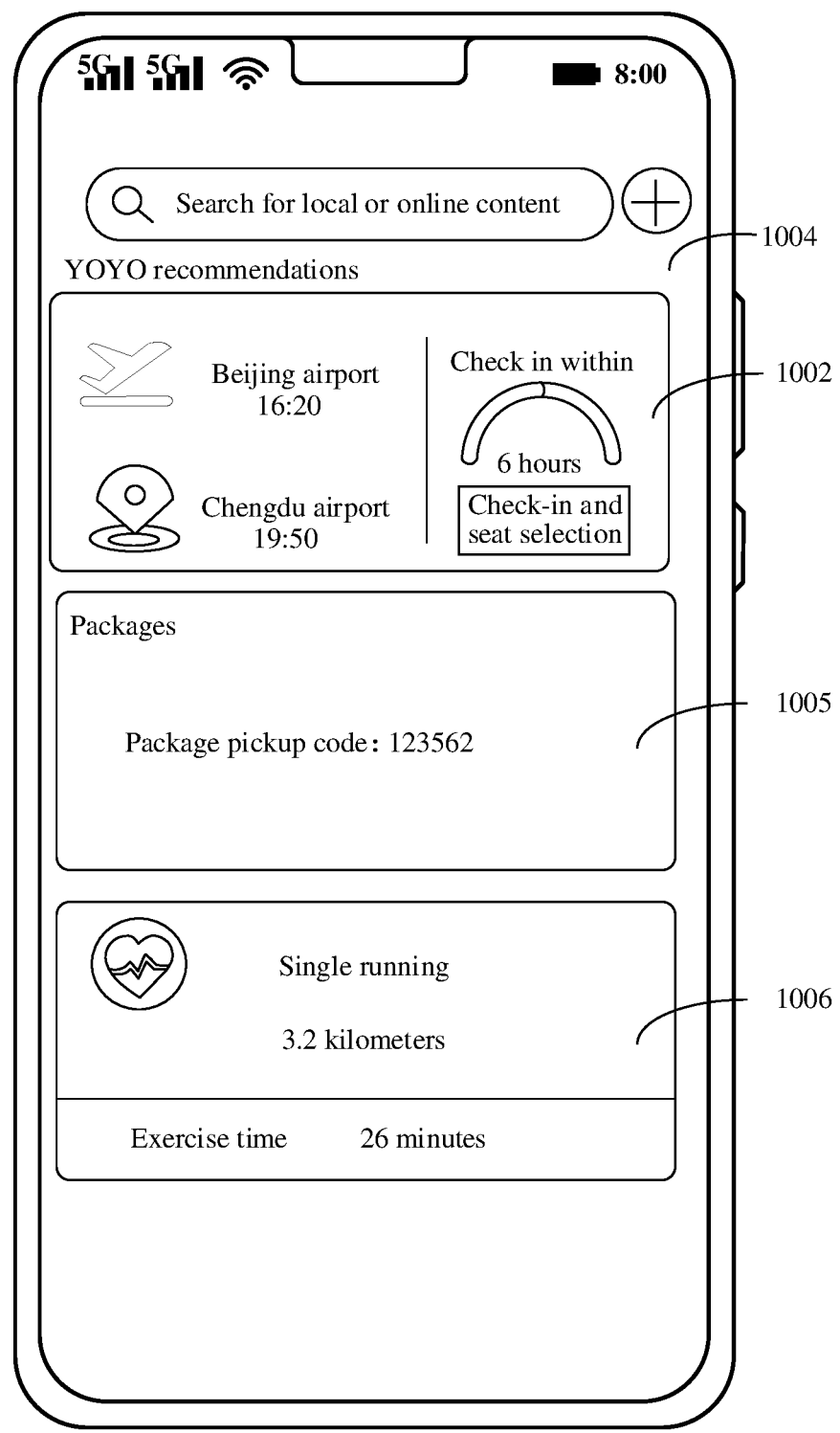

In addition, when the mobile phone receives an operation (for example, referred to as a second sliding operation) indicating that the card stack should be unfolded, for example, the mobile phone receives a sliding operation performed by the user, the mobile phone displays an interface 1004 shown in FIG. 10B. The interface 1004 successively displays all of the recommendation cards in the card stack, such as a recommendation card 1002, a recommendation card 1005, and a recommendation card 1006. In this way, the user can view and process the recommendation cards more conveniently.

In this embodiment of this application, in addition to the recommendation card, the mobile phone further provides an application level service card.

Figure 11:
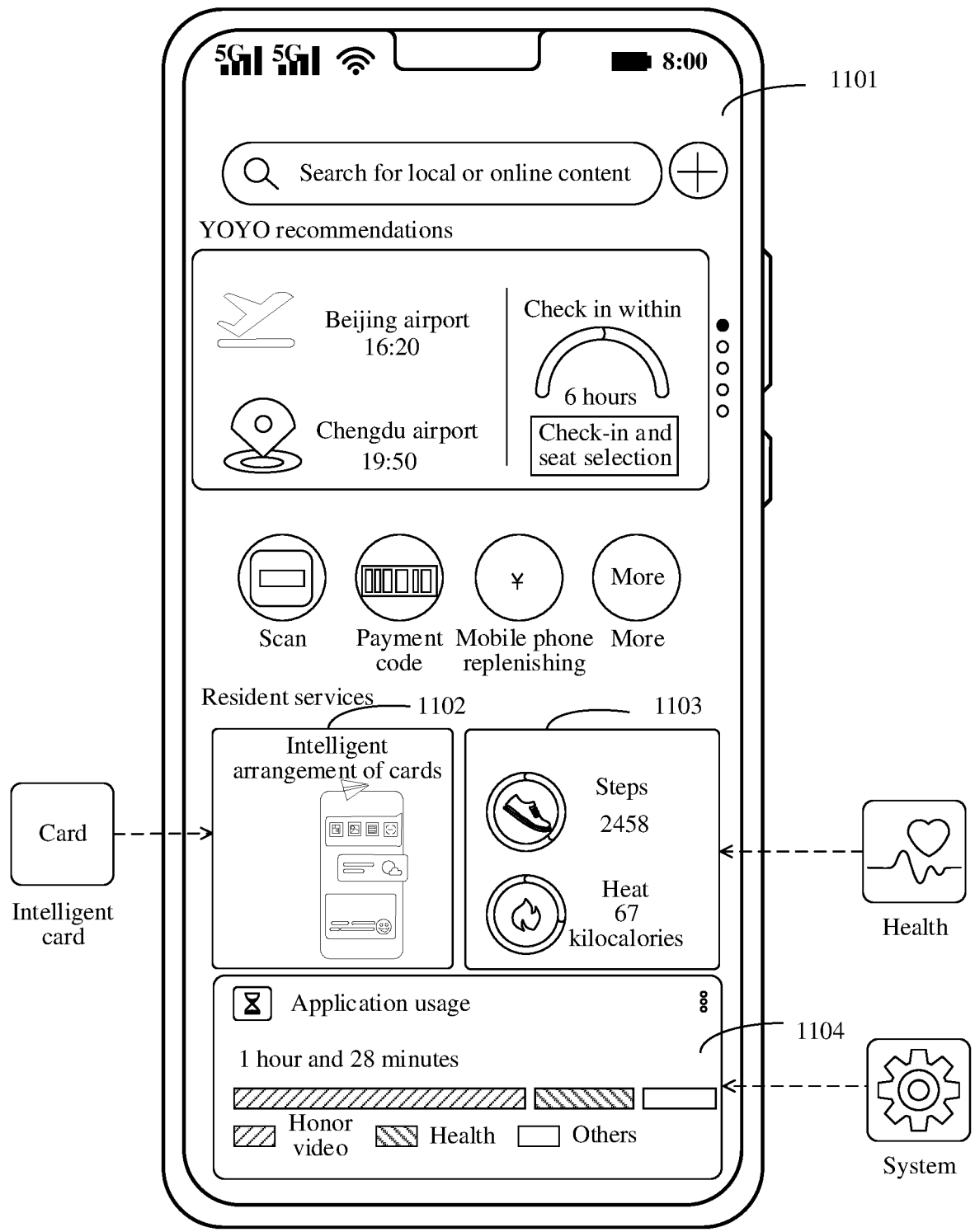
FIG. 11 is a sixth example display diagram of a mobile phone according to an embodiment of this application.

In some embodiments, each service card is associated with an application. The application associated with the service card may be referred to as an associated application or an associated application program. For example, the foregoing service card may be configured to display push information from the associated application. For example, as shown in FIG. 11, in a minus one screen 1101, push information displayed in a service card 1102 is from an associated intelligent card APP, push information displayed in a service card 1103 is from an associated health APP, and push information displayed in a service card 1104 is from the device system. In this way, after a message server of the associated application pushes new push information, the push information displayed in the service card also changes. For another example, the service card may further provide a start interface for starting the associated application. When receiving an operation performed by the user on the service card, the mobile phone may display an application interface of the associated application.

In some embodiments, the service card is a card created by the mobile phone in response to a subscription operation performed by the user. An application indicated by the subscription operation is an associated application of the created service card.

For example, the user may indicate that the mobile phone should create a new service card by performing an operation on the minus one screen, such as a hold-and-press operation on a blank region of the minus one screen.

In this way, as shown in FIG. 12A(1), when the mobile phone receives an operation (referred to as a second operation) performed by the user indicating that the service card should be edited, as shown in FIG. 12A(2), a minus one screen 1201 in an editable state is displayed.

The minus one screen 1201 includes a control 1202 for indicating addition of a service card and a control 1203 for indicating completion. When the mobile phone receives an operation, such as a tapping operation, performed by the user on the control 1203, the editable state of the minus one screen is canceled, and the minus one screen shown in FIG. 12A(1) is displayed again.

In some embodiments, when the mobile phone receives an operation, such as a tapping operation, performed by the user on the control 1202, a configuration window 1204 is displayed. The configuration window 1204 lists application services to which service cards may be added. The application services correspond to message service types of applications. One application may correspond to at least one application service. When the user subscribes to different types of application services, it means that the user subscribes to different types of push information in the applications. For example, a package APP may correspond to a pickup code service and a package status service. When the user subscribes to the package status service, it indicates that the user subscribes to push information in the package APP related to a package status. When the user subscribes to the pickup code service, it indicates that the user subscribes to push information in the package APP related to a pickup code. For example, a calendar APP may correspond to a schedule display service and a schedule reminder service. For example, a map APP may correspond to a navigation message service.

In addition, at each application service in the configuration window 1204, a corresponding control indicating addition, such as a control 1205, is displayed. When the mobile phone receives an operation performed by the user on the control 1205, the mobile phone determines that the user has subscribed to an application service corresponding to the control 1205 and creates a corresponding service card to display push information in the application related to the application service.

For example, as shown in FIG. 12A(3), the mobile phone receives an operation, such as a tapping operation, performed by the user on the control 1205 corresponding to a package status, as shown in FIG. 12A(4), the minus one screen 1201 is displayed again. In this case, a new service card 1206 is added to the displayed minus one screen 1201. The service card 1206 is configured to display push information in the package APP related to the package status. In some other embodiments, as shown in FIG. 12B(1), when the mobile phone displays the minus one screen 1201 in the editable state, if the mobile phone receives an operation (also referred to as a third operation) performed by the user indicating that the mobile phone should return to a desktop, for example, a leftward sliding operation, the mobile phone displays a desktop 1207 as shown in FIG. 12B(2). The desktop 1207 is in a shareable or editable state. In addition, the desktop 1207 in the shareable state includes icons corresponding to applications. When the mobile phone receives an operation, such as a hold-and-press operation performed by the user on an icon of an application in the desktop 1207, the mobile phone may display an application service of an application (such as a first application) that the user may subscribe to, such as a first application service. For example, as shown in FIG. 12B(2), when the mobile phone receives a hold-and-press operation performed by the user on an icon 1208, the mobile phone may display a selection box 1209. The selection box 1209 is configured to list application services of an application corresponding to the icon 1208. Then the mobile phone may determine that the user selects an application service based on an operation performed by the user in the selection box 1209. For example, as shown in FIG. 12B(3), when the mobile phone receives a tapping operation performed by the user on a "schedule display service" in the selection window 1209, the mobile phone determines that the user subscribes to the "schedule display service". Then a service card corresponding to the application service may be created on the minus one screen. For example, when the mobile phone receives an operation performed by the user indicating that the mobile phone should return to the minus one screen, a minus one screen 1210 shown in FIG. 12B(4) may be displayed. The minus one screen 1210 includes a newly added service card, that is, a service card 1211 corresponding to the calendar APP. The service card 1211 is configured to display push information related to the "schedule display service".

It may be understood that the application service is a smallest unit for creating a service card. One service card may include a plurality of application services of one application. In addition, different application services of one application may correspond to different service cards.

In addition, in the editable state, when a service card corresponds to a plurality of application services, the service card may be split into a plurality of service cards, and each split service card corresponds to at least one application service. For example, a service card a corresponds to an application service 1 and an application service 2. In response to an operation performed by the user, the service card a may be split into a service card b corresponding to the application service 1 and a service card c corresponding to the application service 2. In addition, a plurality of service cards corresponding to one application may be combined into one card. For example, the service card b corresponding to the application service 1 and the service card c corresponding to the application service 2 are combined into the service card a corresponding to both the application service 1 and the application service 2.

In addition to splitting the service card and combining the service cards, the mobile phone may further adjust a display position and a display size of the service card based on an operation performed by the user.

Figure 13A:
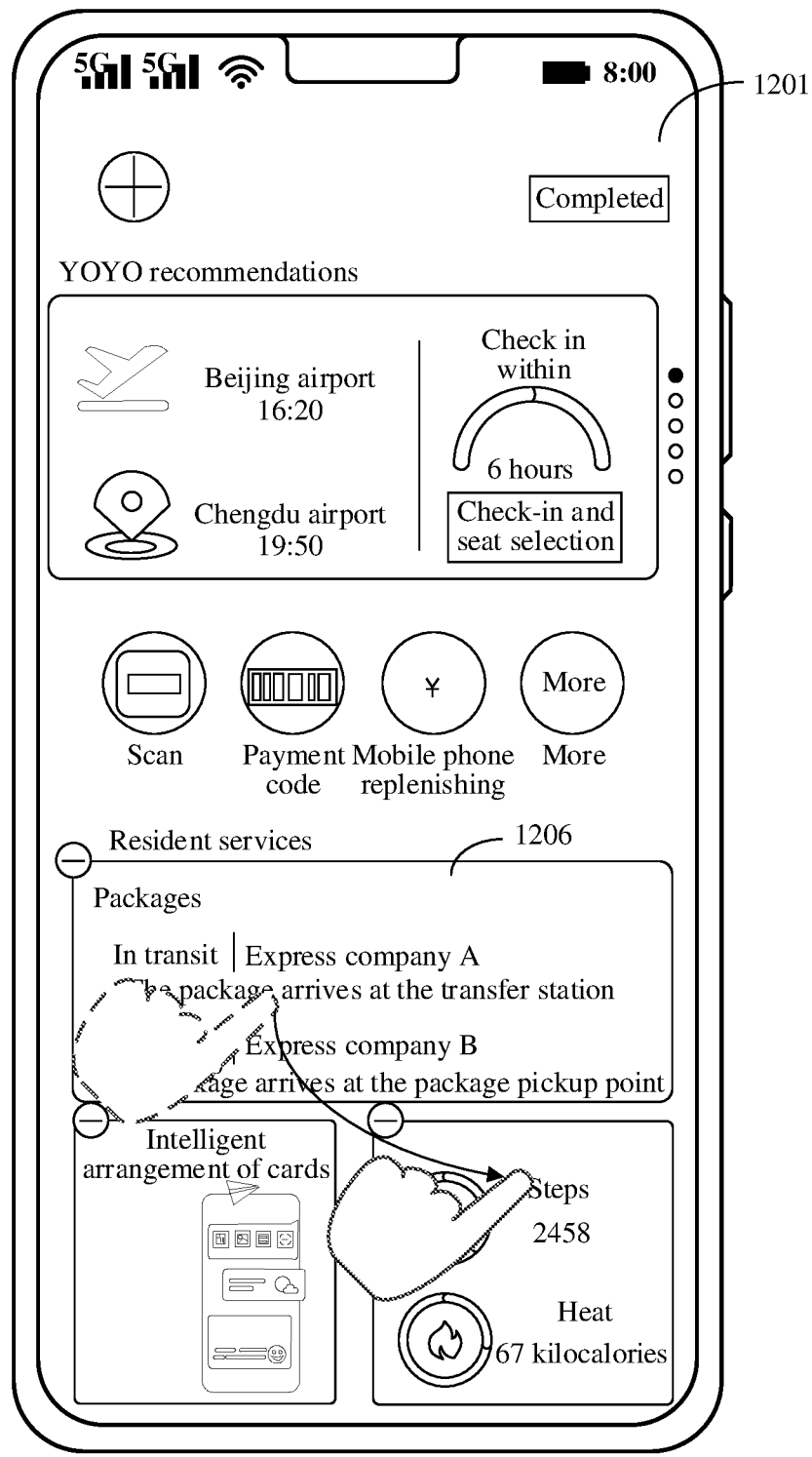
FIG. 13A and FIG. 13B are eighth example display diagrams of a mobile phone according to an embodiment of this application.
Figure 13B:
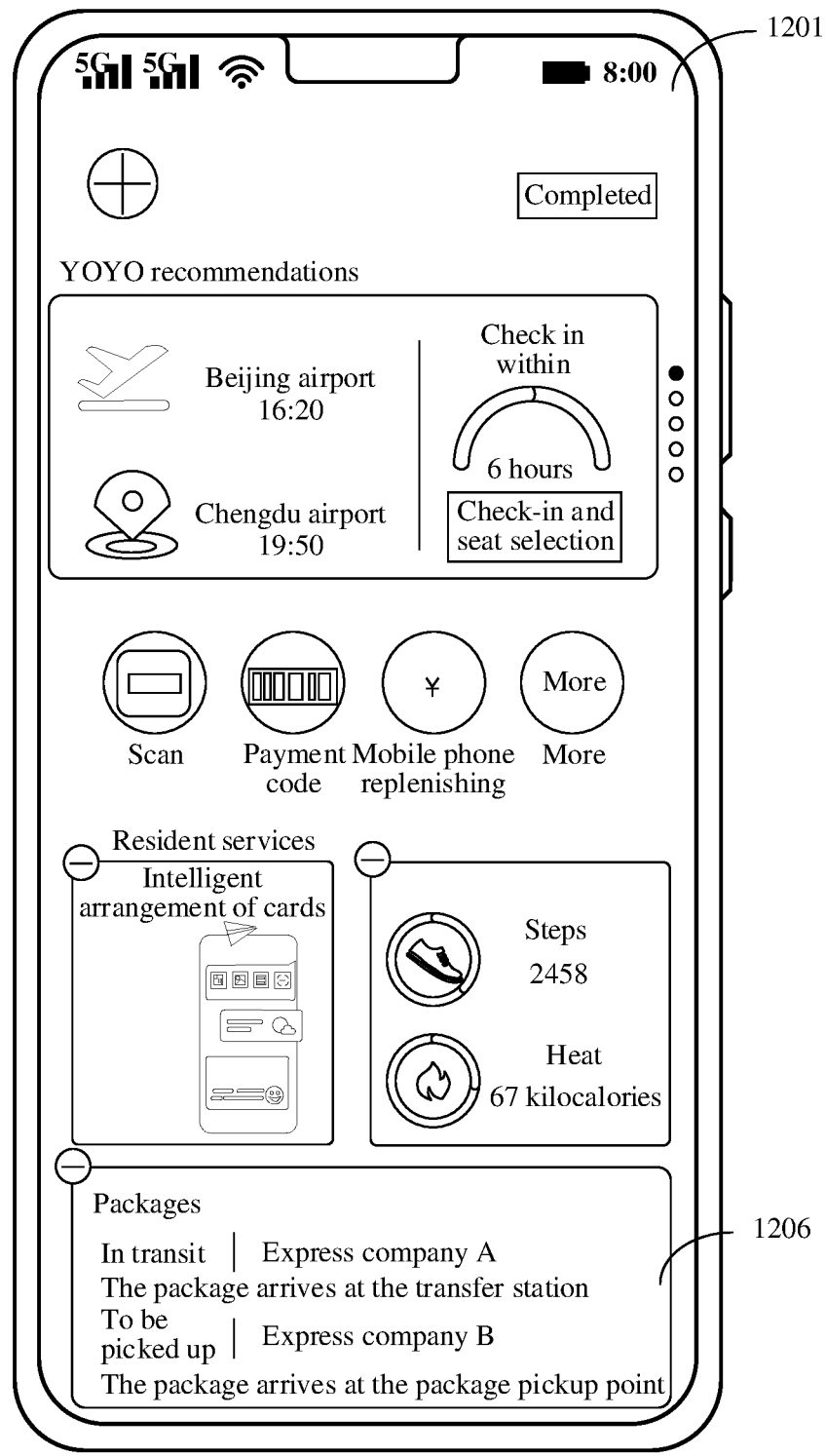

For example, the minus one screen 1201 in the editable state may change a display position and a display size of each service card in response to an operation performed by the user. For example, as shown in FIG. 13A, when the mobile phone receives a sliding operation performed by the user on the service card 1206, the mobile phone determines a sliding endpoint indicated by the sliding operation. Then, as shown in FIG. 13B, the mobile phone displays the service card 1206 in a display region where the sliding endpoint belongs, and adaptively adjust a position of another service card.

In addition, the mobile phone may delete the service cards based on an operation performed by the user.

Figure 14A:
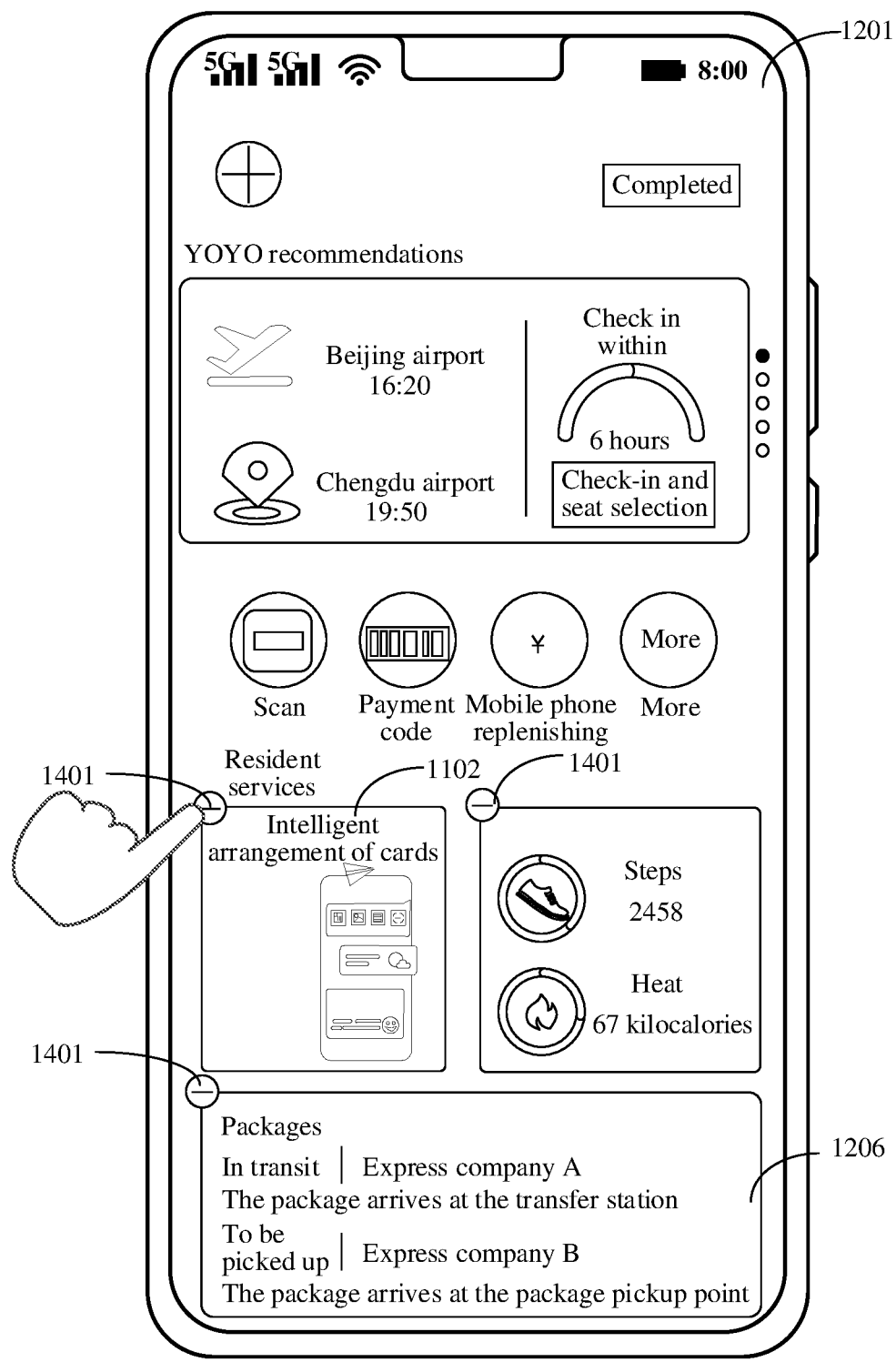
FIG. 14A and FIG. 14B are ninth example display diagrams of a mobile phone according to an electronic device of this application.
Figure 14B:
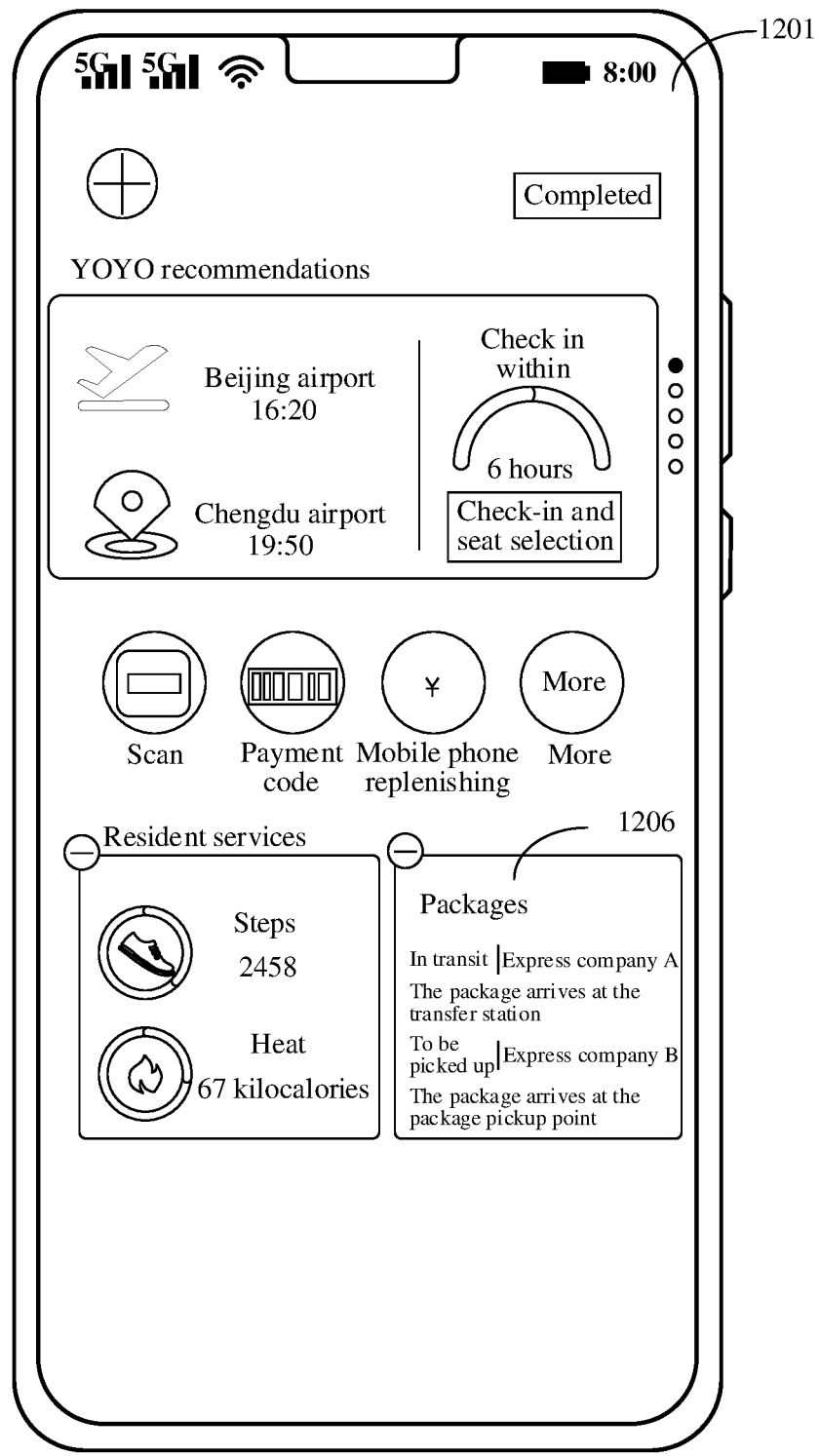

In some embodiments, the minus one screen 1201 in the editable state may delete the service cards in response to an operation performed by the user. For example, as shown in FIG. 14A, in the minus one screen 1201 in the editable state, each service card corresponds to a control for indicating removal, such as a control 1401. When the mobile phone receives an operation, such as a tapping operation, performed on the control 1401 corresponding to the service card 1102, the mobile phone removes the service card 1102 from a resident service region of the minus one screen 1201, as shown in in FIG. 14B, and adaptively adjusts a display position and a display size of another service card.

It may be learned that in the minus one screen in the editable state, the user may independently perform editing operations such as addition, delete, and change on the service cards. However, in some embodiments, in the minus one screen in the editable state, the recommendation card remains in non-editable state. For example, neither content can be edited nor the display position can be changed.

Certainly, in other possible embodiments, in the minus one screen in the editable state, the recommendation card may be edited. For example, the recommendation card may be deleted. For example, the position of the recommendation card in the card stack may be adjusted.

In order to help the user recognize content that is actually editable, In the minus one screen in the editable state, the mobile phone may display editable content through flashing, shaking, or shadowing. For example, if only the service card can be edited, in the minus one screen in the editable state, the service card may be displayed in a shaking manner.

In some embodiments, when a plurality of service cards, some of the service cards may be displayed in a hidden manner. In this case, the user can trigger the mobile phone to display the hidden service cards by performing sliding operation in the resident service region. During sliding of the service cards, the displayed content in the recommendation region remains unchanged. For example, the display position of the recommendation card in the recommendation region remains unchanged, and the displayed recommendation card remains unchanged.

Figure 15A:
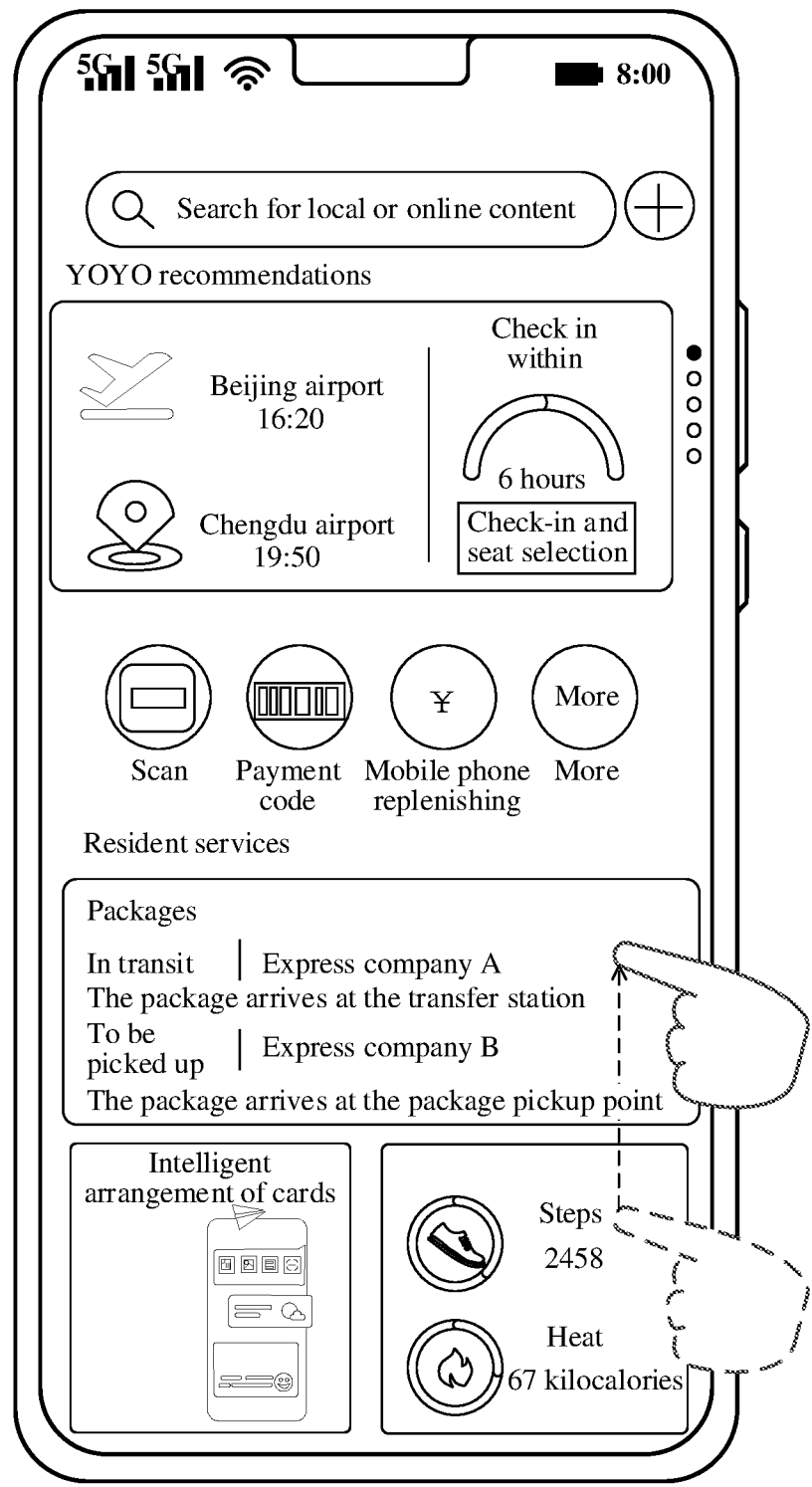
FIG. 15A, FIG. 15B, and FIG. 15C are tenth example display diagrams of a mobile phone according to an electronic device of this application.
Figure 15B:
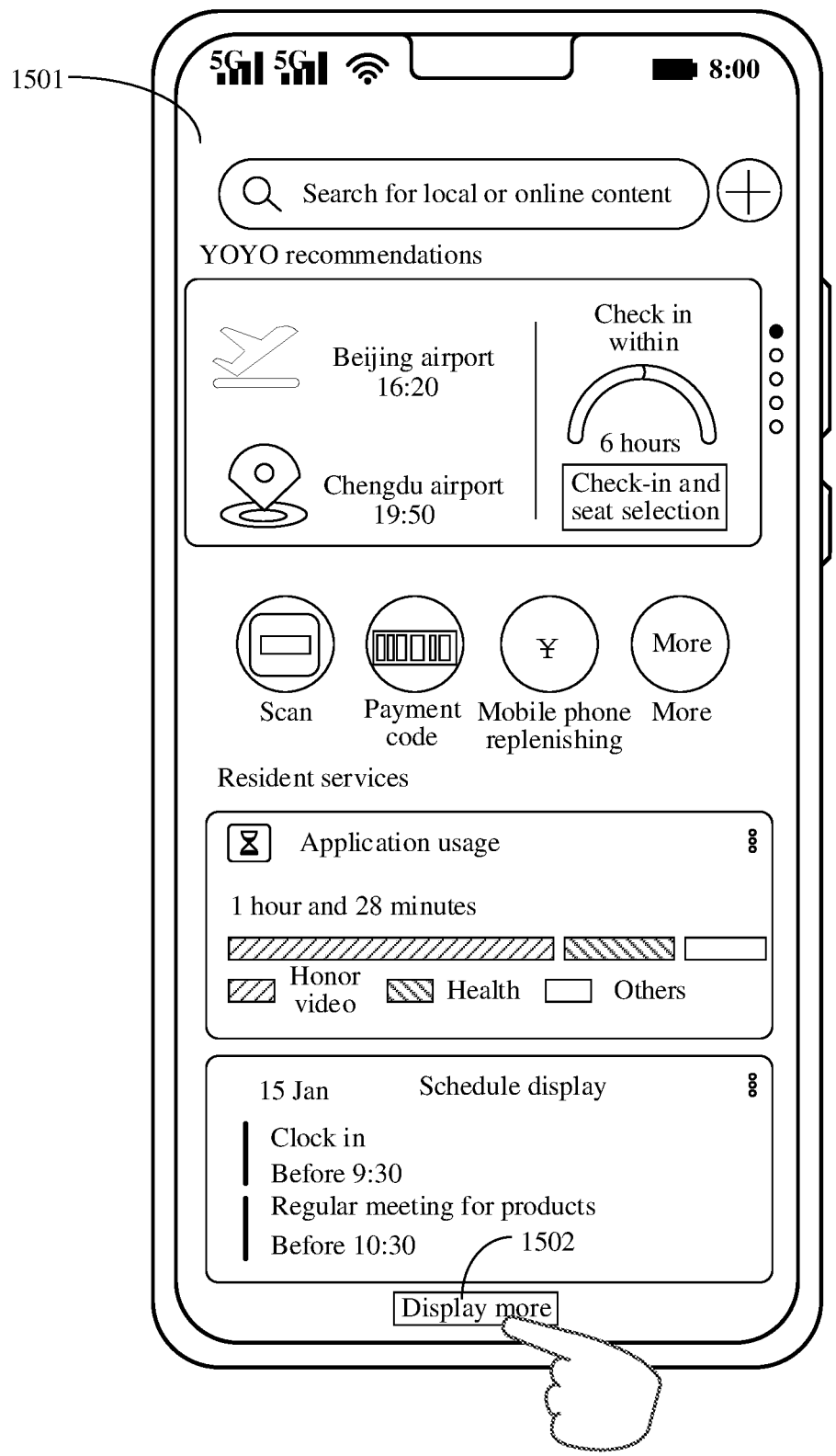

For example, as shown in FIG. 15A, when the mobile phone receives an upward sliding operation (for example, referred to as a third sliding operation) performed by the user in the resident service region, the mobile phone may display a minus one screen 1501 shown in FIG. 15B. In the minus one screen 1501, the resident service region displays another hidden service card.

Figure 15C:
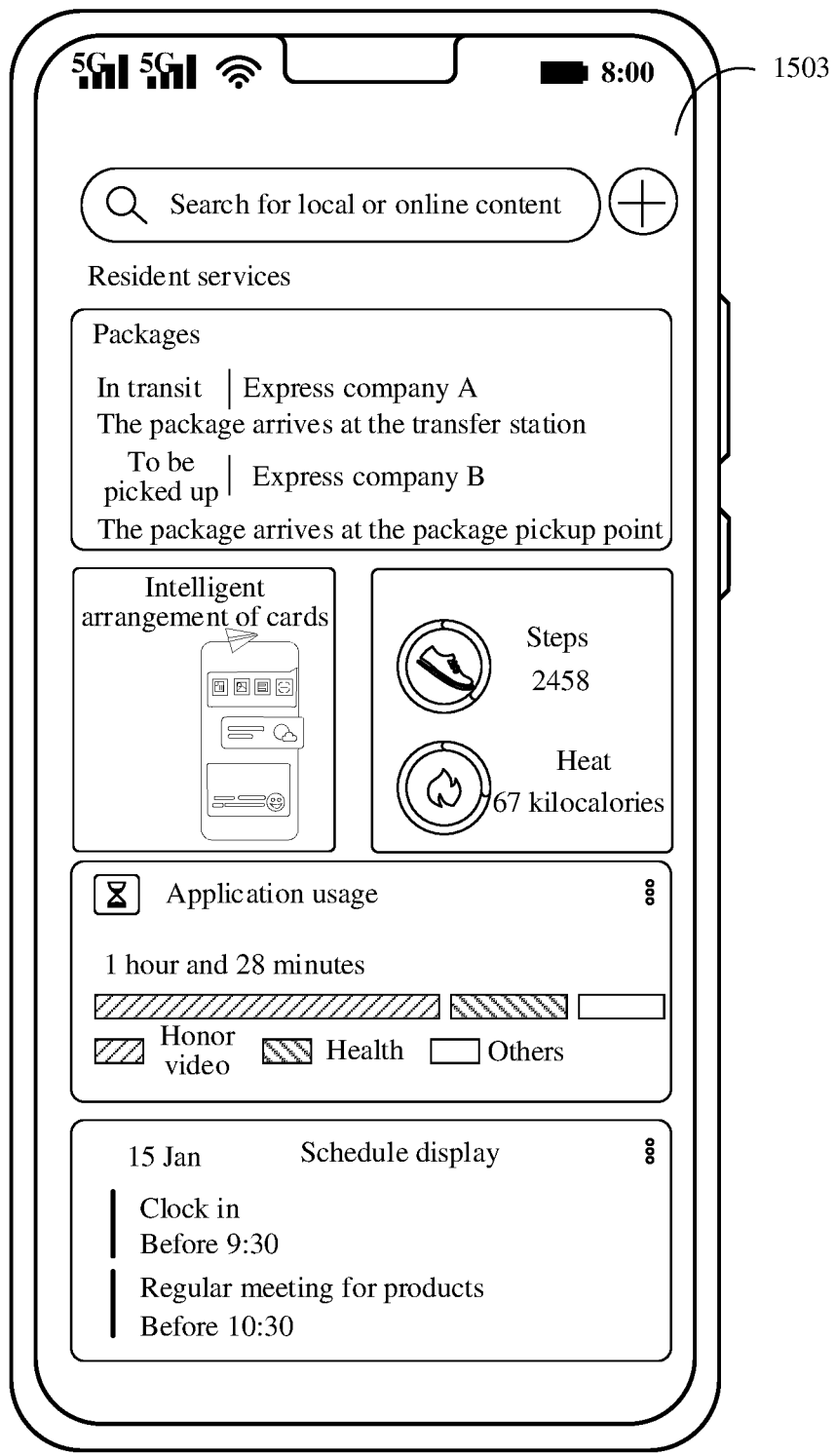

In addition, the minus one screen 1501 further includes a control 1502 (for example, referred to as a first control) configured to unfold display all service cards for display. When the mobile phone receives an operation, such as a tapping operation, performed by the user on the control 1502, the mobile phone may display a service card interface 1503 shown in FIG. 15C, which is referred to as a second interface. The service card interface 1503 includes all service cards that have been created, so that the user can conveniently view all push information the user has subscribed to.

Figure 16A:
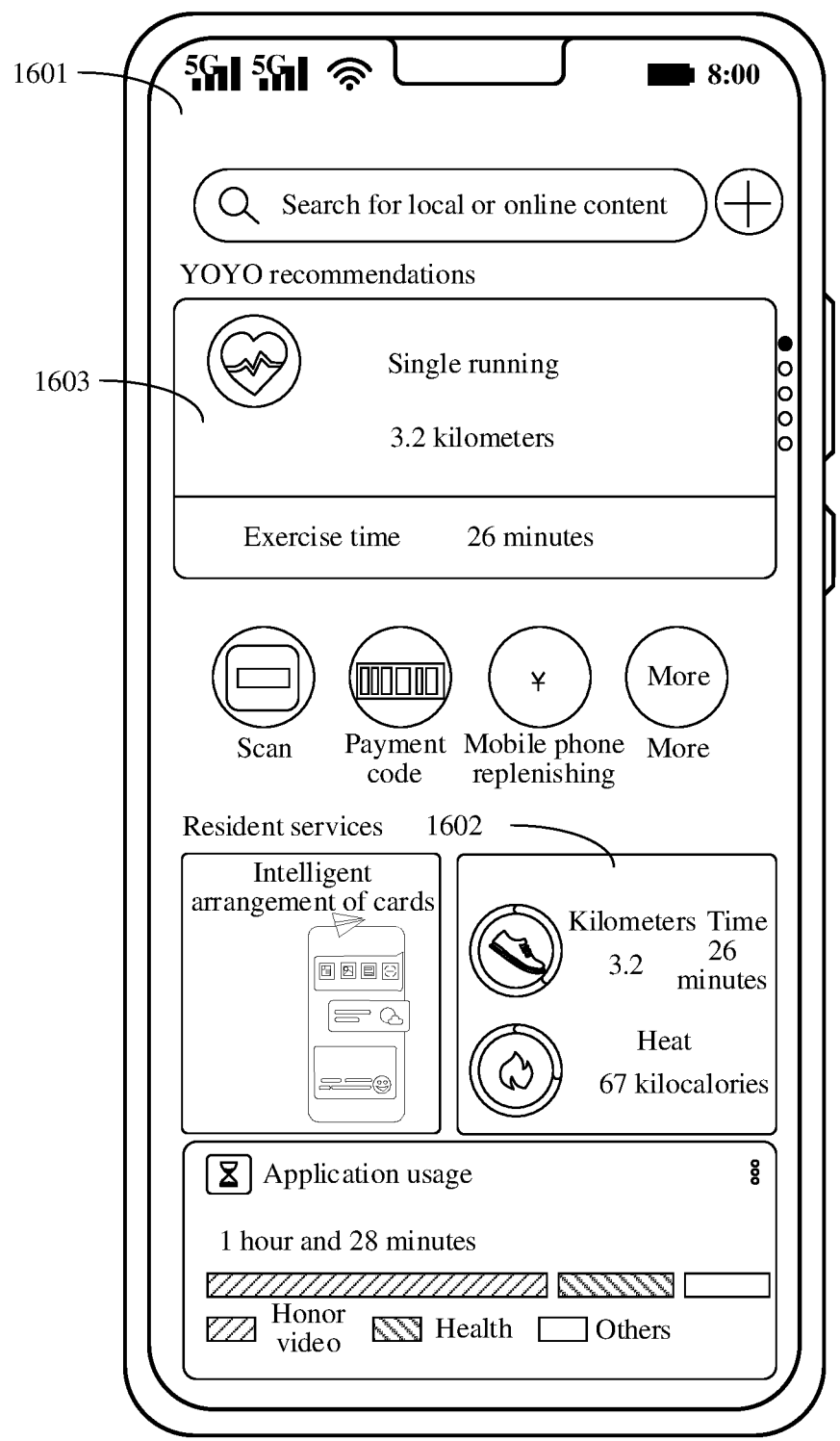
FIG. 16A and FIG. 16B are eleventh example display diagrams of a mobile phone according to an embodiment of this application.

In addition, the service card in the resident service region and the recommendation card in the recommendation region are independent of each other. However, when information sources corresponding to the two cards are the same, the service card and the recommendation card may display the same information. For example, as shown in FIG. 16A, a service card 1602 displayed in a minus one screen 1601 is configured to display real-time exercise amount information pushed by the health APP. If the mobile phone evaluates that the push information required by the user is the real-time exercise amount information, a recommendation card 1603 displayed in the minus one screen 1601 also displays the real-time exercise amount information.

Figure 16B:
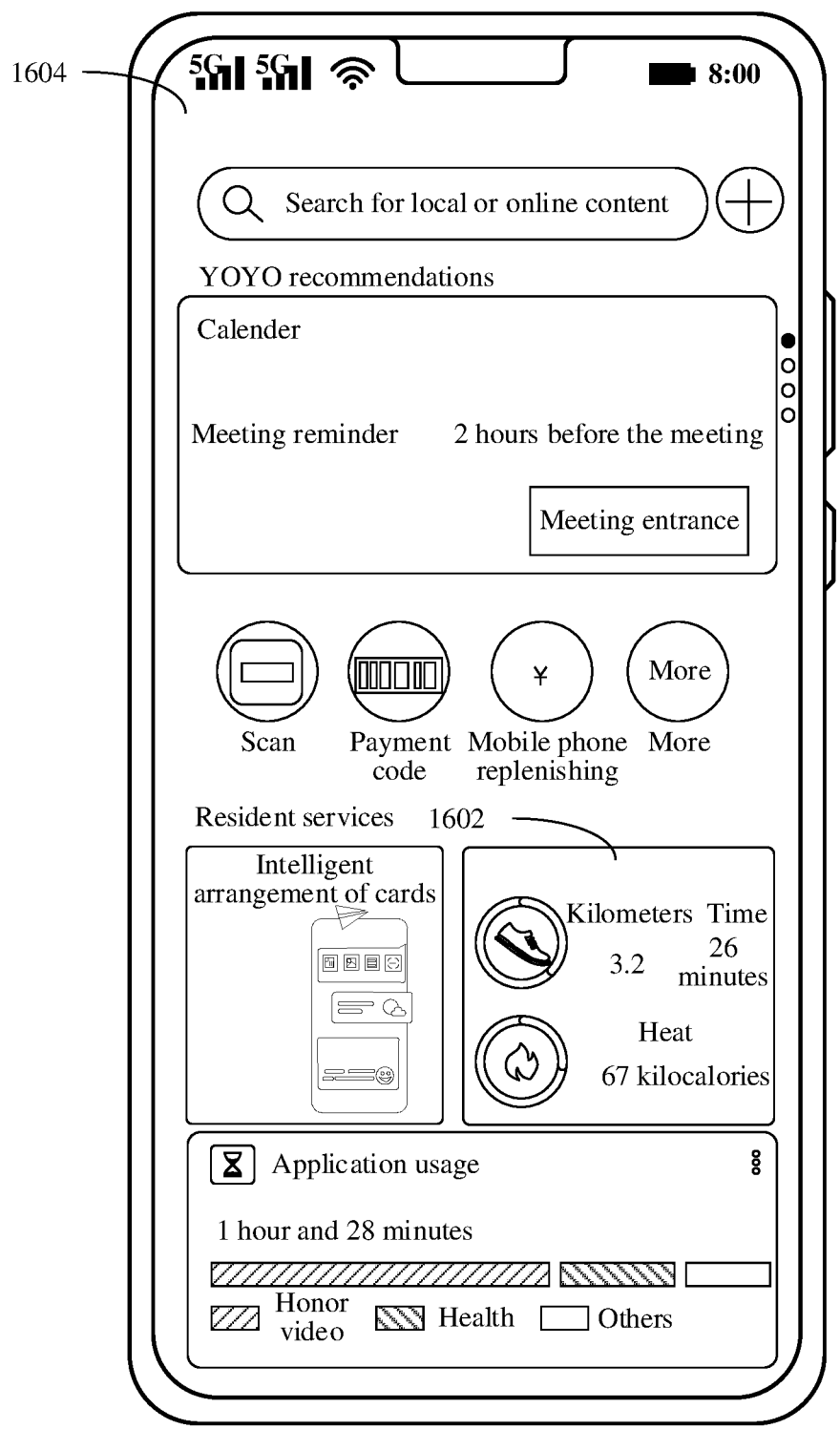

In some embodiments, the mobile phone may further perform push information de-duplication for the recommendation card and the service card. For example, when the recommendation card and the service card display the same push information, the service card continues to display the push information, and the display of the corresponding recommendation card is removed. As shown in FIG. 16B, since the recommendation card 1603 and the service card

1602 display the same push information, the recommendation card 1603 is removed. In this way, compared to the minus one screen 1601 shown in FIG. 16A, in a minus one screen 1604 shown in FIG. 16B, a card stack displayed in the recommendation region has one less recommendation card. That is to say, the card stack displayed on the minus one screen 1604 in FIG. 16B does not include the recommendation card 1603.

In an implementation, an attribute of the recommendation card includes an application service to which the corresponding push information belongs. The application services corresponding to the recommendation card and the service card are compared to determine whether the recommendation card and the service card will display the same push information. When it is determined that the recommendation card and the service card will display the same push information, the display of the recommendation card is removed, or another recommendation card may be used to replace the recommendation card for display in the recommendation region.

For example, the attribute of the recommendation card 1 includes an application service 1. The mobile phone determines that the application service 1 is the same as an application service 2 corresponding to a service card 1, and determines that push information displayed by a recommendation card 1 is the same as push information displayed by the service card 1. The mobile phone removes display of the recommendation card 1 or uses a recommendation card 2 to replace the recommendation card 1 for display in the recommendation region.

In some possible examples, the application service corresponding to the recommendation card may be compared with the application service of the service card displayed on the same screen, to determine whether the two card will display the same push information.

In another implementation, the mobile phone may compare displayed content in the recommendation card and displayed content in the service card. When the displayed content in the recommendation card is the same as the displayed content in the service card, the display of the recommendation card is removed, or another recommendation card is used to replace the recommendation card for display in the recommendation region.

For example, the mobile phone extracts keywords from the recommendation card and the service card displayed on the same screen by using a text recognition engine. When the keyword extracted from the recommendation card is the same as the keyword extracted from the service card, the display of the recommendation card is removed, or another recommendation card is used to replace the recommendation card for display in the recommendation region.

For example, in a scenario in which the recommendation card 3 and the service card 2 are simultaneously displayed on the minus one screen, the mobile phone extracts keywords such as heat and kilometers from the recommendation card 3 by using the text recognition engine, and also extracts keywords such as heat and kilometers from the service card 2. Therefore, it is determined that the content displayed on the recommendation card 3 is the same as the content displayed on the recommendation card 2, and the display of the recommendation card 3 is removed, or the recommendation card 2 is used to replace the recommendation card 3 for display in the recommendation region.

In some other embodiments, in addition to being displayed on the minus one screen, the recommendation card may be further displayed on the desktop of the mobile phone. The recommendation card displayed on the desktop is also referred to as a third card. In some examples, the recommendation card on the desktop displays the push information 1 synchronously with the recommendation card on the minus one screen. In some other examples, the recommendation card on the desktop is configured to display a preset type of push information 1. That is to say, after the mobile phone determines the push information 1 from a plurality of applications, the mobile phone determines that the push information 1 belongs to a preset type of information. The mobile phone creates the recommendation card displayed on the desktop while creating the recommendation card displayed on the minus one screen.

Figure 17A:
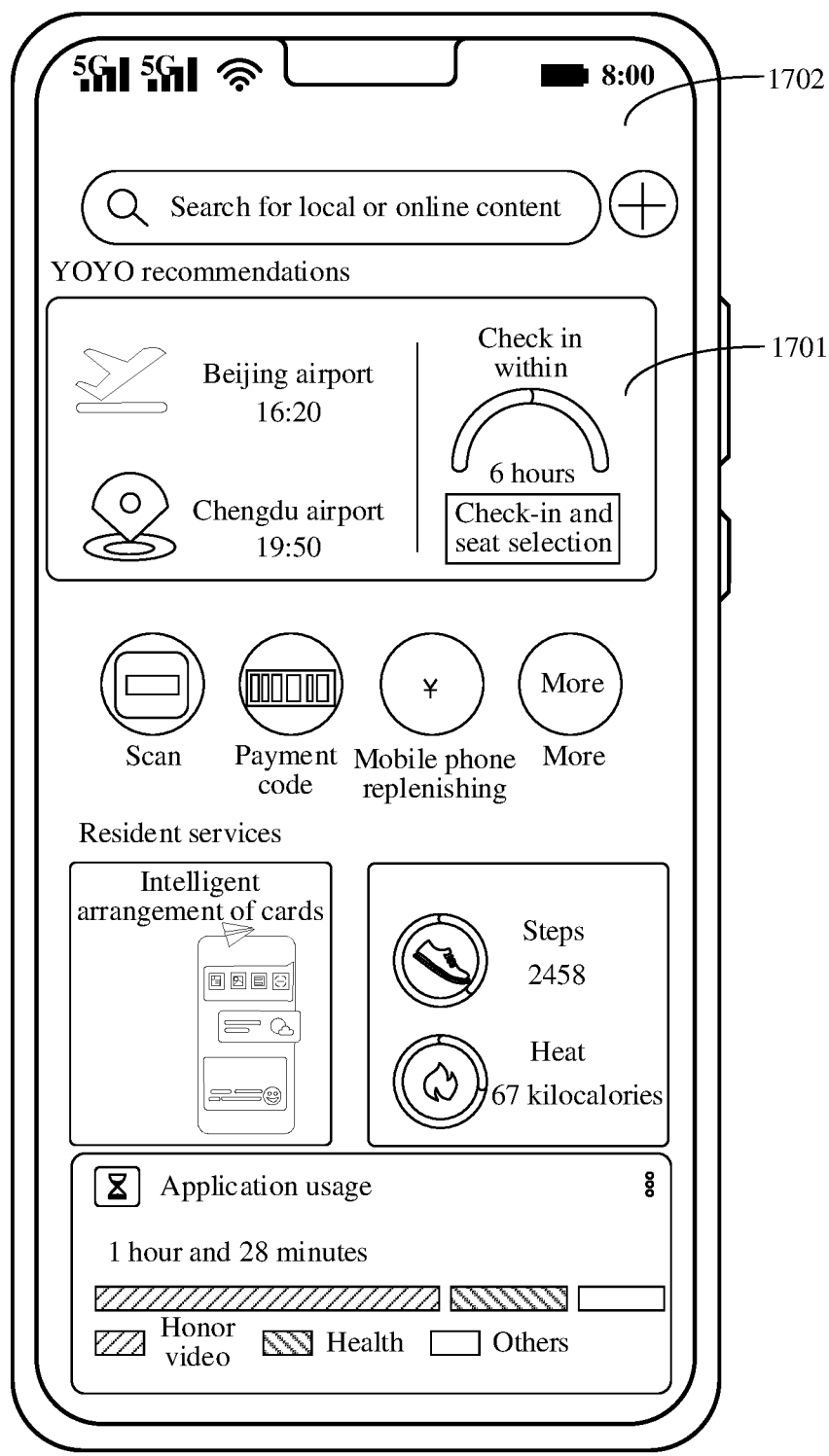
FIG. 17A, FIG. 17B, and FIG. 17C are twelfth example display diagrams of a mobile phone according to an embodiment of this application.
Figure 17B:
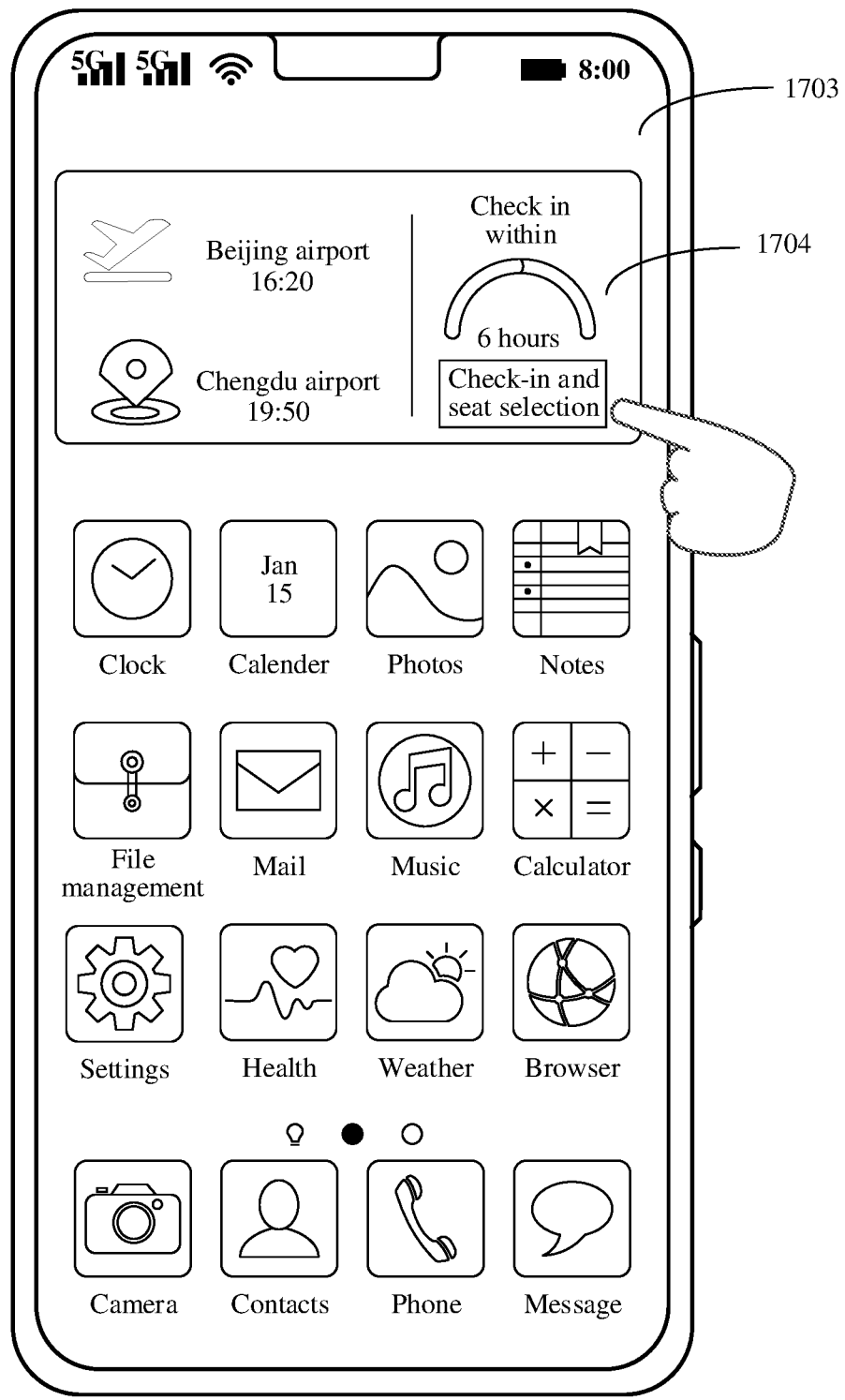

For example, as shown in FIG. 17A, when it is determined that flight information is the push information 1, a created recommendation card 1701 is displayed on a minus one screen 1702. In addition, the flight information belongs to the preset type of push information 1. As shown in FIG. 17B, a desktop 1703 of the mobile phone includes a recommendation card 1704. Obviously, the recommendation card 1701 and the recommendation card 1704 display the same push information.

When the recommendation card 1701 and the recommendation card 1704 correspond to the same push information, the mobile phone may display the desktop 1703 when receiving an operation indicating that the desktop should be displayed. During the display of the desktop 1703, if the mobile phone determines that the user has processed the recommendation card 1704, the mobile phone may remove the display of the recommendation card 1704 in the desktop 1703. For example, if the mobile phone displays the desktop including the recommendation card 1704 for more than 5 seconds, and detects a facial feature during the display of the desktop, the mobile phone may remove the display of the recommendation card 1704 in the desktop 1703. For another example, if the mobile phone receives a tapping operation performed by the user on the recommendation card 1704, the mobile phone may remove the display of the recommendation card 1704 in the desktop 1703.

Figure 17C:
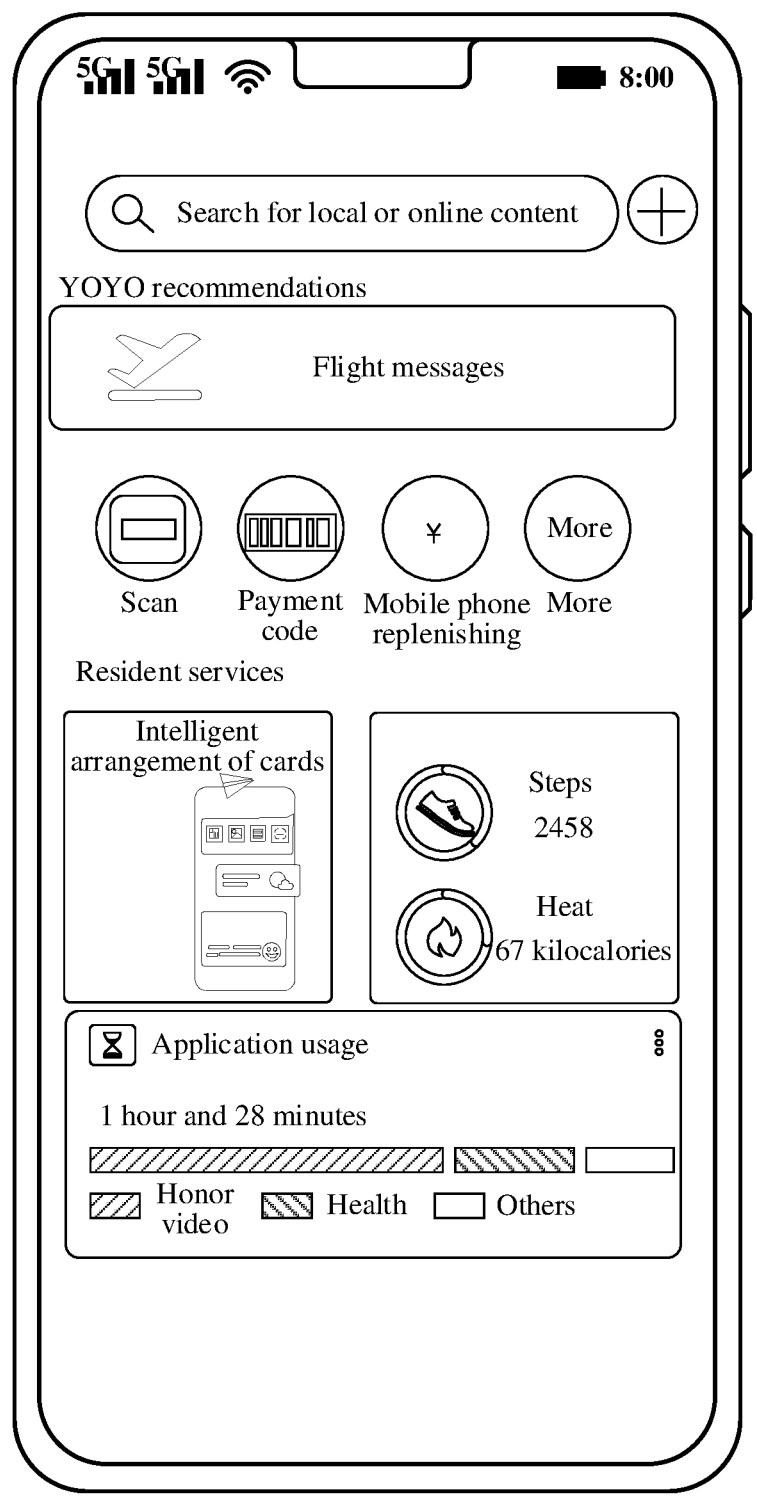

Then, the mobile phone may display a minus one screen 1705 shown in FIG. 17C in response to an operation performed by the user to indicate that the mobile phone should enter the minus one screen. The minus one screen 1705 includes the recommendation card 1701 that is folded.

In other embodiments, after removing the display of the recommendation card 1704 in the desktop 1703, the mobile phone may remove the display of the recommendation card 1701 in the minus one screen in response to an operation performed by the user to indicate that the mobile phone should enter the minus one screen.

In other embodiments, the mobile phone may display the push information in another manner, for example, display the push information required for the user evaluated by the mobile phone by using an intelligent access window. It may be understood that intelligent access window is a quick entrance to view the push information required for the user. Certainly, the push information displayed on the intelligent access window may be the push information 1 determined by the mobile phone from a plurality of applications.

Figure 18A:
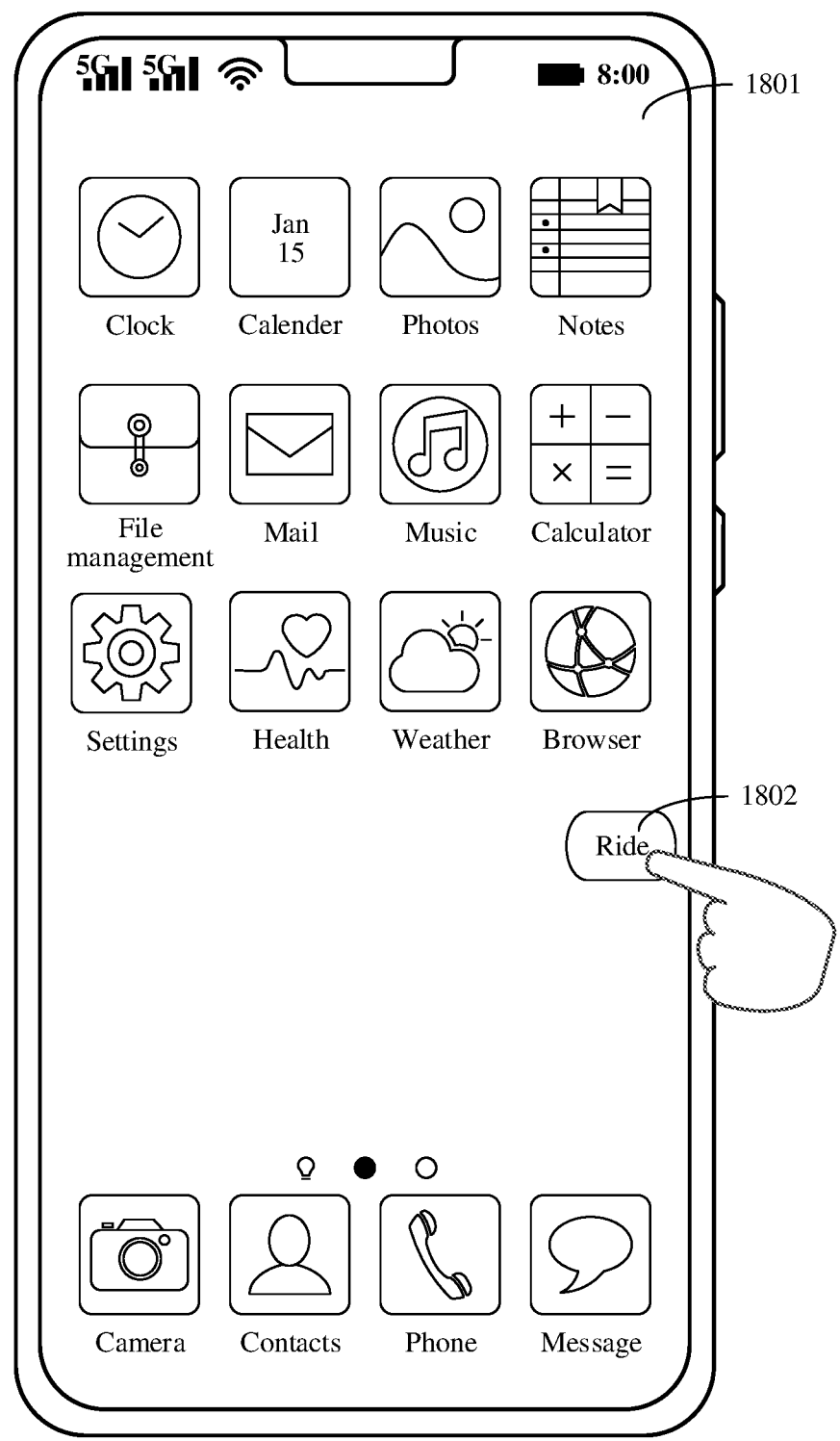
FIG. 18A and FIG. 18B are thirteenth example display diagrams of a mobile phone according to an electronic device of this application.
Figure 18B:
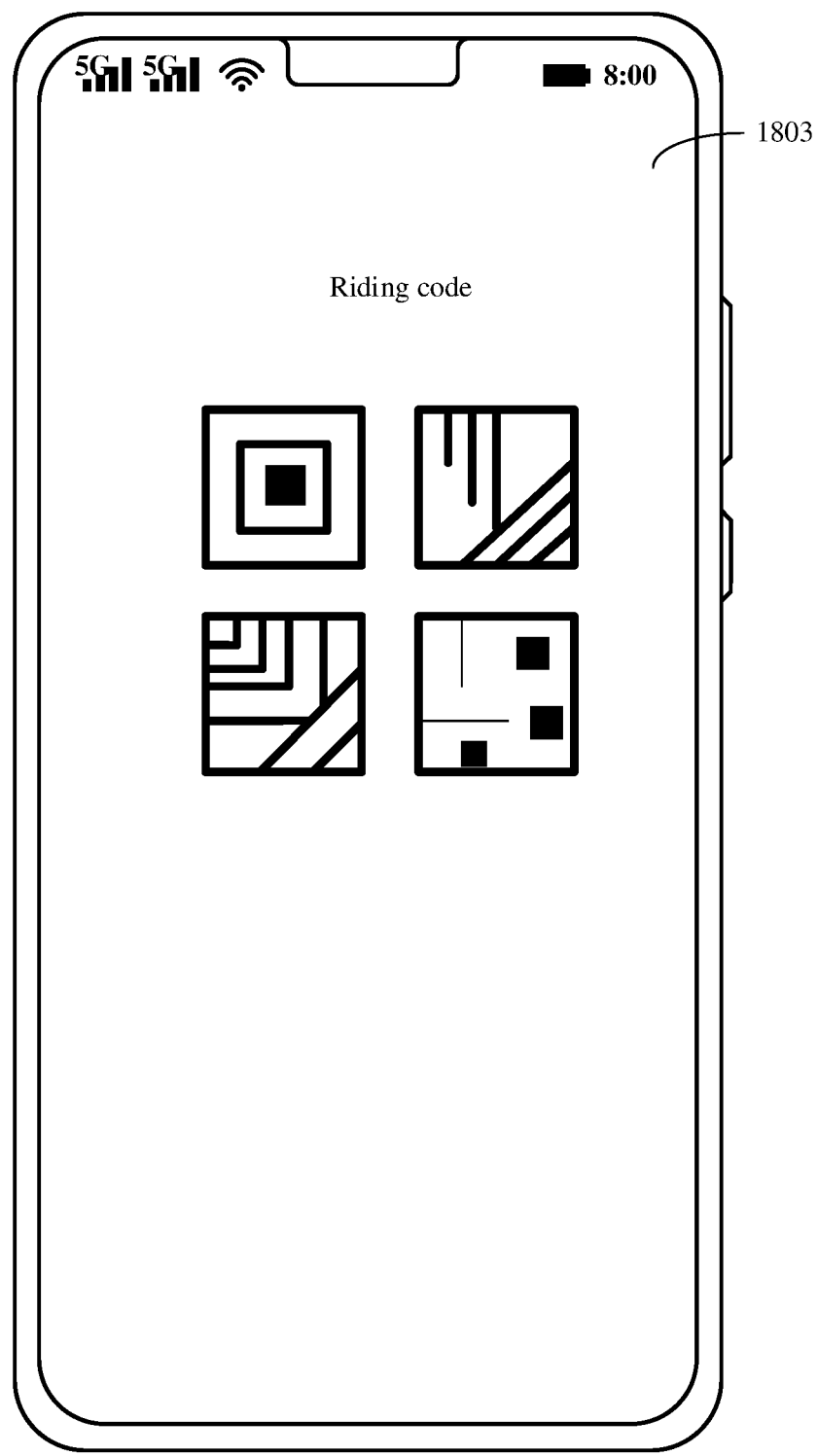

For example, a desktop 1801 shown in FIG. 18A shows an intelligent access window 1802. The intelligent access window 1802 may be configured to indicate that a riding code should be displayed. When the mobile phone receives an operation, such as a tapping operation, performed by the user on the intelligent access window 1802, the mobile phone may display an interface 1803 shown in FIG. 18B. The interface 1803 includes a real-time riding code.

Figure 19:
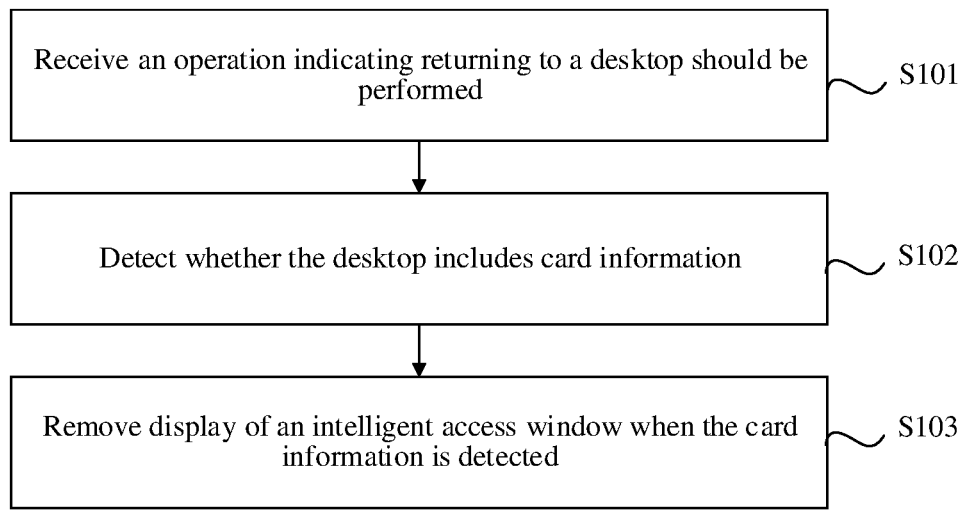
FIG. 19 is a step flowchart of the card information display method according to an electronic device of this application.

Although the intelligent access window and the recommendation card prompt the user to view the push information in different manners, the intelligent access window and the recommendation card may prompt the same push information for the user. In order to alleviate the problem, as shown in FIG. 19, a method provided in this embodiment of this application further includes the following steps.

S101: A mobile phone receives an operation performed by the user to indicate that a desktop should be displayed. The operation indicating that the desktop should be displayed may also be referred to as a fourth operation.

For example, when the mobile phone displays a minus one screen, the mobile phone may receive the operation performed by the user to indicate that the desktop should be displayed, for example, a leftward sliding operation. For another example, when the mobile phone displays an APP interface, the mobile phone may also receive the operation performed by the user to indicate that the desktop should be displayed, for example, an upward sliding operation. For another example, when the mobile phone is in a screen-locked state, the mobile phone may also receive the operation performed by the user to indicate that the desktop should be displayed, for example, an unlocking operation.

S102: Detect whether the desktop includes card information.

In some embodiments, the card information may be a card stack composed of recommendation cards. In an implementation, a content provider call interface function may be called for querying. In response to the content provider call interface function being called, a business list (such as a put string array list) of a card stack displayed in the desktop is returned through a bundle class. When the bundle class that is fed back is empty, it indicates that there is no card stack on the desktop. When a value of a key field (key: "cardlist") in the bundle class that is fed back is Value: arraylist<string>business, it indicates that the desktop has only a weather card. The bundle class that is fed back includes the business list cardlist in the card stack.

S103: Remove display of an intelligent access window when the card information is detected.

In some embodiments, after the intelligent access window is removed, it is repeatedly detected whether card information exists on a real-time display interface. When no card information is detected, the intelligent access window is displayed again. For example, when the mobile phone displays a display interface of an application in response to an operation performed by the user, the mobile phone may display the intelligent access window again when detecting that a current display interface does not include the card information.

In addition, push information in the form of notifications may further exist. In order to achieve de-duplication between the push information in the form of notifications and the push information on the recommendation card, the method described in the foregoing embodiment may be used to perform de-duplication between the push information on the intelligent access window and the push information the recommendation card. That is to say, when the recommendation card exists, the push information of the push information is removed. In other possible embodiments, display modes corresponding to different types of push information may be pre-configured. For example, the intelligent access window is used to prompt the user to view push information corresponding to a service currently required for the user evaluated by the mobile phone. For example, if the mobile phone determines that the user currently needs to use a riding service, and the riding service corresponds to the riding code, the intelligent access window is used to prompt the user to view the riding code. For another example, a notification is used to prompt the user to view push information corresponding to a current task that needs to be done by the user immediately. For another example, a recommendation card displayed on the desktop is used to prompt the user to view push information that needs to be followed within a short period of time (for example, 24 hours). For another example, a recommendation card displayed on the minus one screen is used to prompt the user to view push information that needs to be viewed within a long period of time (for example, one week). In this way, different types of push information are displayed in different manners, which avoids simultaneous pushing of the same push information to the user in different manners, thereby improving the human-computer interaction efficiency when the user views the push information, and thus improving the user experience.

An embodiment of this application further provides an electronic device. The electronic device may include a memory and one or more processors. The memory is coupled to the processor. The memory is configured to store computer program code. The computer program code includes computer instructions. When the processor executes the computer instructions, the electronic device may be caused to perform the steps performed by the mobile phone in the foregoing embodiments. Certainly, the electronic device includes but is not limited to the memory and the one or more processors. For example, for a structure of the electronic device, refer to the structure of the mobile phone shown in FIG. 3.

Figure 20:
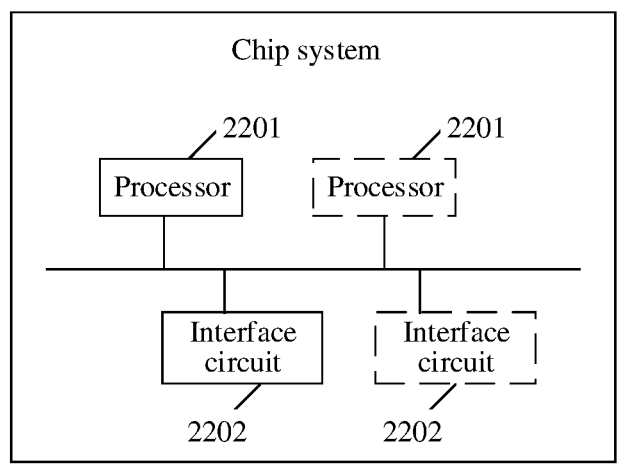
FIG. 20 is a schematic composition diagram of a chip system according to an embodiment of this application.

An embodiment of this application further provides a chip system. The chip system is applicable to the electronic device in the foregoing embodiments. As shown in FIG. 20, the chip system includes at least one processor 2201 and at least one interface circuit 2202. The processor 2201 may be a processor in the electronic device. The processor 2201 and the interface circuit 2202 may be connected to each other by using a line. The processor 2201 may receive computer instructions from the memory of the electronic device through the interface circuit 2202 and execute the computer instructions. When the computer instructions are executed by the processor 2201, the electronic device may be caused to perform the steps performed by the mobile phone in the foregoing embodiments. Certainly, the chip system may further include other discrete devices. This is not specifically limited in this embodiment of this application.

It may be clearly learned by a person skilled in the art from the foregoing descriptions of the implementations that, for convenience and brevity of description, division into only the foregoing function modules is used as an example for description. In actual application, the foregoing functions may be allocated to different function modules for implementation according to a requirement, that is, an internal structure of an apparatus is divided into different function modules, to complete all or some of the functions described above. For a specific working process of the system, apparatus, and unit described above, refer to a corresponding process in the foregoing method embodiments, and the details are not described herein.

In this embodiment of this application, functional units in the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the related art, or all or some of the technical solutions may be implemented in the form of a software product. The computer software product is stored in a storage medium and includes a plurality of instructions for instructing a computer device (which may be a personal computer, a server, a network device, or the like) or a processor to perform all or some of the steps of the methods described in the embodiments of this application. The storage medium includes any medium that can store program code, such as a flash memory, a removable hard disk, a read-only memory, a random access memory, a magnetic disc, or a compact disc.

The foregoing descriptions are merely specific implementations of the embodiments of this application, but the protection scope of the embodiments of this application is not limited thereto. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A card information display method, applicable to an electronic device, the method comprising:
   receiving, by the electronic device, a first operation performed by a user;
   displaying, by the electronic device, a minus one screen in response to the first operation, wherein the minus one screen includes a user interface on a first area of a split screen of the electronic device and comprises a first region and a second region;
   the first region comprises at least one first card, the first card is configured to display first information, the first information is from one or more applications, the first information comprises at least one of timing information, fence information, and status information, and when at least one of the timing information, the fence information, and the status information of the first information meets a preset condition, the first card is pushed by the electronic device to the first region; and
   the second region comprises at least one second card, the second card is associated with an application, the second card is configured to display second information of the associated application, the second card is a card configured by the user, and when the first information is the same as the second information displayed in the second region, display of the corresponding first card is removed from the first region.

2. The method according to claim 1, wherein the minus one screen further comprises a third region, and the third region comprises function entry icons from one or more applications.

3. The method according to claim 1, wherein
   a manner in which the timing information of the first information meets the preset condition comprises: a time period indicated by the timing information of the first information comprises a current system time of the electronic device;
   a manner in which the fence information of the first information meets the preset condition comprises: a geographical region indicated by the fence information of the first information covers a current position of the electronic device; and
   a manner in which the status information of the first information meets the preset condition comprises: the status information of the first information is the same as a current state of the user holding the electronic device.

4. The method according to claim 1, wherein the electronic device is pre-configured with demanded message lists corresponding to different user operations; and before the displaying, by the electronic device, a minus one screen, the method further comprises:
   determining, by the electronic device, a corresponding demanded message list based on the received user operation, wherein the demanded message list comprises at least one message type and a corresponding application;
   obtaining, by the electronic device from the corresponding application based on the demanded message list, first information that matches the message type; and
   creating, by the electronic device, the first card based on the first information.

5. The method according to claim 1, further comprising:
   receiving, by the electronic device, a second operation when the minus one screen is displayed;
   displaying, by the electronic device, the editable minus one screen in response to the second operation;
   receiving, by the electronic device, a third operation performed by the user;
   displaying, by the electronic device, a desktop in an editable state in response to the third operation, wherein the desktop comprises icons of a plurality of applications;
   displaying, by the electronic device, a first application service corresponding to a first application when receiving an operation performed by the user on an icon of the first application; and
   creating, by the electronic device, a second card associated with the first application when receiving an operation performed by the user on the first application service, to display second information corresponding to the first application service.

6. The method according to claim 1, further comprising:
   displaying, by the electronic device, a desktop of the electronic device when receiving a fourth operation performed by the user, wherein the desktop comprises a third card, and the third card is configured to display the first information;
   determining, by the electronic device, that the third card has been processed;
   receiving, by the electronic device, the first operation; and
   displaying, by the electronic device, the minus one screen, wherein the minus one screen comprises the folded first card.

7. The method according to claim 6, wherein before the displaying a desktop of the electronic device, the method further comprises:
   determining, by the electronic device, that the desktop comprises the third card; and
   after the displaying a desktop of the electronic device, the method further comprises:
   removing, by the electronic device, display of an intelligent access window corresponding to the third card.

8. The method according to claim 1, wherein when the first region comprises a plurality of first cards, the plurality of first cards are displayed in a stacked manner in the first region, and the first region comprises a stack identifier displayed corresponding to the first card;
    after the displaying, by the electronic device, a minus one screen, the method further comprises:
    receiving, by the electronic device, a first sliding operation performed by the user on the stack identifier; and
    switching, by the electronic device, to display of a masked first card in the first region in response to the first sliding operation; or
    receiving, by the electronic device, a second sliding operation performed by the user in the minus one screen; and
    unfolding, by the electronic device, all of the first cards for display in response to the second sliding operation.

9. The method according to claim 1, wherein after the displaying, by the electronic device, a minus one screen, the method further comprises:
    receiving, by the electronic device, a third sliding operation performed by the user in the minus one screen;
    displaying, by the electronic device, a hidden second card in the second region in response to the third sliding operation, wherein the first card displayed in the first region is maintained unchanged;
    receiving, by the electronic device, an operation performed by the user on a first control in the minus one screen; and
    displaying, by the electronic device, a second interface, wherein the second interface is configured to display all created second cards.

10. An electronic device, comprising:
    one or more processors; and
    a memory configured to store code instructions that, when executed by the one or more processors, cause the electronic device to:
        receive a first operation performed by a user;
        display a minus one screen in response to the first operation, wherein the minus one screen comprises a first region and a second region;
        the first region comprises at least one first card, the first card is configured to display first information, the first information is from one or more applications, the first information comprises at least one of timing information, fence information, and status information, and when at least one of the timing information, the fence information, and the status information of the first information meets a preset condition, the first card is pushed by the electronic device to the first region; and
        the second region comprises at least one second card, the second card is associated with an application, the second card is configured to display second information of the associated application, the second card is a card configured by the user, and when the first information is the same as the second information displayed in the second region, display of the corresponding first card is removed from the first region.

11. The electronic device according to claim 10, wherein the minus one screen further comprises a third region, and the third region comprises function entry icons from one or more applications.

12. The electronic device according to claim 10, wherein
    a manner in which the timing information of the first information meets the preset condition comprises: a time period indicated by the timing information of the first information comprises a current system time of the electronic device;
    a manner in which the fence information of the first information meets the preset condition comprises: a geographical region indicated by the fence information of the first information covers a current position of the electronic device; and
    a manner in which the status information of the first information meets the preset condition comprises: the status information of the first information is the same as a current state of the user holding the electronic device.

13. The electronic device according to claim 10, wherein before the displaying the minus one screen, the electronic device is further caused to:
    obtain a plurality of pieces of first information from different applications; and
    create the first card based on the first information.

14. The electronic device according to claim 13, wherein the electronic device is pre-configured with demanded message lists corresponding to different user operations, and the obtaining, a plurality of pieces of first information from different applications comprises:
    determining, a corresponding demanded message list based on the received user operation, wherein the demanded message list comprises at least one message type and a corresponding application; and
    obtaining, from the corresponding application based on the demanded message list, first information that matches the message type.

15. The electronic device according to claim 10, wherein the electronic device is further caused to:
    receive a second operation when the minus one screen is displayed;
    display the editable minus one screen in response to the second operation;
    receive a third operation performed by the user;
    display a desktop in an editable state in response to the third operation, wherein the desktop comprises icons of a plurality of applications;
    display a first application service corresponding to a first application when receiving an operation performed by the user on an icon of the first application; and
    create a second card associated with the first application when receiving an operation performed by the user on the first application service, to display second information corresponding to the first application service.

16. The electronic device according to claim 10, wherein the electronic device is further caused to:
    display a desktop of the electronic device when receiving a fourth operation performed by the user, wherein the desktop comprises a third card, and the third card is configured to display the first information;
    determine that the third card has been processed;
    receive the first operation; and
    display the minus one screen, wherein the minus one screen comprises the folded first card.

17. The electronic device according to claim 16, wherein before the displaying a desktop of the electronic device, the electronic device is further caused to:
    determine that the desktop comprises the third card; and
    after the displaying a desktop of the electronic device:
        remove display of an intelligent access window corresponding to the third card.

18. The electronic device according to claim 10, wherein when the first region comprises a plurality of first cards, the plurality of first cards are displayed in a stacked manner in the first region, and the first region comprises a stack identifier displayed corresponding to the first card;
    after the displaying, a minus one screen, the electronic device is further caused to:

receive a first sliding operation performed by the user on the stack identifier; and switch to display of a masked first card in the first region in response to the first sliding operation; or receive a second sliding operation performed by the user in the minus one screen; and unfold all of the first cards for display in response to the second sliding operation.

19. The electronic device according to claim 10, wherein after the displaying, a minus one screen, the electronic device is further caused to:

receive a third sliding operation performed by the user in the minus one screen;

display a hidden second card in the second region in response to the third sliding operation, wherein the first card displayed in the first region is maintained unchanged;

receive an operation performed by the user on a first control in the minus one screen; and display a second interface, wherein the second interface is configured to display all created second cards.

20. A non-transitory computer-readable storage medium storing instructions that, when executed, cause an electronic device to provide execution comprising:

receiving a first operation performed by a user;

displaying a minus one screen in response to the first operation, wherein the minus one screen comprises a first region and a second region;

the first region comprises at least one first card, the first card is configured to display first information, the first information is from one or more applications, the first information comprises at least one of timing information, fence information, and status information, and when at least one of the timing information, the fence information, and the status information of the first information meets a preset condition, the first card is pushed by the electronic device to the first region; and the second region comprises at least one second card, the second card is associated with an application, the second card is configured to display second information of the associated application, the second card is a card configured by the user, and when the first information is the same as the second information displayed in the second region, display of the corresponding first card is removed from the first region.

* * * * *

UNITED STATES PATENT AND TRADEMARK OFFICE
CERTIFICATE OF CORRECTION

| | | |
|---|---|---|
| PATENT NO. | : 12,353,896 B2 | Page 1 of 1 |
| APPLICATION NO. | : 18/264804 | |
| DATED | : July 8, 2025 | |
| INVENTOR(S) | : Jiazi Chen et al. | |

It is certified that error appears in the above-identified patent and that said Letters Patent is hereby corrected as shown below:

On the Title Page

Under "(71) APPLICANT," change "Guangdong (CN)" to --Shenzhen (CN)--

Signed and Sealed this
Thirtieth Day of December, 2025

John A. Squires
*Director of the United States Patent and Trademark Office*